(12) United States Patent
Jones et al.

(10) Patent No.: US 11,667,403 B2
(45) Date of Patent: Jun. 6, 2023

(54) METHODS AND SYSTEMS FOR ASSEMBLING A STRUCTURE

(71) Applicant: The Boeing Company, Chicago, IL (US)

(72) Inventors: Darrell D. Jones, Mill Creek, WA (US); Daniel R. Smith, Woodinville, WA (US); Robert William Whiting, St. Louis, MO (US); Allen James Halbritter, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,262

(22) Filed: Nov. 10, 2021

(65) Prior Publication Data

US 2022/0153433 A1    May 19, 2022

Related U.S. Application Data

(60) Provisional application No. 63/115,036, filed on Nov. 18, 2020.

(51) Int. Cl.
  *B32B 41/00*        (2006.01)
  *B64F 5/10*         (2017.01)
      (Continued)

(52) U.S. Cl.
  CPC ............... *B64F 5/10* (2017.01); *B29C 70/38* (2013.01); *B29C 70/44* (2013.01); *B29L 2031/3082* (2013.01)

(58) Field of Classification Search
  CPC ... B64F 5/10; B64F 5/50; B29C 70/38; B29C 70/44; B29C 70/30; B29C 31/00;
      (Continued)

(56) References Cited

U.S. PATENT DOCUMENTS

| 9,873,230 B1 | 1/2018 | DesJardien et al. |
| 2012/0030922 A1 | 2/2012 | Jones et al. |

(Continued)

FOREIGN PATENT DOCUMENTS

| DE | 1226822 A1 | 2/1994 |
| EP | 3406431 A1 | 11/2018 |

(Continued)

OTHER PUBLICATIONS

Netherlands Patent Office Written Opinion and Search Report with English Translation, dated Jul. 13, 2021, regarding Application No. NL2027408, 10 pages.

(Continued)

*Primary Examiner* — Michael N Orlando
*Assistant Examiner* — Joshel Rivera
(74) *Attorney, Agent, or Firm* — Yee & Associates, P.C.

(57) ABSTRACT

Systems and methods are provided for placing preforms onto a mandrel. One illustrative method includes moving a mandrel in a process direction relative to a station(s) that comprises multiple pick-and-place machine(s), identifying a tray that stores a preform comprising an unhardened fiber-reinforced material, placing the strong back at the preform via at least one of the pick-and-place machine(s), applying a vacuum to hold the preform in contact with the strong back, transporting the preform to a mandrel via the pick-and-place machine(s), and placing the preform onto the mandrel.

21 Claims, 29 Drawing Sheets

(51) Int. Cl.
*B29C 70/38* (2006.01)
*B29C 70/44* (2006.01)
*B29L 31/30* (2006.01)

(58) Field of Classification Search
CPC ............ B29C 70/54; B29L 2031/3082; B29L 2031/3076; B64C 2001/0072; B64C 1/068; Y02T 50/40
USPC .................... 156/60, 64, 350, 351, 378, 379
See application file for complete search history.

(56) References Cited

U.S. PATENT DOCUMENTS

| | | |
|---|---|---|
| 2018/0222060 A1 | 8/2018 | Petrovski et al. |
| 2019/0047158 A1 | 2/2019 | Petrovski |
| 2020/0078990 A1 | 3/2020 | Sana |

FOREIGN PATENT DOCUMENTS

| | | | | |
|---|---|---|---|---|
| EP | 3733387 A1 | * 11/2020 | ............ | B29C 70/38 |
| WO | 2018114114 A1 | 6/2018 | | |
| WO | 2020263093 A1 | 12/2020 | | |

OTHER PUBLICATIONS

Netherlands Patent Office Written Opinion and Search Report with English Translation, dated Jul. 27, 2021, regarding Application No. NL2027409, 8 pages.
Netherlands Patent Office Written Opinion and Search Report with English Translation, dated Aug. 2, 2021, Yegarding Application No. NL2027410, 8 pages.
Netherlands Patent Office Written Opinion and Search Report with English Translation, dated Jul. 28, 2021, regarding Application No. NL2027411, 8 pages.
Netherlands Patent Office Written Opinion and Search Report with English Translation, dated Jul. 22, 2021, regarding Application No. NL2027414, 13 pages.
Extended European Search Report (EESR), dated Apr. 7, 2022, regarding Application No. 21207578, 5 pages.
Extended European Search Report (EESR), dated Apr. 12, 2022, regarding Application No. 21207562, 5 pages.
Extended European Search Report (EESR), dated Apr. 14, 2022, regarding Application No. 21207555, 7 pages.
Extended European Search Report (EESR), dated Apr. 14, 2022, regarding Application No. 21207573, 5 pages.
Extended European Search Report (EESR), dated Apr. 14, 2022, regarding Application No. 21207575, 5 pages.

* cited by examiner

METHODS AND SYSTEMS FOR ASSEMBLING A STRUCTURE

CROSS-REFERENCE TO RELATED APPLICATION

This application claims the benefit of U.S. Provisional Patent Application Ser. No. 63/115,036, filed Nov. 18, 2020, and entitled "Methods and Systems for Assembling a Structure;" which is incorporated herein by reference in its entirety.

FIELD

The disclosure related to the field of assembly, and in particular, to placement of preforms for assembly of composite parts.

BACKGROUND

Multi-layer preforms of constituent material (e.g., Carbon Fiber Reinforced Polymer (CFRP)) may be formed into any of a variety of shapes for hardening into a composite part. When fabricating complex composite parts, multiple preforms may be placed together onto a mandrel for curing together into a single, integral part. However, the placement of preforms together for curing, whether performed manually or automatically, is a substantially time-consuming process that reduces the speed at which composite parts are manufactured.

Therefore, it would be desirable to have a method and system that take into account at least some of the issues discussed above, as well as other possible issues.

SUMMARY

Embodiments described herein provide systems and methods for engaging in coordinated control of pick-and-place machine(s) to place preforms onto a mandrel. The pick-and-place machine(s) are operated in tandem when placing large objects, yet operate independently when placing smaller objects. This can increase the overall speed of placement of preforms, which in turn can enhance the speed of layup (and hence fabrication) of the composite part.

One embodiment is a method for placing preforms onto a mandrel. The method includes moving a mandrel in a process direction relative to a station(s) that comprises multiple pick-and-place machine(s), identifying a tray that stores a preform comprising an unhardened fiber-reinforced material, placing a strong back at the preform via at least one of the pick-and-place machine(s), applying a vacuum that holds the preform in contact with the strong back, transporting the preform to a mandrel via the pick-and-place machine(s), and placing the preform onto the mandrel.

A further embodiment is a non-transitory computer-readable medium embodying programmed instructions which, when executed by a processor, are operable for performing a method for assembling a structure. The method includes moving a mandrel in a process direction relative to a station(s) that comprises multiple pick-and-place machine(s), identifying a tray that stores a preform comprising an unhardened fiber-reinforced material, placing a strong back at the preform via at least one of the pick-and-place machine(s), applying a vacuum that holds the preform in contact with the strong back, transporting the preform to a mandrel via the pick-and-place machine(s), and placing the preform onto the mandrel.

A further embodiment is a placement system for fabricating a structure. The placement system includes pick-and-place machine(s) at a station(s) within a cell, and a cell controller. The cell controller is operable to move a mandrel in a process direction relative to the station(s), identify a tray that stores a preform comprising an unhardened fiber-reinforced material, place a strong back at the preform via at least one of the pick-and-place machine(s), apply a vacuum that holds the preform in contact with the strong back, transport the preform to a mandrel via the pick-and-place machine(s), and place the preform onto the mandrel.

A further embodiment is an apparatus comprising: a plurality of pick-and-place machine(s) located within a manufacturing cell; a cell controller coupled to the plurality of pick-and-place machine(s); a mandrel comprising a cut-out, the mandrel movable in a process direction relative to the plurality of pick-and-place machine(s); a tray; a preform stored on the tray, the preform comprising an unhardened fiber-reinforced material; and a strong back held in contact with the preform by a vacuum, the strong back comprising a recess, wherein the tray is identified by the cell controller, wherein the preform and the strong back are transported to, and placed upon, the mandrel via at least one of the plurality of pick-and-place machine(s), and wherein the recess of the strong back is aligned with the cut-out of the mandrel. The tray can store multiple preforms and the strong back can include multiple recesses. A layer of the unhardened fiber-reinforced material can be placed over the multiple preforms and co-cured with the multiple preforms.

A further embodiment is an apparatus comprising: a plurality of pick-and-place machine(s) located at a placement station(s) within a manufacturing cell, the plurality of pick-and-place machine(s) disposed within reach of objects including discrete objects and a large object that is bigger than the discrete objects; a mandrel located at the placement station(s), the pick-and-place machine(s) disposed within reach of the objects and the mandrel, the large object spanning a multiple number of the plurality of pick-and-place machine(s), wherein the mandrel moves with respect to the plurality of pick-and-place machine(s); and a cell controller coupled to the plurality of pick-and-place machine(s), wherein the cell controller is operable to initiate an asynchronous phase in which the plurality of pick-and-place machine(s) are each operated independently to place the discrete objects onto the mandrel and is further operable to initiate a synchronous phase in which the plurality of pick-and-place machine(s) are operated in tandem to place the large object onto the mandrel. Each of the plurality of pick-and-place machine(s) can comprise a controller, an end effector, and position sensors. The end effector of each of the plurality of pick-and-place machine(s) cab include a vacuum system that selectively applies vacuum pressure in accordance with a Numerical Control (NC) program. The mandrel can have a contoured cross-section and the plurality of pick-and-place machine(s) can be distributed across multiple placement stations(s), wherein the plurality of pick-and-place machine(s) are operated at each of the placement stations(s) in the synchronous phase and the asynchronous phase. The pick-and-place machine(s) can place each of the objects onto a different radial portion of the mandrel. The pick-and-place machine(s) can place each of the objects onto a different longitudinal portion of the mandrel.

A further embodiment is an apparatus, comprising: a placement station comprising a plurality of pick-and-place machines, defining a process direction; a mandrel located within the placement station, the mandrel comprising a plurality of mandrel segments; a strong back coupled to at least one of the multiple pick-and-place machines; a preform held in contact with the strong back by vacuum pressure applied by the strong back, wherein the preform is transported to and placed onto at least one of the plurality of mandrel segments by the at least one of the pick-and-place machines. A further embodiment is an apparatus, comprising: a mandrel formed from mandrel segments for receiving preforms in a manufacturing line, the mandrel comprising a plurality of mandrel segments that are separated from each other; and a hardened structure this is separated from each of the plurality of mandrel segments.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if the resin is re-heated.

Embodiments described herein provide a pulsing or moving line design and systems and methods for engaging in coordinated control of pick-and-place machine(s) and synchronized manual assist operations to place preforms onto a stationary or moving mandrel. In one example having a moving segment (e.g., a mandrel segment) or a full tool (e.g., a mandrel) continuously moving or pulsing along a manufacturing line, the systems and methods described herein can increase work density on the mandrel (e.g., by having more stations(s) and/or more zonal coverage while simultaneously having increased parallel processing operations occurring in feeder lines to the stations(s))). The herein-described systems and methods can provide an order of magnitude reduction in work density and increase parallel processing operations by a similar amount in a tight packing density within a manufacturing facility. All operations, both automated and manual, can be synchronized to support line velocity.

Figure 1:
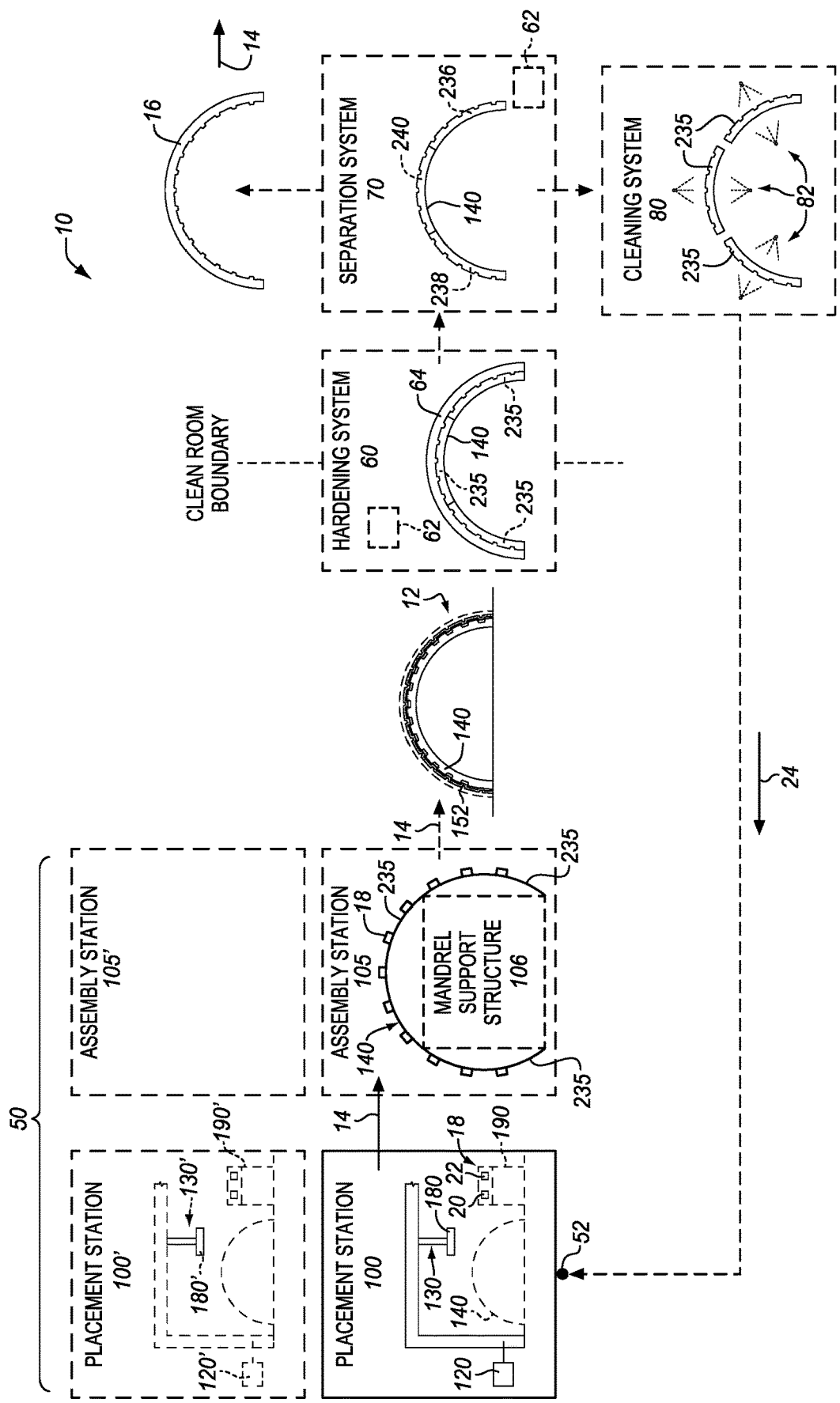
FIG. 1 is a schematic block diagram illustrating a manufacturing line having a placement system in an illustrative embodiment.

FIG. 1 is a schematic block diagram illustrating a manufacturing line 10 having a placement system 50 for fabricating or assembling a structure 12. In the examples herein, the structure formed of objects moves along the manufacturing line 10 in a process direction 14 to become a composite part 16 after unhardened fiber-reinforced material 152 that makes up the structure 12 is hardened. Hardening includes curing for thermoset materials or consolidating for thermoplastic materials. The structure 12 can be a portion 768, such as a half-barrel section 770, of a fuselage 766 that can be used in an aircraft 750 (shown in FIGS. 28 and 29).

To move the structure 12 along the manufacturing line 10, a mandrel 140 moves along the manufacturing line 10 through at least the placement system 50. In some examples, the mandrel 140 includes mandrel segment(s) 235, which are described in more detail with respect to FIG. 21.

The placement system 50 fabricates or assembles the structure 12 from objects. The objects can each include a preform(s) 150 of unhardened fiber-reinforced material 152 (shown in FIGS. 2 and 5). The placement system 50 places the preform(s) 150 onto the mandrel 140 for hardening into the composite part 16. One or more of the object(s) 18 can be a first type of object(s) 18, such as discrete object(s) 20, and/or a second type of object(s) 18, such as large object(s) 22. The large object(s) 22 is bigger than the discrete object(s) 20. Accordingly, the placement system 50 can fabricate or assemble the structure 12 from objects including discrete object(s) 20 and one or more large objects. In the examples described below, the large object(s) 22 spans multiple pick-and-place machine(s) 130.

Figure 5:
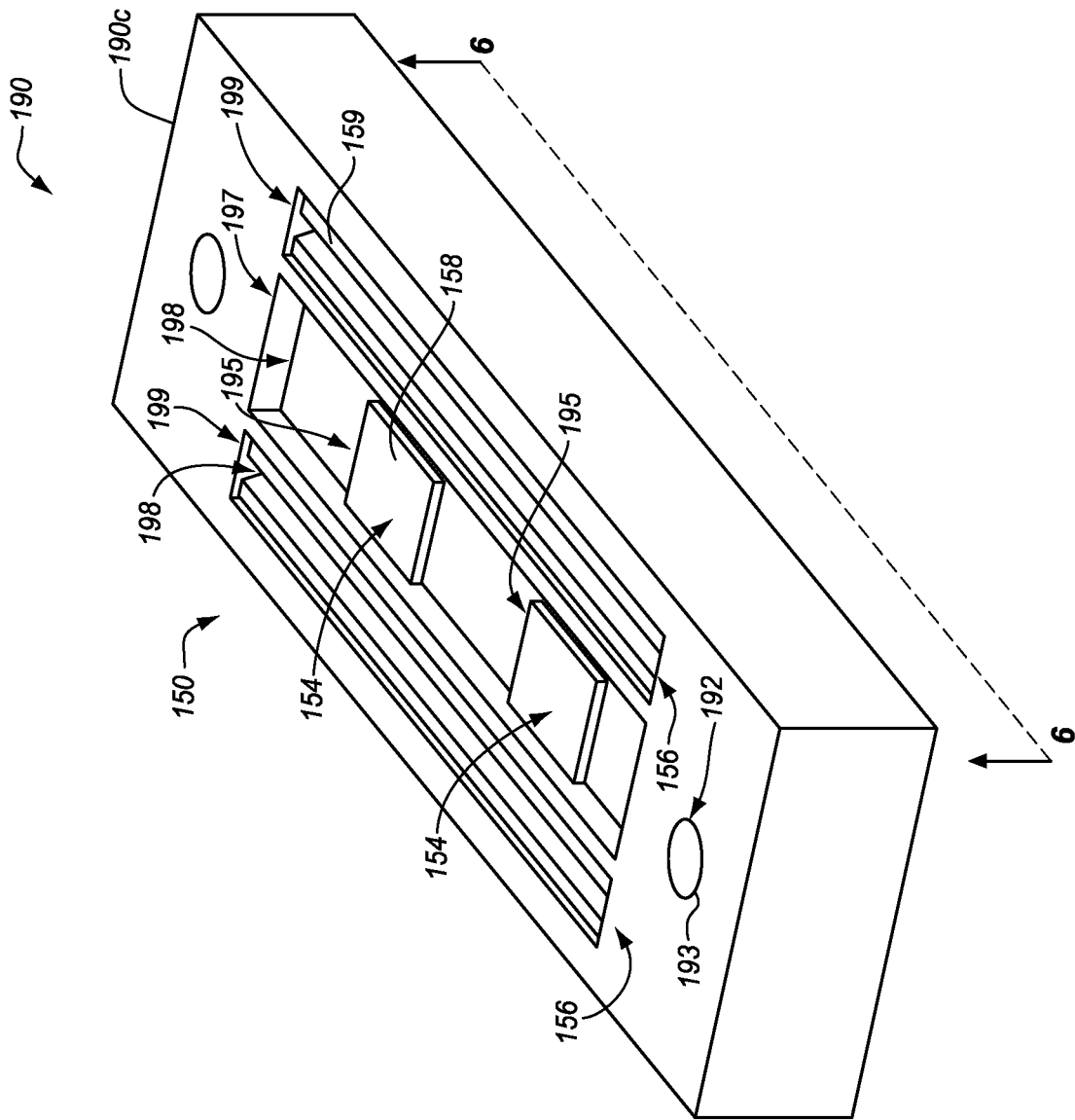
FIG. 5 is a perspective view of a second example tray that can be used with the placement system shown in FIGS. 1 to 3 including example preforms that may be placed by the placement system.
Figure 18:
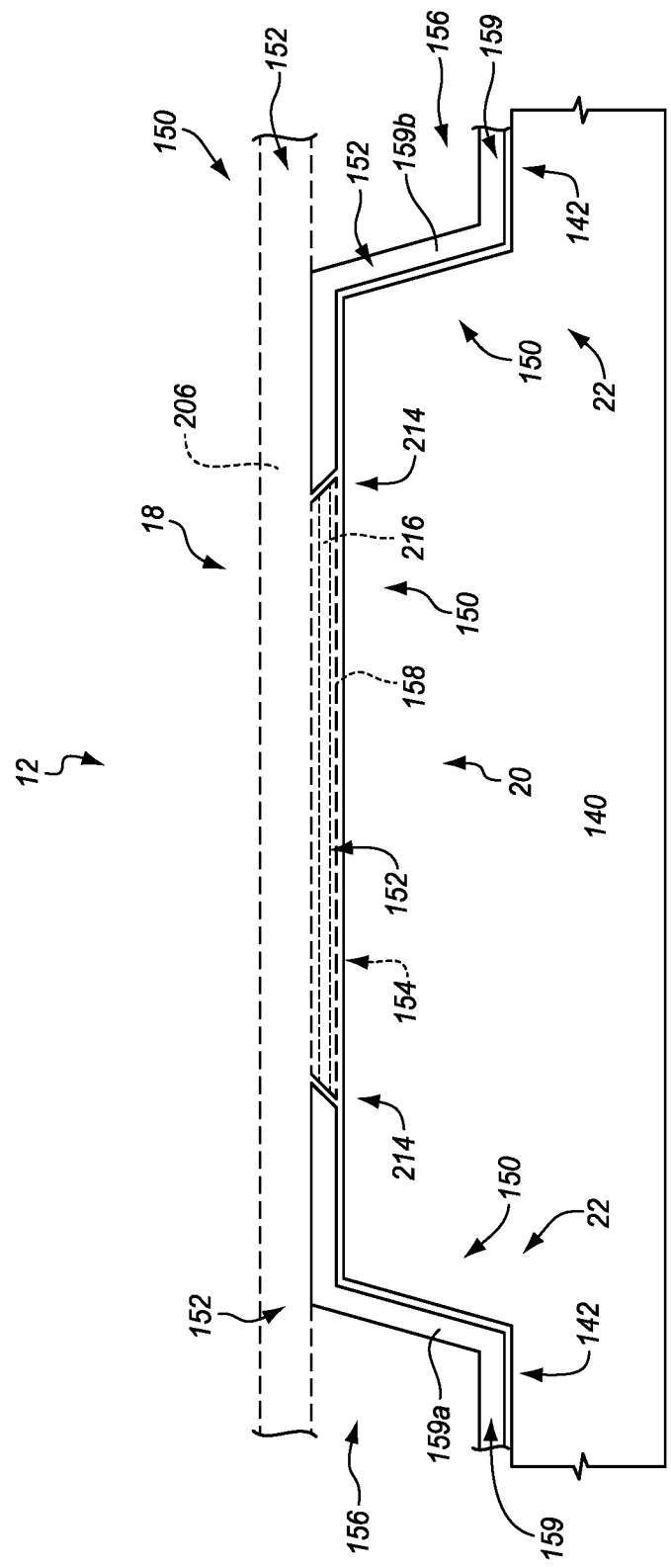
FIG. 18 is an end cross-sectional view of the mandrel and preform(s) shown in FIG. 17.

Referring to FIGS. 1, 5, and 18, when the objects are preform(s) 150, the preform(s) 150 can be a first type of preform, such as discrete preform(s) 154 (e.g., frame filler preform(s) 158), and/or a second type of preform, such as a large preform(s) 156 (e.g., stringer preform(s) 159). Accordingly, in some examples, the placement system 50 assembles the structure 12 from preform(s) 150 including discrete preform(s) 154 and one or more large preform(s) 156. When the placement system 50 is used to make the portion 768 of the fuselage 766 as the structure 12, the discrete object(s) 20 can be the frame filler preform(s) 158 (also known as "postage stamps") and/or short stringers, and the large object(s) 22 can be a medium or long stringer preform(s). Because the large preform(s) 156 is an example of the large object(s) 22, the large preform(s) 156 spans multiple pick-and-place machine(s) 130.

Referring again to FIG. 1, the placement system 50 includes at least a placement station(s) 100. The placement system 50 can optionally include at least one assembly station(s). The manufacturing line 10 can further include a hardening system 60, a separation system 70, a cleaning system 80, and/or other suitable systems, such as a lamination system (not shown) or a fastener installation system (not shown). The placement system 50, hardening system 60, separation system 70, and/or cleaning system 80 can be arranged in series or parallel depending on the structure being assembled and the manufacturing processes being used along the manufacturing line 10. Although FIG. 1 shows the placement system 50, the hardening system 60, the separation system 70, and the cleaning system 80 being in sequential order, the hardening system 60 may be positioned after the separation system 70, as described in more detail with respect to FIG. 25.

The hardening system 60 is configured to harden an unhardened material, such as the unhardened fiber-reinforced material 152, into a hardened material. The hardening system 60 can cure a thermoset material and/or consolidate a thermoplastic material. For example, the hardening system 60 includes an autoclave. The hardening system 60 can also be configured to apply release film(s) 62 to the structure 12 and/or the mandrel 140 prior to hardening the structure 12. The release film(s) 62 can include bagging materials, peel plies, separation films, etc. In one example, release film(s) 62, such as separation films and/or peel plies, are applied to the mandrel 140, and release film(s) 62, such as bagging materials, are applied to the structure 12. The release film(s) 62 can be applied to the mandrel 140 before the mandrel 140 enters the placement system 50.

After the structure 12 is hardened by the hardening system 60, the structure 12 can become a hardened structure 64, which can be the composite part 16 when the structure 12 is formed from the unhardened fiber-reinforced material 152. For example, the hardened structure 64 is a cured structure forming the composite part 16. The hardened structure 64 or composite part 16 moves along the manufacturing line 10 to receive addition manufacturing processes. For example, the composite part 16 and/or hardened structure 64 moves to a new location, such as to a different system, in the manufacturing line 10 to receive further manufacturing processes. The different system can be a fabrication or assembly system, and the further manufacturing processes can assemble the composite part 16 into a final product, such as the aircraft 750 (shown in FIGS. 28 and 29).

The separation system 70 is configured to separate (e.g., demold) the hardened structure 64 from the mandrel 140. In one example, the separation system 70 is configured to move the hardened structure 64 vertically to separate the hardened structure 64 from the mandrel 140. When the mandrel 140 is formed from mandrel segment(s) 235, the separation system 70 is configured to separate the hardened structure 64 from the mandrel segment(s) 235, either individually or as assembled together as the mandrel 140. The separation system 70 is further configured to separate the mandrel segment(s) 235 from each other. When release film(s) 62 are applied at the hardening system 60, the separation system 70 removes the release film(s) 62 from the hardened structure 64 and/or the mandrel 140. When the mandrel 140 is formed from mandrel segment(s) 235, the release film(s) 62 are removed from the mandrel segment(s) 235 after the hardened structure 64 is separated from the mandrel 140 and before the mandrel segment(s) 235 are separated from each other.

When the mandrel 140 is reused in the placement station(s) 100, the mandrel 140 moves in a counter-process direction 24 to be reused in the placement system 50 after the mandrel 140 is separated from the structure 12, 64. More specifically, the mandrel 140 is transported to a start position 52 for the placement system 50 and/or placement station(s) 100. Alternatively, the mandrel 140 could stay with the structure 12, 64 and continue along the manufacturing line 10 to support the structure 12, 64 as additional assembly and manufacturing processes are performed on the structure 12, 64 until the mandrel 140 is no longer needed to support the structure 12, 64.

The cleaning system 80 is configured to clean the mandrel 140 and/or mandrel segment(s) 235. For example, the cleaning system 80 is configured to apply at least one cleaning chemical 82 to the mandrel 140 and/or mandrel segment(s) 235. The at least one cleaning chemical 82 can be a solvent, water, and/or soap. In one example, the at least one cleaning chemical 82 is selected from the group consisting of: solvents, water, and soap. When the at least one cleaning chemical 82 includes multiple different cleaning chemicals applied by the cleaning system 80, the cleaning system 80 can apply the multiple different cleaning chemicals sequentially and/or simultaneously.

In addition or as an alternative to, the cleaning system 80 includes components for scrubbing, rubbing, or other cleaning processes using, for example, moving brushes, scrubbers, etc. The cleaning devices can be used before, during, or after the at least one cleaning chemical 82 is applied. In alternative embodiment, the mandrel segment(s) 235 are separated from each other after the mandrel 140 is cleaned; however, the mandrel segment(s) 235 may be more thoroughly cleaned and/or cleaned in parallel if first separated from each other.

The placement system 50 includes pick-and-place machine(s) 130 at a placement station(s) 100 and a cell controller 120 that is operable to perform the methods described herein. More specifically, the placement station(s) 100 includes a pick-and-place machine(s) 130 and a cell controller 120. The cell controller 120 is in communication with the pick-and-place machine(s) 130 to perform a placement operation in the placement station(s) 100. For example, the cell controller 120 is operatively coupled to the pick-and-place machine(s) 130 to place the objects on the mandrel 140 using the pick-and-place machine(s) 130. The placement station(s) 100 can further include a strong back 180 and/or a tray 190. The tray 190 is configured to hold one type of discrete object(s) 20 or large object(s) 22 or both types of objects, as described in more detail with respect to FIGS. 4 and 5.

The placement system 50 includes one or more placement stations(s) 100. When more than one placement station(s) 100, 100' is included in the placement system 50, the pick-and-place machine(s) 130, 130' can be distributed across multiple placement stations(s) 100, 100'. The multiple placement stations(s) 100, 100' can be programmed and/or arranged to perform parallel operations or can be programmed and/or arranged to perform a series of operations. The pick-and-place machine(s) 130, 130' in the multiple placement stations(s) 100, 100' can be operated in the same mode or different modes, as described in more detail with respect to FIG. 22.

When the placement system 50 includes a placement station(s) 100 and a placement station(s) 100', each placement station(s) 100, 100' can include its own cell controller or have a common cell controller that controls multiple placement stations(s). In one example, the placement stations(s) 100, 100' have a common cell controller when the placement stations(s) 100, 100' are in the same manufacturing cell 110 (shown in FIG. 2); however, placement stations(s) 100, 100' in different manufacturing cells 110 can be operated by the same cell controller 120. When each placement station(s) 100, 100' includes a respective cell controller 120, 120', the cell controllers 120, 120' are configured to communicate with each other to coordinate operations of pick-and-place machine(s) 130, 130' in different placement stations(s).

The placement system 50 can further include one or more assembly stations(s). When the mandrel 140 includes mandrel segment(s) 235 the placement system 50 includes the assembly station(s) 105. The assembly station(s) 105 is configured to assemble the mandrel segment(s) 235 together to form the mandrel 140. The assembly station(s) 105 includes a mandrel support structure 106. The mandrel support structure 106 is configured to support the mandrel segment(s) 235 before, during, or after the mandrel segment(s) 235 are assembled together. Even when the mandrel 140 is not formed of mandrel segment(s) 235, the mandrel support structure 106 can be assembled to the mandrel 140 to provide support to the mandrel 140 during manufacturing processes. The mandrel support structure 106 is also configured to move with the mandrel 140 to subsequent systems along the manufacturing line 10. The mandrel support structure 106 can be detached from the mandrel 140 and/or mandrel segment(s) 235 when support is no longer needed, wherever that occurs along the manufacturing line 10. While the assembly station(s) 105 is shown as being after the placement station(s) 100, the assembly station(s) 105 can be before the placement station(s) 100 when the mandrel 140 is to be supported by the mandrel support structure 106 during placement operations performed at the placement station(s) 100.

When more than one assembly station(s) is included in the placement system 50, the assembly stations(s) can be programmed and/or arranged to perform parallel operations or can be programmed and/or arranged to perform a series of operations. When the assembly station(s) 105 is omitted from the placement system 50, the placement system 50 can be considered to include the pick-and-place machine(s) 130 and the cell controller 120 of the placement station(s) 100.

The mandrel 140 is configured to move relative to the placement station(s) 100, and consequently through the placement system 50. More specifically, the mandrel 140 moves in the process direction 14 relative to the placement station(s) 100. The process direction 14 is the direction the mandrel 140 and subassemblies move along the manufacturing line 10 as materials, such as the unhardened fiber-reinforced materials 152, and subassemblies, such as the structure 12, 64, become a final assembly, such as the aircraft 750 (shown in FIG. 28). At times, the mandrel 140 can move in the counter-process direction 24 to or at an angle to the process direction 14 depending on which manufacturing processes are to be completed along the manufacturing line 10. When the mandrel 140 is at the placement system 50, the placement system 50 is considered as including the mandrel 140, but, at times, the placement system 50 may not have the mandrel 140 therein. Further, the cell controller 120 is in communication with the mandrel 140 to move the mandrel 140 with respect to the placement station(s) 100.

Figure 2:
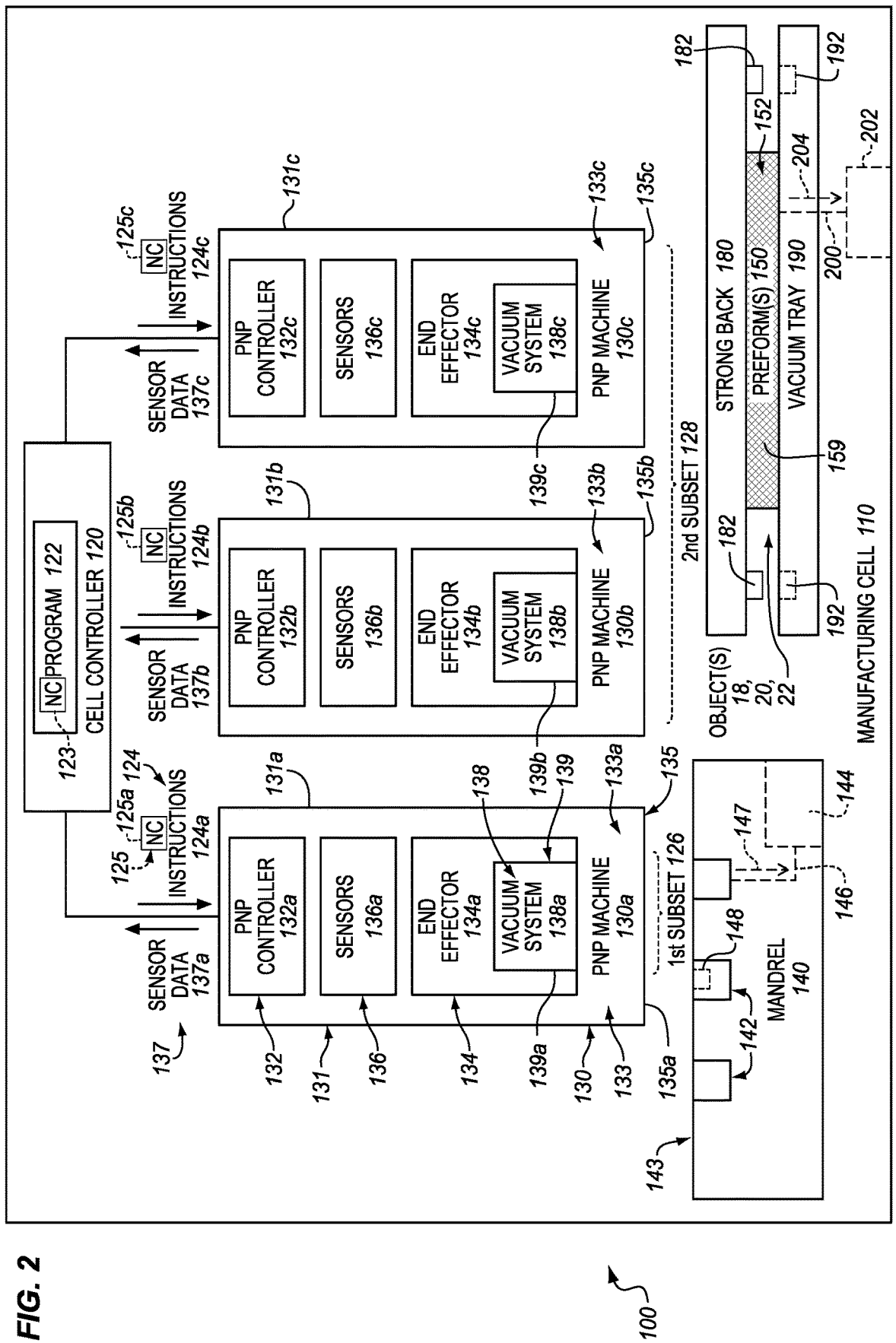
FIG. 2 is a schematic block diagram of a placement station(s) that can be used in placement system of the manufacturing line of FIG. 2 in an illustrative embodiment.

FIG. 2 is a schematic block diagram of the placement station(s) 100 that can be used in the placement system 50 shown in FIG. 1. The placement station(s) 100 is configured to coordinate the action of pick-and-place machine(s) 130 in an illustrative embodiment. Placement station(s) 100 comprises any system, device, or component operable or configured to place preforms (e.g., for stringers) onto the mandrel 140 for later hardening into an integral composite part, such as the composite part 16 (shown in FIG. 1). In this embodiment, placement station(s) 100 has been enhanced to selectively synchronize the actions of pick-and-place machine(s) 130 in order to increase the rate of placement of the preform(s) 150 onto the mandrel 140.

The placement station(s) 100 includes pick-and-place machine(s) 130 and a cell controller 120. More specifically, the placement station(s) 100 includes multiple (i.e., two or more) pick-and-place machine(s), such as three or more pick-and-place machine(s) 130a, 130b, and 130c. The pick-and-place machine(s) 130 can be divided into subsets that each have one or more pick-and-place machine(s) 130. For example, the pick-and-place machine(s) 130 are divided into a first subset 126 of pick-and-place machine(s) 130 and a second subset 128 of pick-and-place machine(s) 130. As illustrated in FIG. 2, the first subset 126 includes a first pick-and-place machine, and the second subset 128 includes a second pick-and-place machine and a third pick-and-place machine. The first subset 126 and second subset 128 are illustrated as having one pick-and-place machine and two pick-and-place machine(s) for clarity only, and each first subset 126 and second subset 128 can include any number of pick-and-place machine(s) 130, whether the pick-and-place machine(s) 130 in a subset are adjacent or not. The pick-and-place machine(s) 130 in the first subset 126 are distinct from the pick-and-place machine(s) 130 in the second subset 128. However, pick-and-place machine(s) 130 can be reassigned between the first subset 126 and the second subset 128 depending on the structure 12 (shown in FIG. 1) being assembled and/or the placement methods being performed.

The cell controller 120 is operative to control the pick-and-place machine(s) 130. More specifically, the cell controller 120 and the pick-and-place machine(s) 130 are in communicatively coupled together such that instructions 124 are communicated from the cell controller 120 to the pick-and-place machine(s) 130 and data 137 are communicated from the pick-and-place machine(s) 130 to the cell controller 120. For example, when the placement station(s) 100 includes three pick-and-place machine(s) 130a, 130b, and 130c, the cell controller 120 receives first data 137a, second data 137b, and third data 137c from each of the pick-and-place machine(s) 130a, 130b, and 130c.

The placement station(s) 100 and/or the pick-and-place machine(s) 130 are within a manufacturing cell 110. The cell controller 120 is configured to control the operations, such as placement operations, that occur with the manufacturing cell 110. The cell controller 120 is also operative to assign each pick-and-place machine(s) 130 in the manufacturing cell 110 to the first subset 126 or the second subset 128. The cell controller 120 is operative to reassign the pick-and-place machine(s) 130 to a first subset 126 and/or a second subset 128 as needed.

During assembly of the structure 12, pick-and-place machine(s) 130 pick-up and place the objects, such as the preform(s) 150, onto the mandrel 140. The preform(s) 150 can each be formed of an unhardened fiber-reinforced material 152. The preform(s) 150 discussed herein may be hardened into short stringers, medium stringers that span multiple of the pick-and-place machine(s) 130, or even long stringers that span many of the pick-and-place machine(s) 130. While objects in the form of stringer preform(s) 159 are illustrated in FIG. 1 (e.g., having internal bladders, gap fillers, and other components not shown), in further embodiments the objects may comprise any suitable components, such as other preforms, frame fillers, isolation plies, etc. Stated succinctly, the pick-and-place machine(s) 130 are disposed within reach of the discrete object(s) 20 (e.g., small preforms and/or discrete preform(s) 154, such as frame filler preform(s) 158 as shown in FIG. 5), the mandrel 140, and large objects (e.g., large preform(s) 156) that span multiple pick-and-place machine(s). Phrased another way, the pick-and-place machine(s) 130 are disposed within reach of the objects and the mandrel 140. When the objects are preform(s) 150, the pick-and-place machine(s) 130 are disposed within reach of the mandrel 140 and the preform(s) 150. And, the mandrel 140 moves with respect to the pick-and-place machine(s) 130, for example, in the process direction 14.

Each pick-and-place machine(s) 130 can be similarly configured and includes a body 131 having a lower end 133. The body 131 is configured to house the components of the pick-and-place machine(s) 130. Further, each pick-and-place machine(s) 130 includes a pick-and-place controller 132, sensor(s) 136, and end effector 134. The pick-and-place controller 132, sensor(s) 136, and end effector 134 can be positioned in and/or attached to the body 131. In some embodiments, the sensor(s) 136 are included in the body 131 and in the end effector 134.

When the placement station(s) 100 includes three pick-and-place machine(s) 130a, 130b, and 130c, the first pick-and-place machine includes a first body 131a, a first lower end 133a, one or more first sensors 136a, and a first end effector 134a. Similarly, the second pick-and-place machine includes a second body 131b, a second lower end 133b, one or more second sensors 136b, and a second end effector 134b and the third pick-and-place machine includes a third body 131c, a third lower end 133c, one or more third sensors 136c, and a third end effector 134c.

The end effector 134 can optionally move along a body 131 of the pick-and-place machine(s) 130 and/or extend and retract from the body 131 of the pick-and-place machine(s) 130. In one example, the body 131 includes a track or other device that enables the end effector 134 to move at least vertically along the body 131. Additionally or alternatively, the end effector 134 is positioned near the lower end 133 of the body 131 and at least a portion of the end effector 134 extends vertically out of the body 131. For example, the end effector 134 can move vertically to the lower end 133 of the body 131 and a portion of the end effector 134, such as the gripping system 139, extends vertically from the body 131 and retracts vertically to the body 131.

The end effector 134 includes at least a gripping system 139, such as a vacuum system 138. In an alternative embodiment, the gripping system 139 and/or the vacuum system 138 is included in the pick-and-place machine(s) 130 separately from the end effector 134. In a particular example, the pick-and-place machine(s) 130 include vacuum system 138 to apply vacuum pressure 160 (shown in FIGS. 10 and 12) that holds the large preform(s) 156 and discrete preform(s) 154. The pick-and-place machine(s) 130 has a distal end 135. The distal end 135 can be defined by the end effector 134 and/or gripping system 139 when the end effector 134 is positioned near or below the lower end 133 of the pick-and-place machine(s) 130 and/or when extended from the pick-and-place machine(s) 130.

When the placement station(s) 100 includes three pick-and-place machine(s) 130*a*, 130*b*, and 130*c*, the first pick-and-place machine includes a first distal end 135*a*, a first gripping system 139*a*, and/or a first vacuum system 138*a*. Similarly, the second pick-and-place machine includes a second distal end 135*b*, a second gripping system 139*b*, and/or a second vacuum system 138*b* and the third pick-and-place machine includes a third distal end 135*c*, a third gripping system 139*c*, and/or a third vacuum system 138*c*.

The end effector 134 can include additional components to perform operations other than gripping or can be removable and replaceable in the pick-and-place machine(s) 130 to enable a different type of end effector to be coupled to the pick-and-place machine(s) 130. The sensor(s) 136 are configured to supply the data 137 to the cell controller 120 to enable control of the associated pick-and-place machine(s) 130. The sensor(s) 136 can be a position sensor(s) (e.g., to measure or determine a position of the end effector 134 and/or pick-and-place machine(s) 130). Alternatively or additionally, the sensor(s) can be pressure sensor(s) (e.g., to measure the vacuum pressure applied by the vacuum system 138), line break sensor(s), hydraulic sensor(s), image sensor(s) (e.g., a camera), radio frequency sensor(s) (e.g., RFID and/or RADAR), light sensor(s) (e.g., LIDAR), bar code or QR code reader, etc.

During pick and placement operation, pick-and-place machine(s) 130 may operate the gripping system 139 at an end effector 134 to place the strong back 180 over an object(s) 18 disposed in the tray 190. The pick-and-place machine(s) 130 may move the object(s) 18 via the strong back 180 into position at mandrel 140, such as within a cut-out 142 of the mandrel 140 dimensioned to receive the object(s) 18. The gripping system 139 can be the vacuum system 138 that is configured to apply the vacuum pressure 160. For example, the vacuum system 138 selectively applies the vacuum pressure 160. The vacuum pressure 160 is applied to or thorough the strong back 180 to grip the object(s) 18. Alternatively, the vacuum pressure 160 is applied to the object(s) 18 when the strong back 180 is not included in the placement station(s) 100. The tray 190 can be a vacuum tray configured to apply vacuum pressure to the object(s) 18 to maintain the position of the object(s) 18 with respect to the tray 190.

Figure 22:
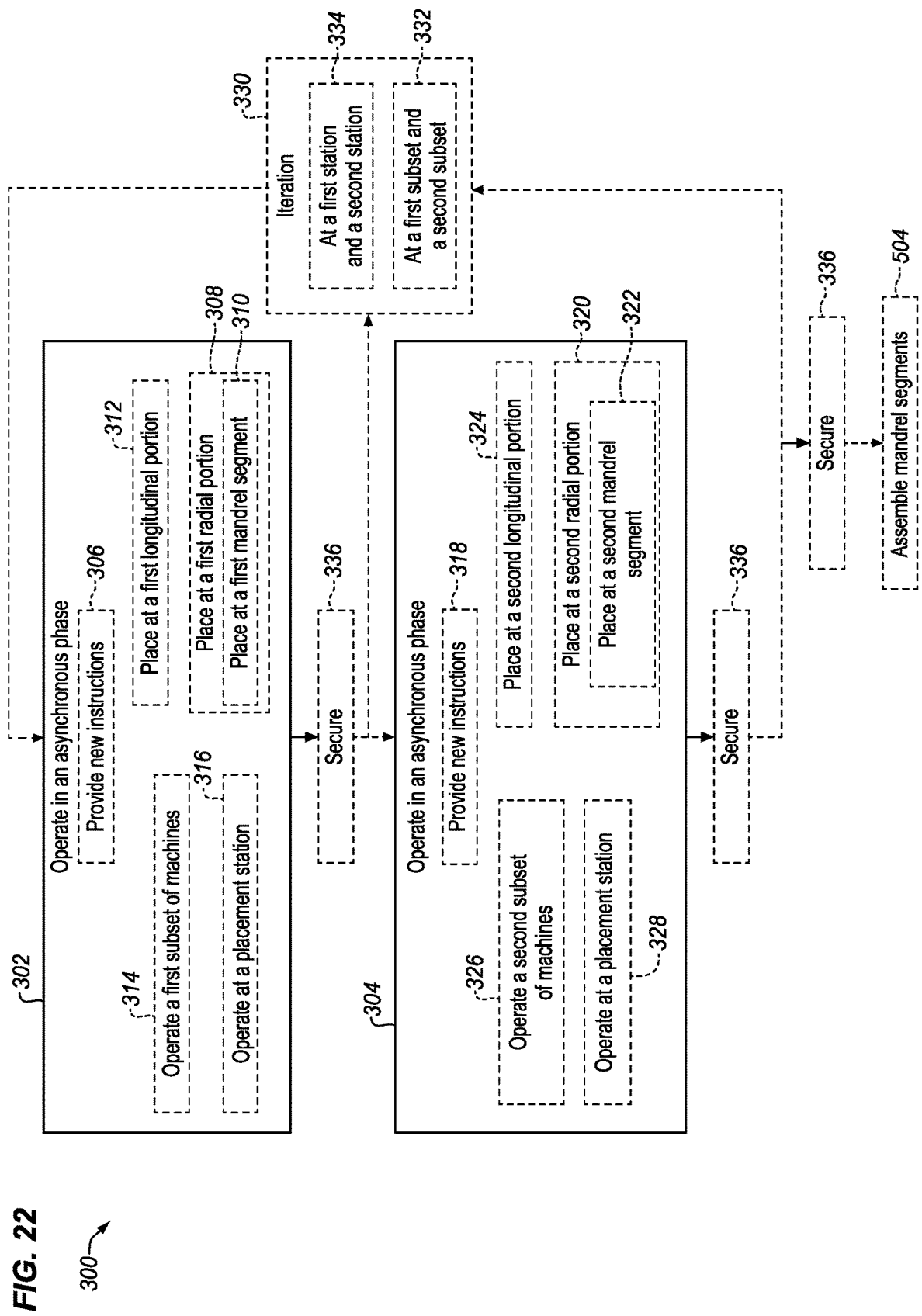
FIG. 22 is a flowchart illustrating a method for assembling a structuring using the placement system of FIGS. 1 to 3 in an illustrative embodiment.
Figure 23:
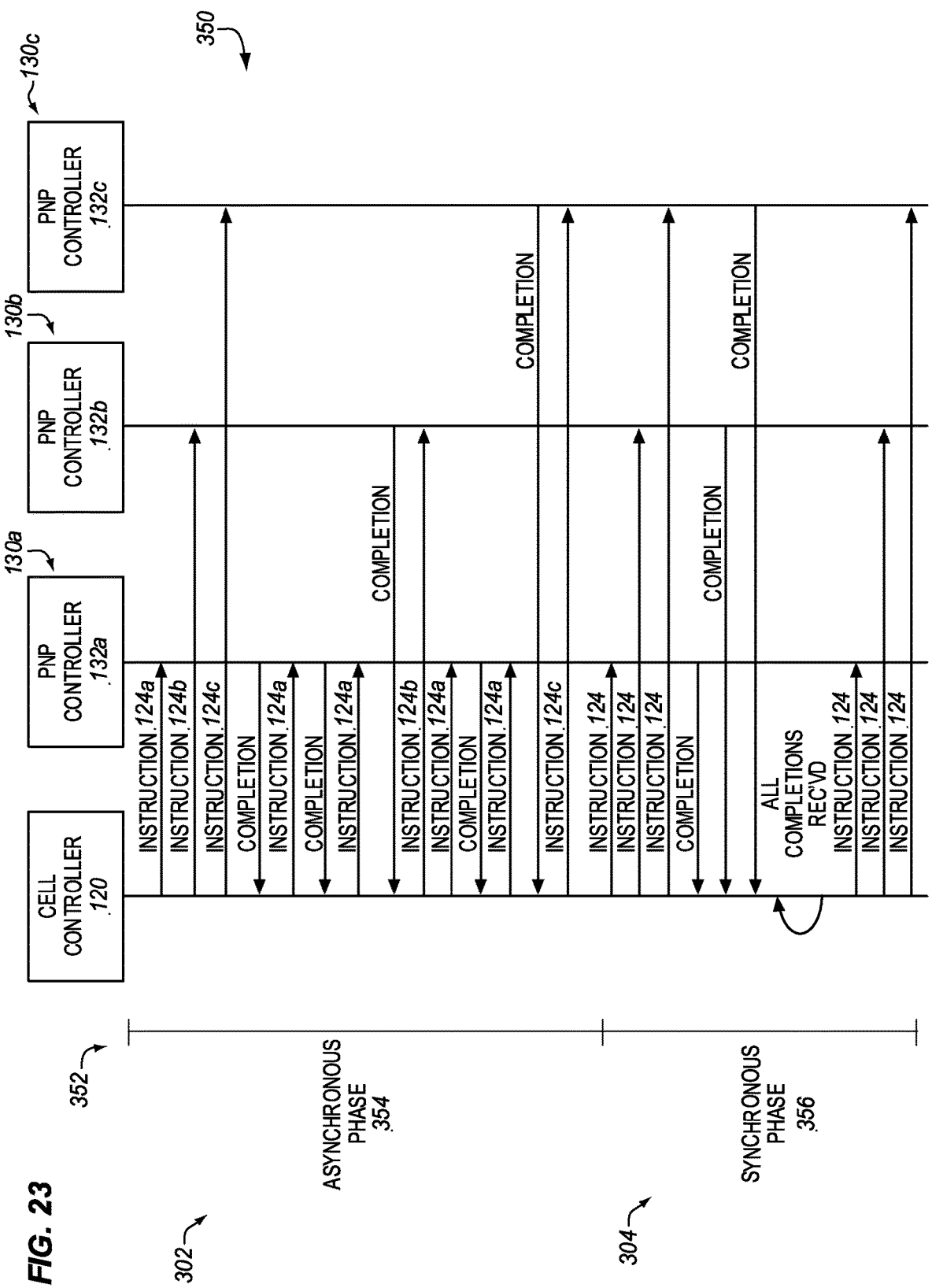
FIG. 23 is a message diagram that can be used during the method shown in FIG. 22 in an illustrative embodiment.

The cell controller 120 coordinates the actions of pick-and-place machine(s) 130 by selectively operating the pick-and-place machine(s) 130 in synchronous and asynchronous modes, as described in more detail with respect to FIGS. 22 and 23. A cyclical placement operation (e.g., cyclical placement operation 352 shown FIG. 23) includes a series of phases where the pick-and-place machine(s) 130 are operated in a particular mode during each phase. When the pick-and-place machine(s) 130 perform the cyclical placement operation, the pick-and-place machine(s) 130 are operated in the synchronous mode during a synchronous phase of a cycle, and the pick-and-place machine(s) 130 are operated in the asynchronous mode during an asynchronous phase of the cycle.

During synchronous modes, the cell controller 120 coordinates the provisioning of instructions 124 from a program 122 to multiple pick-and-place machine(s) 130. In one example, the program 122 is numerical control program 123 and the instructions 124 are NC instructions 125. The instructions 124 are a series of instructions that are sent to each pick-and-place machine(s) 130 at appropriate times. Accordingly, the instructions 124 can be formatted as a series of instructions that include a prior instruction 124 (old instructions) and a new instruction (new instructions) sent after the prior instruction 124, such as the series shown in FIG. 23. The program 122 includes sets of instructions 124 to correspond to different types of mandrels 140 and/or mandrel segment(s) 235 (shown in FIG. 21) and to different types of objects to be placed by the pick-and-place machine(s) 130. Further, the vacuum system 138 selectively applies the vacuum pressure 160 according to the program 122.

In one embodiment, cell controller 120 withholds the transmission of instructions 124 that are new to the pick-and-place machine(s) 130 until each of the pick-and-place machine(s) 130 has completed its current instruction. This enables the pick-and-place machine(s) 130 to lift, carry, and be operable to transport a large object(s) 22 (e.g., such as stringer preform(s) 159 to form a medium stringer, a long stringer, etc.) in a coordinated fashion. During asynchronous modes, the cell controller 120 provides instructions from the program 122 to each of the pick-and-place machine(s) 130 as quickly as each pick-and-place machine(s) 130 completes an operation, without waiting upon progress reports from other pick-and-place machine(s).

The first subset 126 of pick-and-place machine(s) 130 can be operated in the synchronous mode, and the second subset 128 of pick-and-place machine(s) 130 can be operated in the asynchronous mode. Alternatively, all of the pick-and-place machine(s) 130 are operated in the synchronous mode or in the asynchronous mode. In some examples, a first subset 126 and/or a second subset 128 is distributed across multiple placement stations(s) 100, 100'. For example, a first pick-and-place machine of a first subset 126 can be in the placement station(s) 100, and a second pick-and-place machine of the first subset 126 can be in the placement station(s) 100'.

When the placement system 50 includes multiple placement stations(s), such as a placement station(s) 100 and a placement station(s) 100', the cell controller 120 and/or 120' can operate the pick-and-place machine(s) 130 in the placement station(s) 100 to operate in the synchronous mode or in the asynchronous mode, and the cell controller 120' operates the pick-and-place machine(s) 130' in the placement station(s) 100' to operate in the other mode such that each placement station(s) 100, 100' operates in a different mode. The cell controller 120 and/or 120' can alternatively operate the pick-and-place machine(s) 130, 130' in multiple placement stations(s) 100, 100' to operate in the same mode.

The pick-and-place controllers 132 manage the operations of each pick-and-place machine(s) 130 and interpret received instructions 124 to control the end effector 134. The pick-and-place controllers 132 receive input from the sensor(s) 136 (e.g., vacuum sensors, position sensors, line break sensors, hydraulic sensors, LIDAR sensors, etc.) and may report the data 137 to the cell controller 120 for interpretation. Based on the data 137 from the sensor(s) 136, the cell controller 120 may pause operations, notify a technician, or modify the instructions 124 that are provided to the pick-and-place machine(s) 130. The cell controller 120 and the pick-and-place controllers 132 may be implemented, for example, as custom circuitry, as a hardware processor executing programmed instructions, or some combination thereof.

The placement station(s) 100 can further include the tray 190. The tray 190 can be moved out of the placement station(s) 100 to load preform(s) into the tray 190, or the preform(s) 150 can be loaded into the tray 190 while the tray 190 is in the placement station(s) 100. The placement station(s) 100 can further include the strong back 180. In embodiments where the pick-and-place machine(s) 130 directly holds the preform(s) 150, the strong back 180 can be moved out of the placement station(s) 100. The vacuum system 138 selectively applies vacuum pressure 160 (e.g., suction) to the strong back 180 and/or to the preform(s) 150 (e.g., directly or via the strong back 180) in accordance with instructions 124 in the program 122.

The mandrel 140 is moveable into and through the placement station(s) 100, and accordingly through the manufacturing cell 110, relative to the pick-and-place machine(s) 130. Such movement is described in more detail with respect to FIG. 3. The mandrel 140 has a contoured cross-section 143 (shown in more detail in FIG. 3). More specifically, the mandrel 140 includes cut-outs 142 that define the contoured cross-section 143 of the mandrel 140. The cut-outs 142 can be channels, grooves, recesses, or other contours that correspond to the objects that are to be placed, fabricated, and/or assembled on the mandrel 140. Optionally, the mandrel 140 may have an associated vacuum system 144 to secure the preform(s) 150 in the cut-outs 142. Vacuum channel 146 can be defined through the mandrel 140 to provide flow communication with the vacuum system 144 such that the vacuum system 144 applies a vacuum pressure 147 to a cut-out 142 via a respective vacuum channel.

The optional vacuum system is included in the placement system 50, the placement station(s) 100, and/or the mandrel 140. When the vacuum system 144 is included in the placement station(s) 100, the mandrel 140 is connected in flow communication with the vacuum system after the mandrel 140 is positioned in the placement station(s) 100 and is disconnected from the vacuum system 144 when the mandrel 140 is moved out of the placement station(s) 100. When the placement system 50 includes the assembly station(s) 105, the placement system 50 includes the vacuum system 144 so the vacuum pressure 147 can be applied at the placement station(s) 100 and the assembly station(s) 105 until the mandrel 140 moves out of the placement system 50 and is disconnected from the vacuum system 144. However, the placement system 50 could include separate vacuum systems for the placement station(s) 100 and assembly station(s) 105 such that mandrel 140 is disconnected and reconnected to vacuum systems 144 as the mandrel 140 moves from the placement station(s) 100 to the assembly station(s) 105. As an alternative to connecting and disconnecting the mandrel 140 with the vacuum system 144, the vacuum system 144 can be integrated into the mandrel 140 and moves with the mandrel 140 along the manufacturing line 10 through the various systems.

When the mandrel 140 includes mandrel segment(s) 235, each mandrel segment(s) 235 can be connected and disconnected from respective vacuum systems or a common vacuum system at the placement system 50 and/or placement station(s) 100. Alternatively, each mandrel segment(s) 235 includes a respective vacuum system that travels with each mandrel segment(s) 235.

To assist with aligning the strong back 180 to the tray 190 and to the mandrel 140, the strong back 180 includes strong back indexing elements 182, the tray 190 includes tray indexing elements 192, and the mandrel 140 includes mandrel indexing elements 148. The strong back indexing elements 182 are configured to align with the tray indexing elements 192 and the mandrel indexing elements 148. In a particular embodiment, the strong back indexing elements 182 engage with (e.g., fit into) the mandrel indexing elements 148 and the tray indexing elements 192.

Figure 3:
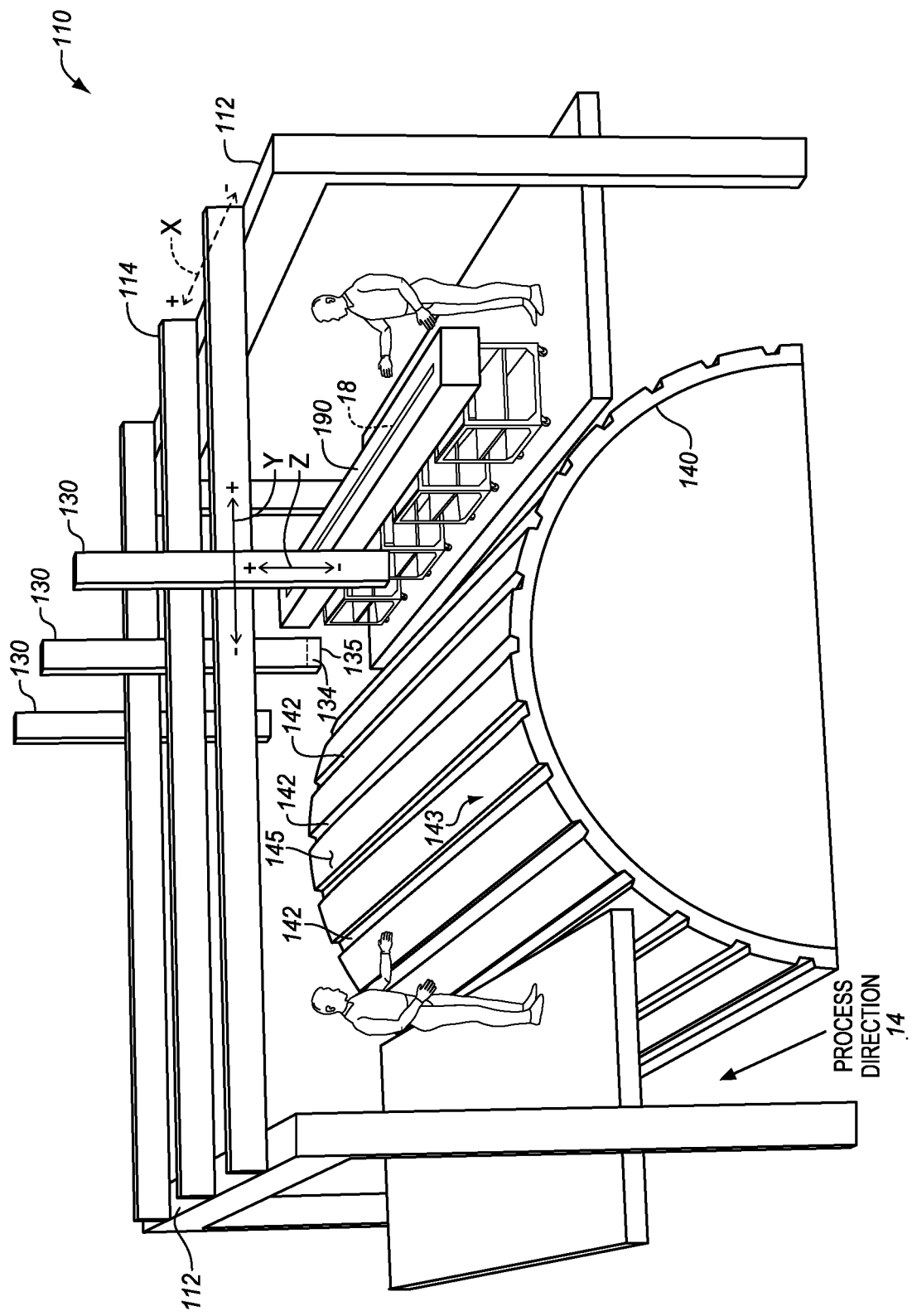
FIG. 3 is a perspective view of the placement system shown in FIG. 2 in an illustrative embodiment.

FIG. 3 is a perspective view of the placement station(s) 100 showing the pick-and-place machine(s) 130 disposed in the manufacturing cell 110 in an illustrative embodiment. The manufacturing cell 110 includes a frame 112 and supports 114. The supports 114 are coupled to the frames 112 and are configured to support the pick-and-place machine(s) 130. As shown in FIG. 3, the pick-and-place machine(s) 130 are supported by the frame 112 and supports 114. The pick-and-place machine(s) 130 travel along the frame 112 and the supports 114 in order to acquire and transport instances of preform(s) 150 (shown in FIG. 2) from the tray 190 for placement onto the mandrel 140 having the contoured cross-section 143 and the cut-outs 142 for receiving stringers.

More specifically, the pick-and-place machine(s) 130 travel in Y directions along the supports 114. The supports 114 can optionally move in X directions along the frames 112. When the supports 114 can move in the X directions on the frames 112, the program 122 in the cell controller 120 includes instructions 124 that avoid collisions between the pick-and-place machine(s) 130 and/or end effector 134. Further, the pick-and-place machine(s) 130 and/or end effector 134 are configured to move vertically in the Z direction with respect to the supports 114. In one example, the pick-and-place machine(s) 130 moves in the Z direction along a track or other device that can move the pick-and-place machine(s) 130 vertically. Alternatively or additionally, the end effector 134 and/or gripping system 139 extends and retracts in the Z direction with respect to the pick-and-place machine(s) 130 as described above. As described in more detail with respect to FIGS. 24A and 24B, at least the distal end 135 of the pick-and-place machine(s) 130 and/or the end effector 134 moves in the Y direction and Z direction, and optionally in the X direction, to be moved into place at the tray 190 and to transport an object(s) 18 from the tray 190 to the mandrel 140.

Figure 4:
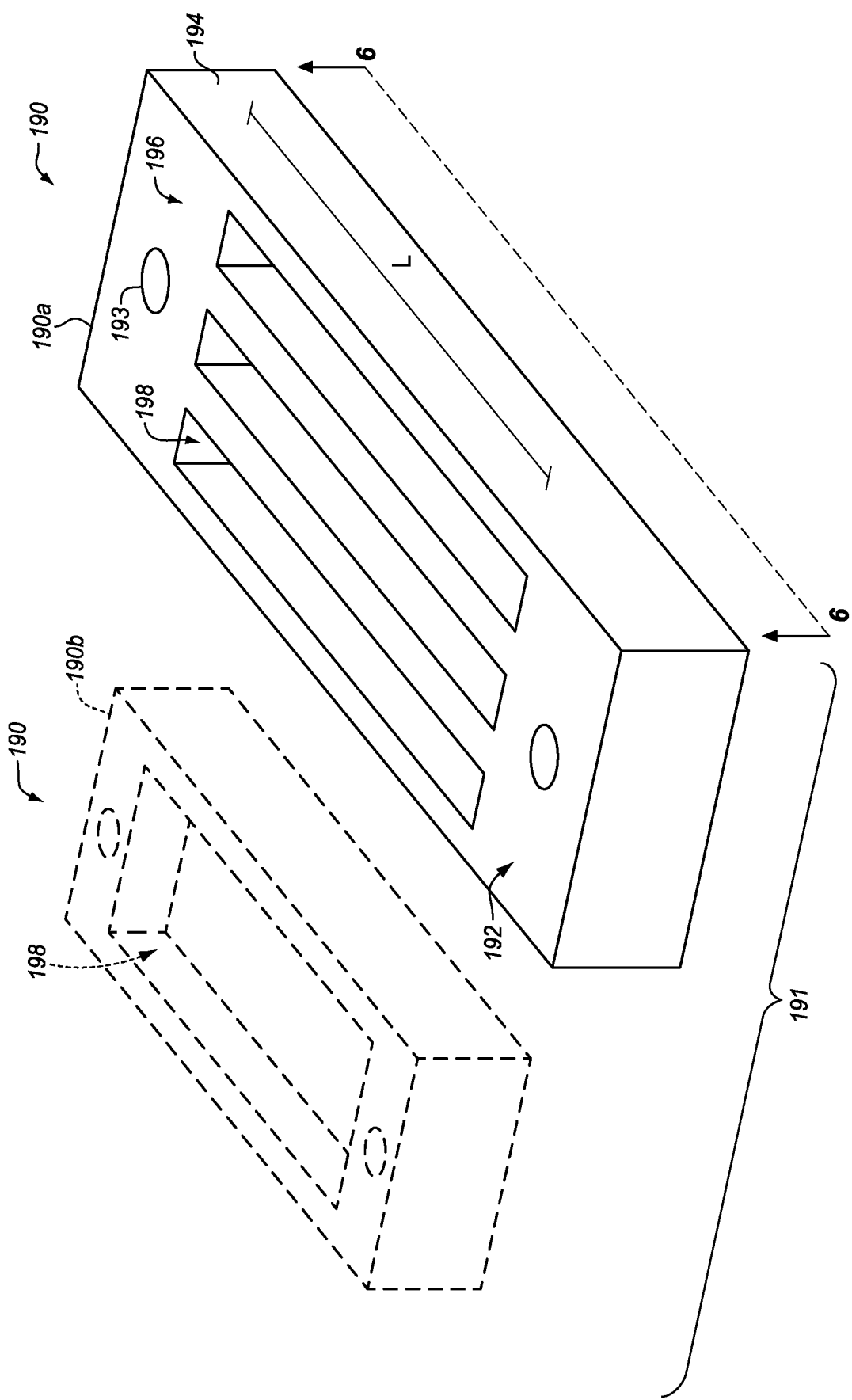
FIG. 4 is a perspective view of a first example tray that can be used with the placement system shown in FIGS. 1 to 3 in an illustrative embodiment.

FIG. 4 is a perspective view of a tray 190 that can be used with the placement system 50 shown in FIGS. 1 to 3 in an illustrative embodiment. The tray 190 is configured to hold preform(s) 150 (shown in FIG. 2) prior to application to the mandrel 140 (shown in FIGS. 1 to 3). The tray 190 stores preform(s) 150 for stringers 778 (shown in FIG. 29) or other objects, which will be placed onto the mandrel 140.

The tray 190 includes a body 194 having a surface 196 and one or more recesses 198 defined in the surface 196. The recess(es) are configured for storing the object(s) 18. The tray 190 further includes indexing cups 193 as the tray indexing elements 192. The indexing cups 193 facilitate alignment of the strong back 180 with the tray 190. The recesses 198 have a length L. In some embodiments, a layer of Fluorinated Ethylene Propylene (FEP) or another optional release film 26 (shown in FIG. 6) is positioned in the recess 198 to facilitate parting of the preform(s) 150 from the tray 190.

The tray 190 can be a first type of tray 190a that includes multiple recesses 198. Each recess 198 is configured to store a corresponding instance of preform(s) 150. Each recess 198 can be the same depth or at least one recess can be deeper or shallower than the other recesses 198. In the example shown in FIG. 4, the multiple recesses 198 are similarly configured to store multiple of the same type of preform(s) 150. For example, the tray 190a includes multiple recesses 198 that are each configured to store large preform(s) (shown in FIG. 5) such that the tray 190a stores large preform(s) 156. Alternatively, the tray 190 can be a second type of tray 190b that includes one recess. The recess 198 can store one preform or multiple preform(s) 150. When the recess 198 stores multiple preform(s) 150, the preform(s) 150 can be multiple discrete preform(s) 154 (shown in FIG. 5), multiple large preform(s), or a combination of discrete preform(s) 154 and large preform(s) 156. For example, the tray 190b can stores an array of discrete preform(s) 154 within the same recess.

The two types of trays 190a, 190b can be a set 191 of trays 190 that can be used with the placement station(s) 100. When the set 191 is used, the first type of tray 190a can store stringer preform(s) (shown in FIG. 5) and the second type of tray 190b can store frame filler preform(s) (shown in FIG. 5).

FIG. 5 is a perspective view of a tray 190 that can be used with the placement system 50 shown in FIGS. 1 to 3, including preform(s) 150 that may be placed by the placement station(s) 100. The preform(s) 150 include the large preform(s) 156 illustrated as stringer preform(s) 159 and discrete preform(s) 154 illustrated as frame filler preform(s) 158. The tray 190 of FIG. 5 is a third type of tray 190c includes recesses 198 configured to store large preform(s) and the discrete preform(s) 154. More specifically, the third type of tray 190c includes recesses 198 having a first shape 197 and a second shape 199. The first shape 197 corresponds to the discrete preform(s) 154, and the second shape 199 corresponds to the large preform(s) 156.

Having recesses of two different shapes, such as the first shape 197 and the second shape 199, allows the third type of tray 190c to store kitted instances of preform(s) 150. When kitted, the discrete preform(s) 154 are arranged for placement at locations 781 in which a frame 780 (shown in FIG. 29) is to be installed relative to the large preform(s) 156 (i.e., relative to the stringers 778 (shown in FIG. 29) formed from the stringer preform(s) 159). In other words, the discrete object(s) 20 are disposed in the tray 190c with the large object(s) 22 at locations 195 in which the frame 780 is to be installed relative to the large object(s) 22. The locations 781 of the fuselage 766 correspond to locations 195 in the tray 190 either at full scale or at a reduced scale. When the correspondence is full scale, the discrete preform(s) 154 and the large preform(s) 156 are not moved relative to each other when being transported from the tray 190 to the mandrel 140. When the correspondence is at a reduced scale, the discrete preform(s) 154 and the large preform(s) 156 can be spread farther apart to transition to full scale as the discrete preform(s) 154 and the large preform(s) 156 are moved from the tray 190 to the mandrel 140.

In the example of FIG. 5, the discrete preform(s) 154 are disposed at locations 195 in which the frame 780 is to be installed relative to the large preform(s) 156. More specifically, the frame filler preform(s) 158 are positioned at the locations 195 in the recess 198 that correspond to where a frame 780 will be located with respect to the stringers 778 formed from the stringer preform(s) 159. For example, stringer preform(s) 159 are stored in each recess 198 having the second shape 199, and frame filler preform(s) 158 are stored in the recess 198 having the first shape 197 at the locations 195.

When the preform(s) 150 are kitted, the cell controller 120 operates the pick-and-place machine(s) 130 to transport the large preform(s) 156 and the discrete preform(s) 154 while maintaining the arrangement of the large preforms(s) 156 and the preforms including discrete preforms with respect to each other. Accordingly, the kitted arrangement in the tray 190c is maintained from the tray 190c to placement on the mandrel 140.

As an alternative to kitting, an array of discrete preform(s) 154 fill the recess 198 with the first shape 197, and the pick-and-place machine(s) 130 pick each discrete preform(s) 154 from the tray 190c and place the discrete preform(s) 154 at a particular position on the mandrel 140 with respect to the large preform(s) 156 and other discrete preform(s) 154. This example enables more discrete preform(s) 154 to be stored in the tray 190c than when the discrete preform(s) 154 are spaced apart at the locations 195 in the recess 198. However, kitting the preform(s) 150 can ensure that the appropriate number of preform(s) 150 are at the placement station(s) 100 for the particular part of the structure 12 that is currently being assembled.

FIGS. 6-14 illustrate transfer of a preform(s) 150 from a tray 190 to a strong back 180, and from a strong back 180 to a mandrel 140 in an illustrative embodiment.

Figure 6:
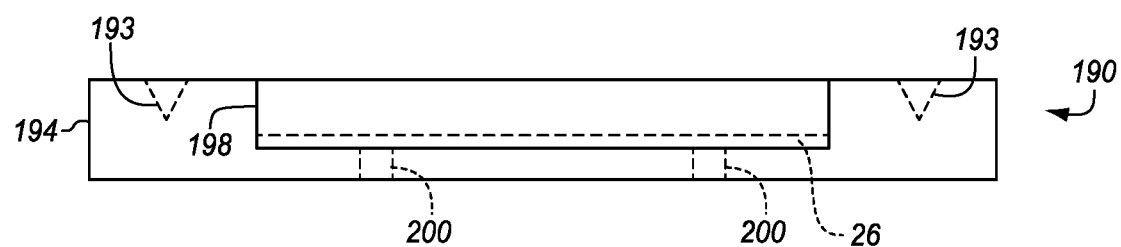
FIG. 6 is a side cross-sectional view of the trays shown in FIGS. 4 and 5 taken at line 6-6 without the preform(s) present.

FIG. 6 is a side cross-sectional view of the tray 190 shown in FIGS. 4 and 5 taken at line 6-6 without the preform(s) 150 present. In FIG. 6, the tray 190 awaits loading with an object(s) 18 (shown in FIGS. 1 and 2). Vacuum channels 200 are optional and shown in FIG. 6. Each recess 198 of the tray 190 can have one or more vacuum channels 200 extending from the recess 198 through the body 194. The vacuum channels 200 are configured to provide flow communication between the respective recess and a vacuum system 202 to apply vacuum pressure 204 (shown in FIG. 7). FIG. 6 also illustrates the optional release film 26 that can be positioned in the recess(es) to facilitate removal of the preform(s) 150 (shown in FIG. 7) from the tray 190.

Figure 7:
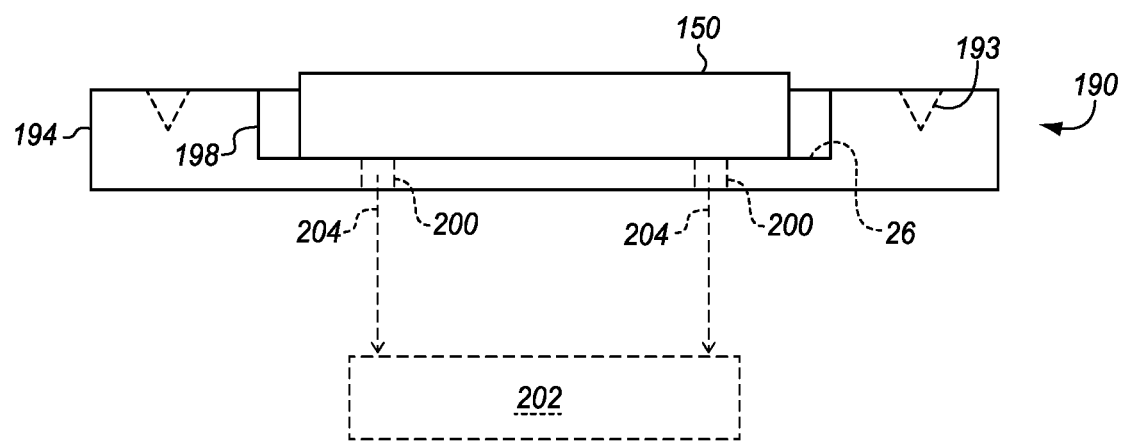
FIG. 7 is a side cross-sectional view of the tray shown in FIG. 6 having a preform, such as the preform(s) shown in FIG. 5.

FIG. 7 is a side cross-sectional view of the tray 190 shown in FIG. 6 having a preform(s) 150, such as the preform(s) shown in FIG. 5. In FIG. 7, the preform(s) 150 has been loaded into the recess 198 (e.g., by an end effector of an automated machine, by a technician, etc.). This may be performed by laying up the preform(s) 150 into the recess 198 via the operation of a tape laying machine, physically picking up the preform(s) 150 from a layup mandrel and placing the preform(s) 150 into the recess 198, etc. FIG. 7 also illustrates the vacuum pressure 204 that can be optionally applied to the preform(s) 150 positioned in the recess 198. When used, the vacuum pressure 204 is applied through the vacuum channels 200 by the vacuum system 202 (shown in FIG. 2).

Figure 8:
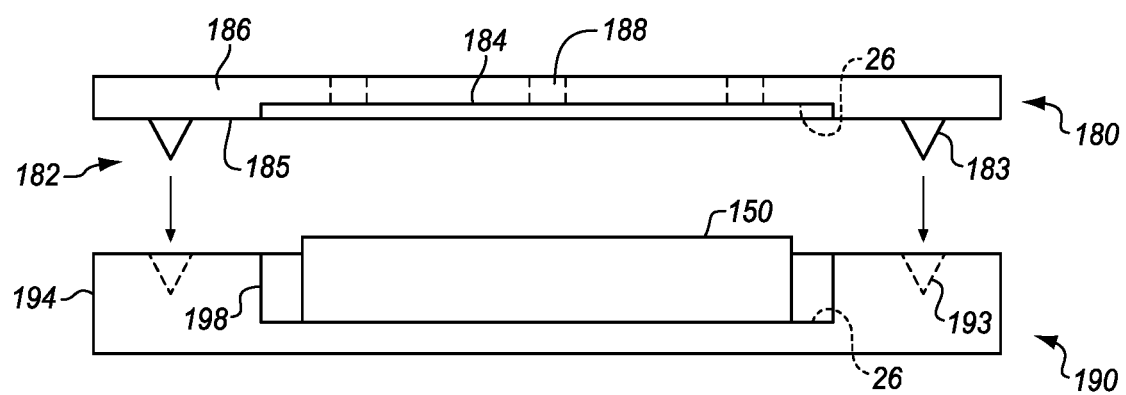
FIG. 8 is a side cross-sectional view of the tray shown in FIGS. 6 and 7 and a strong back that can be used with placement system shown in FIGS. 1 to 3.
Figure 17:
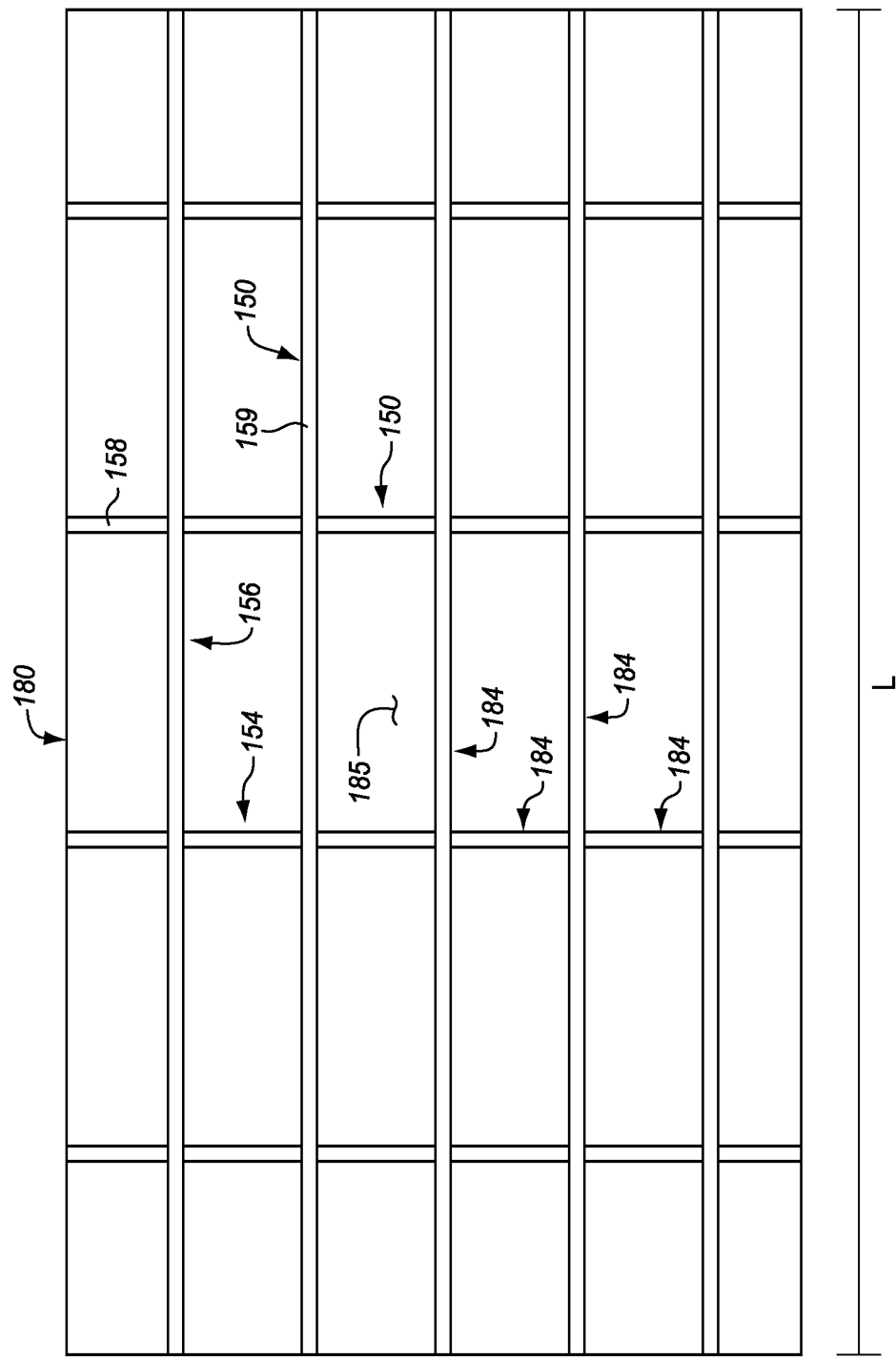
FIG. 17 is a bottom view of the strong back having the preform(s) placed thereon in an illustrative embodiment, taken at line 17-17 in FIG. 16.

FIG. 8 is a side cross-sectional view of the tray 190 shown in FIGS. 6 and 7 and a strong back 180 that can be used with placement system 50 shown in FIGS. 1 to 3. In FIG. 8, the strong back 180 is disposed over the tray 190. The strong back 180 includes a recess 184 for receiving the preform(s) 150. More specifically, the strong back 180 includes a body 186 having a surface 185 and one or more recesses 184 defined in the surface 185. The strong back 180 can include a recess 184 for each preform(s) 150 to be removed from the tray 190 and/or the same number of recesses 184 as the number of tray recesses. In a particular example, the tray 190 stores multiple preform(s) 150 and the strong back 180 includes multiple recesses 184. An example of the strong back 180 including multiple recesses 184 is shown in FIG. 17. The recess 184 may also be loaded with the optional release film 26. In further embodiments, the strong back 180 may be dimensioned to carry multiple preform(s) 150 at once from the tray 190.

The strong back 180 further includes indexing pins 183 as the strong back indexing elements 182. The indexing pins 183 are for aligning the strong back 180 with the tray 190. Each indexing of the pins 183 has a shape that corresponds to the shape of the indexing cups 193 of the tray 190. For example, each of the indexing pins 183 can be configured as a cone when the indexing cups 193 are conically-shaped holes. Accordingly, each of the indexing pins 183 can be received in respective instances of indexing cups 193 when the strong back 180 engages with the tray 190 (see FIG. 9).

Vacuum channels 188 are defined through the body 186 extending from the recess 184. The vacuum channels 188 are configured to provide flow communication between the recess 184 and the vacuum system 138 of the pick-and-place machine(s) 130 (shown in FIG. 2). The strong back 180 can include one or more vacuum channels 188 per recess 184. When the strong back 180 includes more than one recess, the strong back 180 also includes more than one vacuum channel so at least one vacuum channel is associated with each recess 184. The vacuum channels 188 are coupled with the recess 184. The vacuum channels 188 enable vacuum pressure 160 (shown in FIG. 10) applied by an end effector 134 of a pick-and-place machine(s) 130 (shown in FIG. 2) to suction the preform(s) 150 into place on the strong back 180. Each vacuum channel 188 can be operated independently or with other vacuum channels 188 depending on which types, number, and/or sizes of preform(s) 150 are being picked up by the strong back 180. For example, only vacuum channels 188 where a preform(s) 150 is being held are activated while vacuum channels 188 that do not have a preform(s) 150 associated therewith are not activated.

Figure 9:
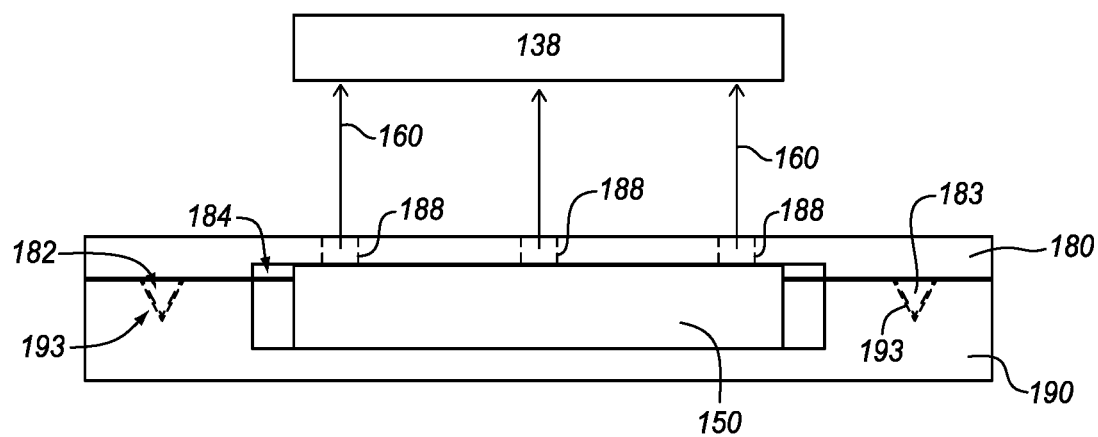
FIG. 9 is a side cross-sectional view of the strong back of FIG. 8 engaged with the tray of FIG. 8.

FIG. 9 is a side cross-sectional view of the strong back 180 of FIG. 8 engaged with the tray 190 of FIG. 8. The strong back indexing elements 182 are configured to engage with the tray indexing elements 192 as the strong back 180 moves toward the tray 190. More specifically, the indexing pins 183 of the strong back 180 are shaped to contact the indexing cups 193 of the tray 190 to guide the strong back 180 with respect to the tray 190 to align the recess(es) of the strong back 180 and the recess(es) of the tray 190.

For example, the indexing pins 183 and the indexing cups 193 are tapered, such as being conically shaped, to allow more tolerance in the misalignment between the strong back 180 and the tray 190 initially and reduce the misalignment as the strong back 180 and the tray 190 move closer together, until the indexing pins 183 are centered in the indexing cups 193 when the strong back 180 is in position with respect to the tray 190 to begin holding and lifting the preform(s) 150. Alternatively, the tray 190 includes indexing pins and the strong back 180 includes indexing cups that functions to align the tray 190 and strong back 180 as described.

When the strong back 180 is aligned with the preform(s) 150 and/or tray 190, the vacuum pressure 160 is applied through the vacuum channels 188. For example, the cell controller 120 instructs the vacuum system 138 to activate to apply the vacuum pressure 160. When the vacuum pressure 160 is applied, the preform(s) 150 is held in contact with the strong back 180. If optional vacuum pressure 204 has been applied to the preform(s) 150 through the tray 190, the cell controller 120 instructs the vacuum system 202 to deactivate and cease applying the vacuum pressure 204. Ceasing the vacuum pressure 204 at the tray 190 facilitates transferring the preform(s) 150 from the tray 190 to the strong back 180.

Figure 10:
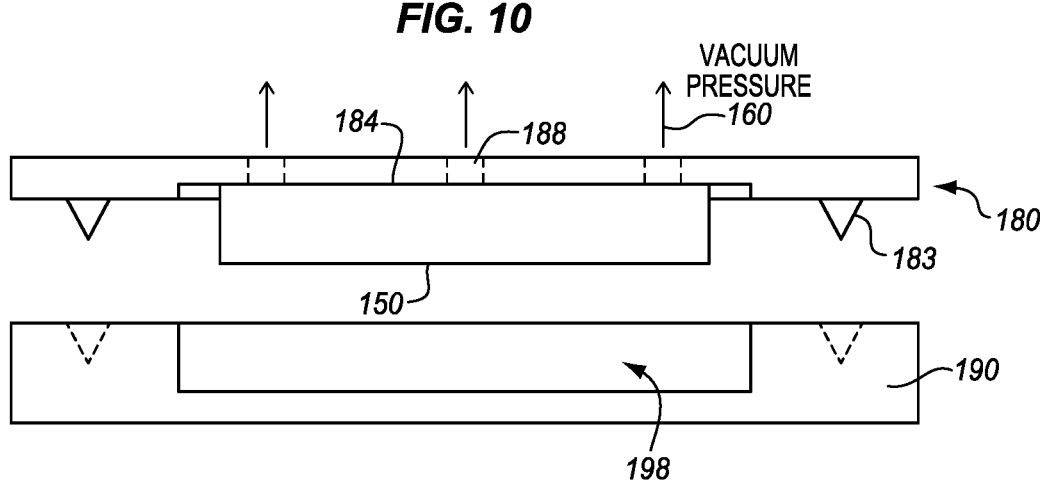
FIG. 10 is a side cross-sectional view of the strong back shown in FIGS. 8 and 9 having the preform.

FIG. 10 is a side cross-sectional view of the strong back 180 shown in FIGS. 8 and 9 having the preform(s) 150. In FIG. 10, the strong back 180 is lifted while the vacuum pressure 160 is applied, holding the preform(s) 150 and any other large preform(s) 156 and/or discrete preform(s) 154) against the strong back 180 as the strong back 180 and the preform(s) 150 are lifted away from the tray 190 (not shown in FIG. 10). As the strong back 180 is lifted away from the tray 190, the indexing pins 183 disengage from the indexing cups 193 (shown in FIG. 9).

Figure 11:
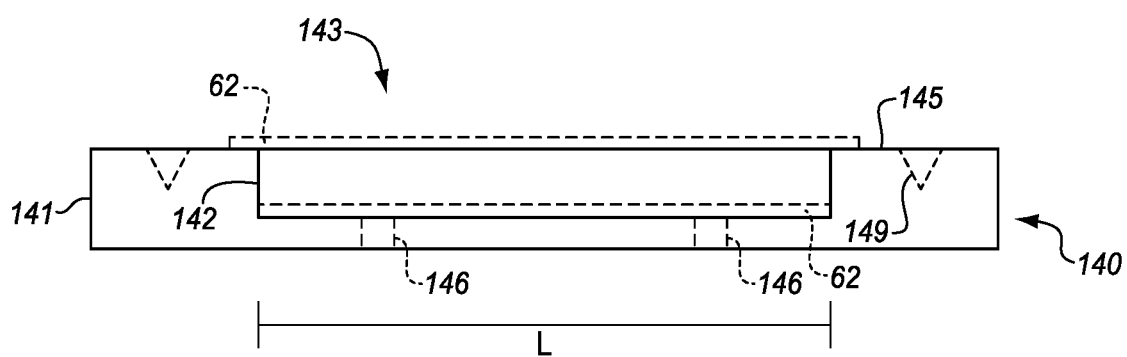
FIG. 11 is a side cross-sectional view of a mandrel that can be used with the placement system shown in FIGS. 1 to 3 and/or with the manufacturing line shown in FIG. 1.

FIG. 11 is a side cross-sectional view of the mandrel 140 that can be used with the placement system 50 shown in FIGS. 1 to 3 and/or with the manufacturing line 10 shown in FIG. 1. The mandrel 140 awaits loading from the strong back 180 (not shown in FIG. 11). The mandrel 140 includes a body 141 having an outer surface 145 of the mandrel 140. The mandrel 140 further includes a cut-out 142 defined in the outer surface 145. The cut-out 142 shown in FIGS. 11-14 can be one of many cut-outs in the mandrel 140 that are each designed to receive one or more preform(s) 150. The outer surface 145 defines at least a portion of the contoured cross-section 143 of the mandrel 140.

The outer surface 145, or at least each cut-out 142, optionally includes release film(s) 62 to facilitate removal of the preform(s) 150 and/or hardened structure 64 (shown in FIG. 1) from the mandrel 140. When release film(s) 62 are used on the mandrel 140, the release films are applied to the mandrel 140 before or at entry to the placement system 50.

The vacuum channels 146 are defined through the body 141 extending from the cut-out 142 and/or outer surface 145. The vacuum channels 146 are configured to provide flow communication between the outer surface 145 and/or cut-out 142 and the vacuum system 144 (shown in FIG. 2). The mandrel 140 can include one or more vacuum channels 146 per cut-out 142. Alternatively or additionally, the mandrel 140 can include one or vacuum channels 146 to the outer surface 145 to, for example, hold discrete preform(s) 154 against the outer surface 145. When the mandrel 140 includes more than one cut-out 142, the mandrel 140 also includes more than one vacuum channel so at least one vacuum channel is associated with each cut-out 142. The vacuum channels 146 are coupled with the cut-out 142. The vacuum channels 146 enable vacuum pressure 147 (shown in FIG. 13) applied by the vacuum system 144 to suction the preform(s) 150 into place on the mandrel 140. Each vacuum channel 146 can be operated independently or with other vacuum channels 146 depending on which types, number, and/or sizes of preform(s) 150 are placed on the mandrel 140. For example, only vacuum channels 146 where a preform(s) 150 has been placed are activated while vacuum channels 146 that do not have a preform(s) 150 associated therewith are not activated.

Figure 12:
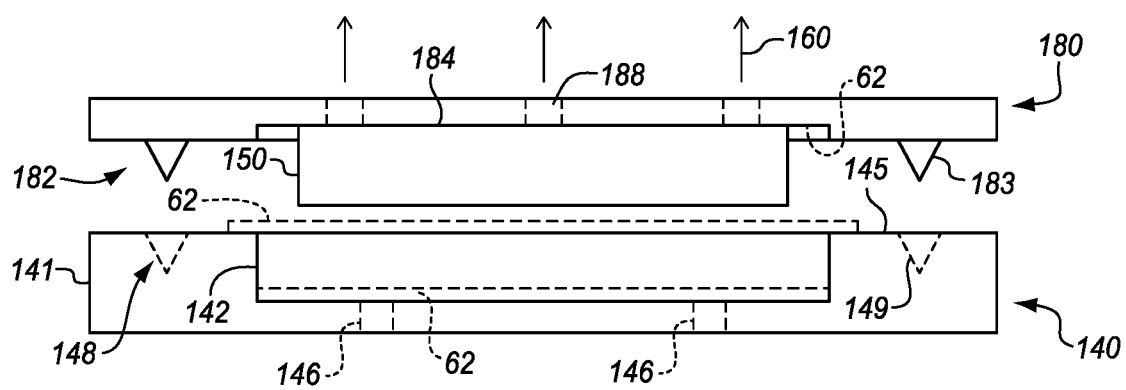
FIG. 12 is a side cross-sectional view of the mandrel, strong back, and preform shown in FIGS. 6 to 11 in an illustrative embodiment.

FIG. 12 is a side cross-sectional view of the mandrel 140, the strong back 180, and the preform(s) 150 shown in FIGS. 6 to 11 in an illustrative embodiment. In FIG. 12, the strong back 180 is moved over the mandrel 140 having one or more cut-outs 142. The strong back indexing elements 182 are configured to engage with the mandrel indexing elements 148 as the strong back 180 moves toward the mandrel 140. More specifically, the indexing pins 183 of the strong back 180 are shaped to contact the indexing cups 149 of the mandrel 140 to guide the strong back 180 with respect to the mandrel 140 to align the recess(es) of the strong back 180 and the cut-outs 142 of the mandrel 140.

For example, similar to the indexing cups 193 of the tray 190 (shown in FIG. 9), the indexing cups 149 of the mandrel 140 are tapered to allow more tolerance in the misalignment between the strong back 180 and the mandrel 140 initially and reduce the misalignment as the strong back 180 and the mandrel 140 move closer together, until the indexing pins 183 are centered in the indexing cups 149 when the strong back 180 is in position with respect to the mandrel 140 to begin placing the preform(s) 150 on the mandrel 140. Alternatively, when the tray 190 includes indexing pins and the strong back 180 includes indexing cups, the mandrel 140 includes indexing pins to engage the indexing cups of the strong back 180.

Each cut-out 142 may include its own associated copy of the indexing cups 149 for aligning with the strong back 180, or sets of the cut-outs 142 may share one or more sets of the indexing cups 149. In further embodiments, multiple preform(s) 150 are placed along a length L of a cut-out 142 side-by-side, and are mechanically integrated via scarf joints, ply ramps, or other features.

Figure 13:
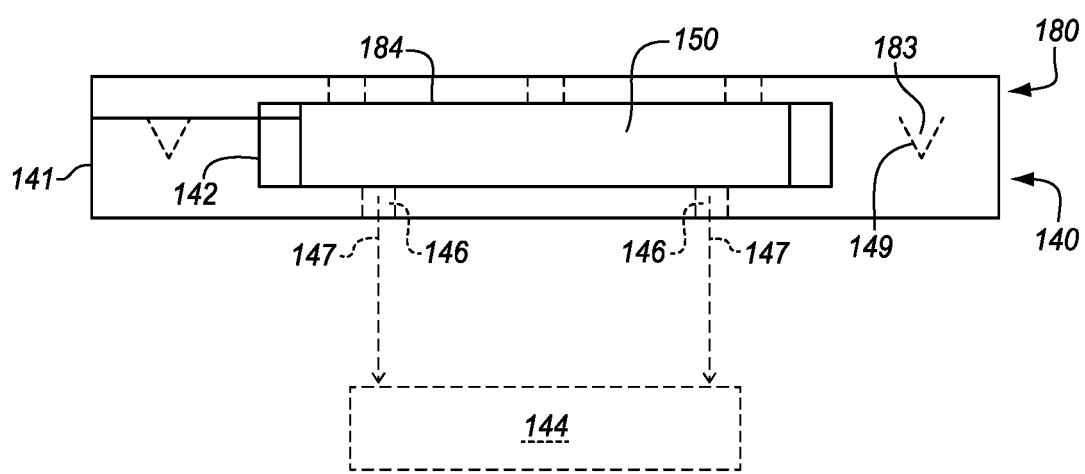
FIG. 13 is a side cross-sectional view of the mandrel, strong back, and preform shown in FIG. 12 in which the strong back and/or preform has been placed over the mandrel.

FIG. 13 is a side cross-sectional view of the mandrel 140, the strong back 180, and the preform(s) 150 shown in FIG. 12 in which the strong back 180 and/or the preform(s) 150 has been placed over the mandrel 140. When the strong back 180 is aligned with the mandrel 140, the vacuum pressure 160 through the vacuum channels 188 is released. For example, the cell controller 120 instructs the vacuum system 138 to deactivate to release the vacuum pressure 160. When the vacuum pressure 160 is released, the preform(s) 150 is placed in the cut-out 142 of the mandrel 140. Alternatively or additionally, when the vacuum pressure 160 is released, the preform(s) 150 is placed on the outer surface 145 of the mandrel 140. If optional vacuum pressure is to be applied to the preform(s) 150 through the mandrel 140, the cell controller 120 instructs the vacuum system 144 (shown in FIG. 2) to activate and apply the vacuum pressure 147. Applying the vacuum pressure 147 at the mandrel 140 facilitates securing the preform(s) 150 to the mandrel 140.

In FIG. 13, the vacuum pressure 160 is released or reversed, and the preform(s) 150 (and any other large preform(s) 156 and/or discrete preform(s) 154 (shown in FIG. 5)) is deposited in-place at the cut-out 142. In embodiments where the objects comprise preforms of unhardened fiber-reinforced material 152 (both shown in FIG. 1), the strong back 180 may be operated to secure (e.g., tack, press, consolidate, etc.) the preform(s) 150 of unhardened fiber-reinforced material 152 onto the mandrel 140. The vacuum system 144 is operated to additionally or alternatively secure the preform(s) 150 onto the mandrel 140 via the vacuum pressure 147.

Figure 14:
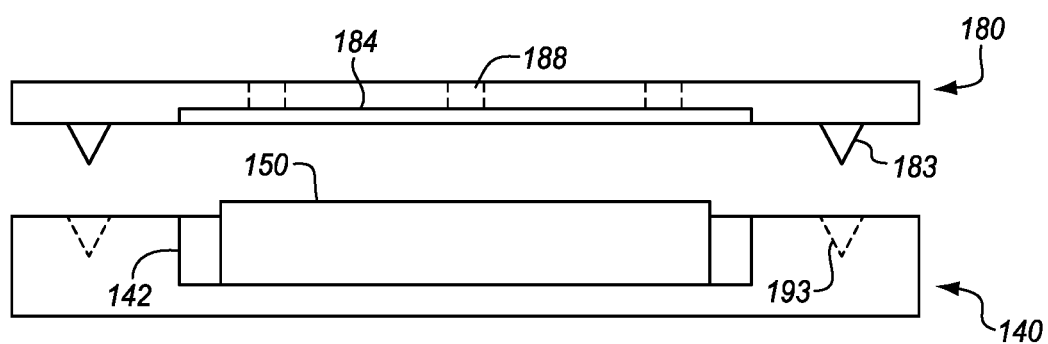
FIG. 14 is a side cross-sectional view of the mandrel, strong back, and preform shown in FIGS. 12 and 13 in which the preform has been placed in the mandrel.

FIG. 14 is a side cross-sectional view of the mandrel 140, the strong back 180, and the preform(s) 150 shown in FIGS. 12 and 13 in which the preform(s) 150 has been placed on the mandrel 140. After the vacuum pressure 160 (shown in FIG. 12) is released to place the preform(s) 150 on the mandrel 140, the strong back 180 is lifted away from the mandrel 140 by the pick-and-place machine(s) 130 (shown in FIGS. 1 to 3). As the strong back 180 is lifted, the indexing pins 183 disengage from the indexing cups 193. The pick-and-place machine(s) 130 move the strong back 180 to pick and place additional instances of preform(s) 150 from the tray 190 on to the mandrel 140 until the desired number of preform(s) 150 are placed.

Using the components of the placement station(s) 100 and techniques shown in FIGS. 6 to 14, the instructions 124 (shown in FIG. 2) in the asynchronous phase can cause each of the pick-and-place machine(s) 130 to place a strong back 180 over an object(s) 18, such as a discrete object(s) 20 (shown in FIGS. 1 and 2), apply vacuum pressure 160 that holds the object(s) 18 at the strong back 180, lift the strong back 180 into place over the mandrel 140, and release the vacuum pressure 160 to remove the object(s) 18 from the strong back 180 while the object(s) 18 contacts the mandrel 140. The instructions 124 in the synchronous phase can cause each of the pick-and-place machine(s) 130 to synchronously place the strong back 180 over the large object(s) 22 (shown in FIG. 1), apply the vacuum pressure 160 that holds the large object(s) 22 that spans the pick-and-place machine(s) 130 at the strong back 180, lift the strong back 180 into place over the mandrel 140, and release the vacuum pressure 160 to remove the large object(s) 22 from the strong back 180 while the large object(s) 22 contacts the mandrel 140.

Figure 15:
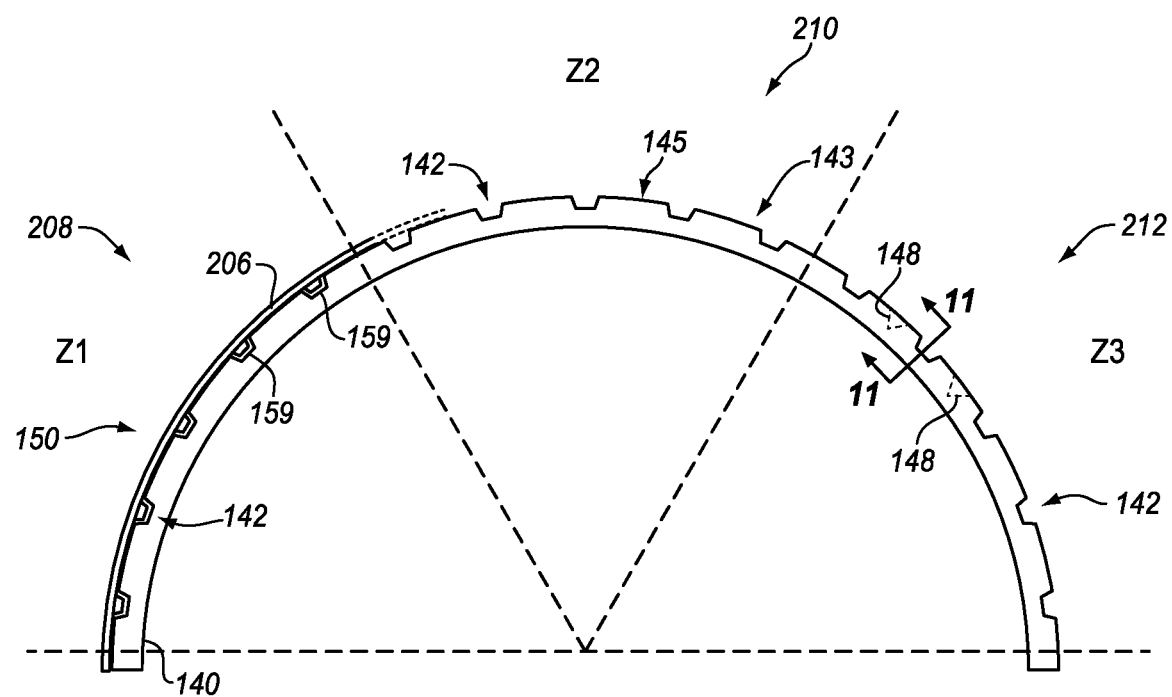
FIG. 15 is an end view of a mandrel that can be used as the mandrel shown in FIGS. 11 to 14 and/or that can be used with the placement system shown in FIGS. 1 to 3 and/or manufacturing line shown in FIG. 1 in an illustrative embodiment.

FIG. 15 is an end view of a mandrel 140 that can be used as the mandrel 140 shown in FIGS. 11 to 14 and/or that can be used with the placement system 50 shown in FIGS. 1 to 3 and/or manufacturing line 10 shown in FIG. 1 in an illustrative embodiment. For example, FIG. 15 is an end view of the mandrel 140 as illustrated in FIG. 3 and viewing a cross-section of the mandrel 140 at line 11 results in the view of the mandrel 140 of FIGS. 11 to 14. For exemplary purposes, radial zone Z1 illustrates the stringer preform(s) 159 and layer 206 after the strong back 180 has been lifted away from the mandrel 140, and radial zones Z2 and Z3 illustrate the mandrel 140 before the preform(s) 150 are placed on the mandrel 140.

The mandrel 140 has cut-outs 142 (e.g., in the form of channels) for receiving preform(s) 150 in an illustrative embodiment. The cut-outs 142 and/or outer surface 145 defines the contoured cross-section 143 of the mandrel 140. The contoured cross-section 143 is arcuate in the example of FIGS. 3 and 15 to 21. In FIG. 15, cut-outs 142 along the outer surface 145 are each intended to receive stringer preform(s) 159. Plies of material forming a skin 782 of an aircraft 750 may then be laid up as layer 206 atop the stringer preform(s) 159 and hardened, resulting in a half-barrel section 770 (or full-barrel section 776) that is a single integral piece that includes both the skin 782 and the stringers 778 for co-curing (see FIG. 29).

Figure 19:
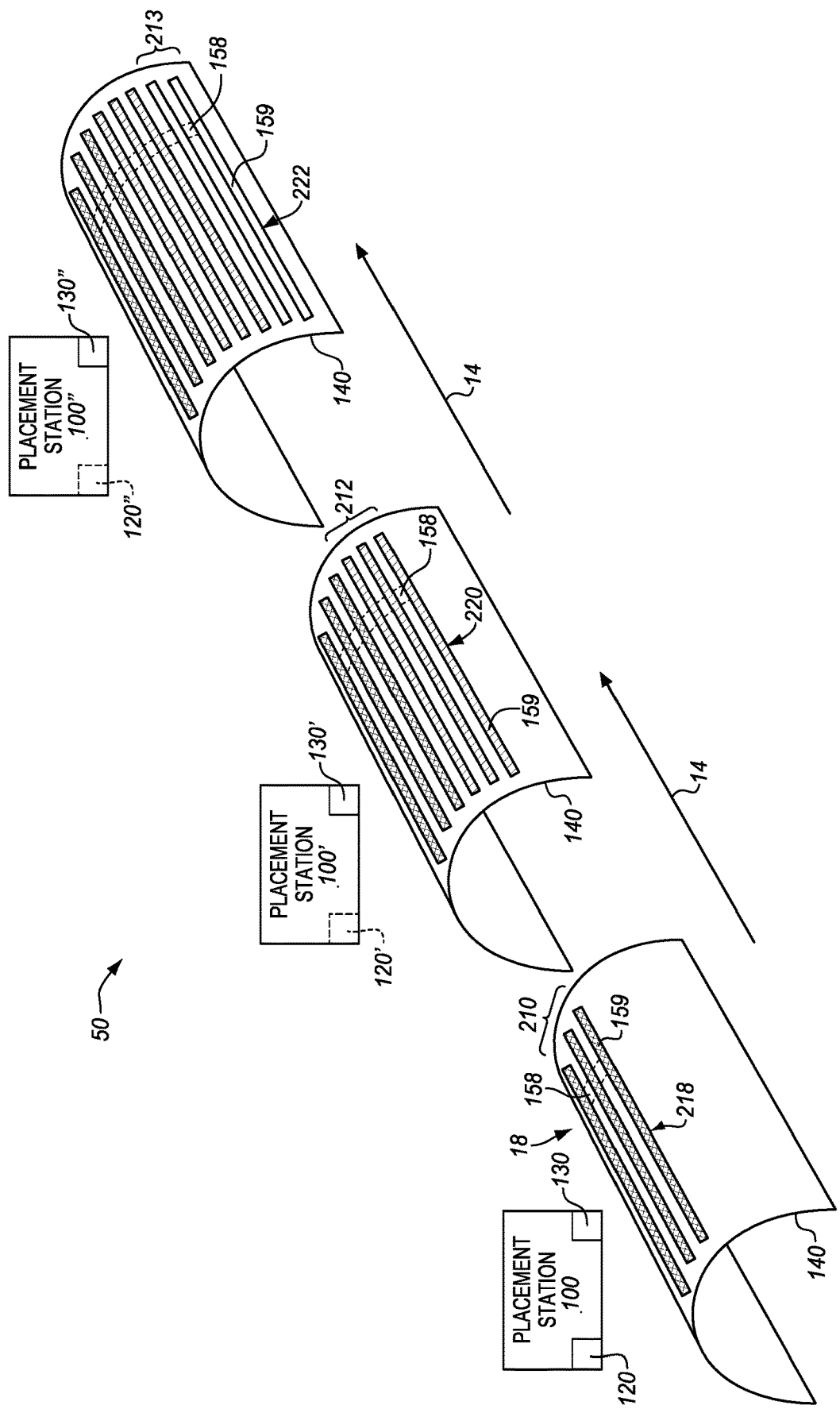
FIG. 19 is a perspective view of a first example of multiple placement stations(s) that can be used with the placement system shown in FIG. 1.

To facilitate the placement process, the mandrel 140 is divided into different radial portions 208, 210, and 212, corresponding with radial zones Z1, Z2, and Z3, respectively. The preform(s) 150 can be placed on the mandrel 140 sequentially through or in parallel at the radial zones Z1, Z2, and Z3 and/or at the different radial portions 208, 210, and 212 in the placement station(s) 100. Alternatively, the mandrel 140 may receive preform(s) 150 in different radial portions 208, 210, and 212 from different placement stations(s), as shown in FIG. 19. The example of FIG. 19 can be modified to use one or more placement stations(s) to place the preform(s) 150 in multiple zones Z1, Z2, and/or Z3 in parallel by operating multiple pick-and-place machine(s) 130 simultaneously at different radial portions 208, 210, 212. One or more different radial portions 208, 210, and/or 212 may be assigned to technicians for manual placement of the preform(s) 150. This coordinated placement across the different radial portions 208, 210, and 212 provides a technical benefit by increasing the rate of placement for preform(s) 150 onto a single mandrel.

Figure 25:
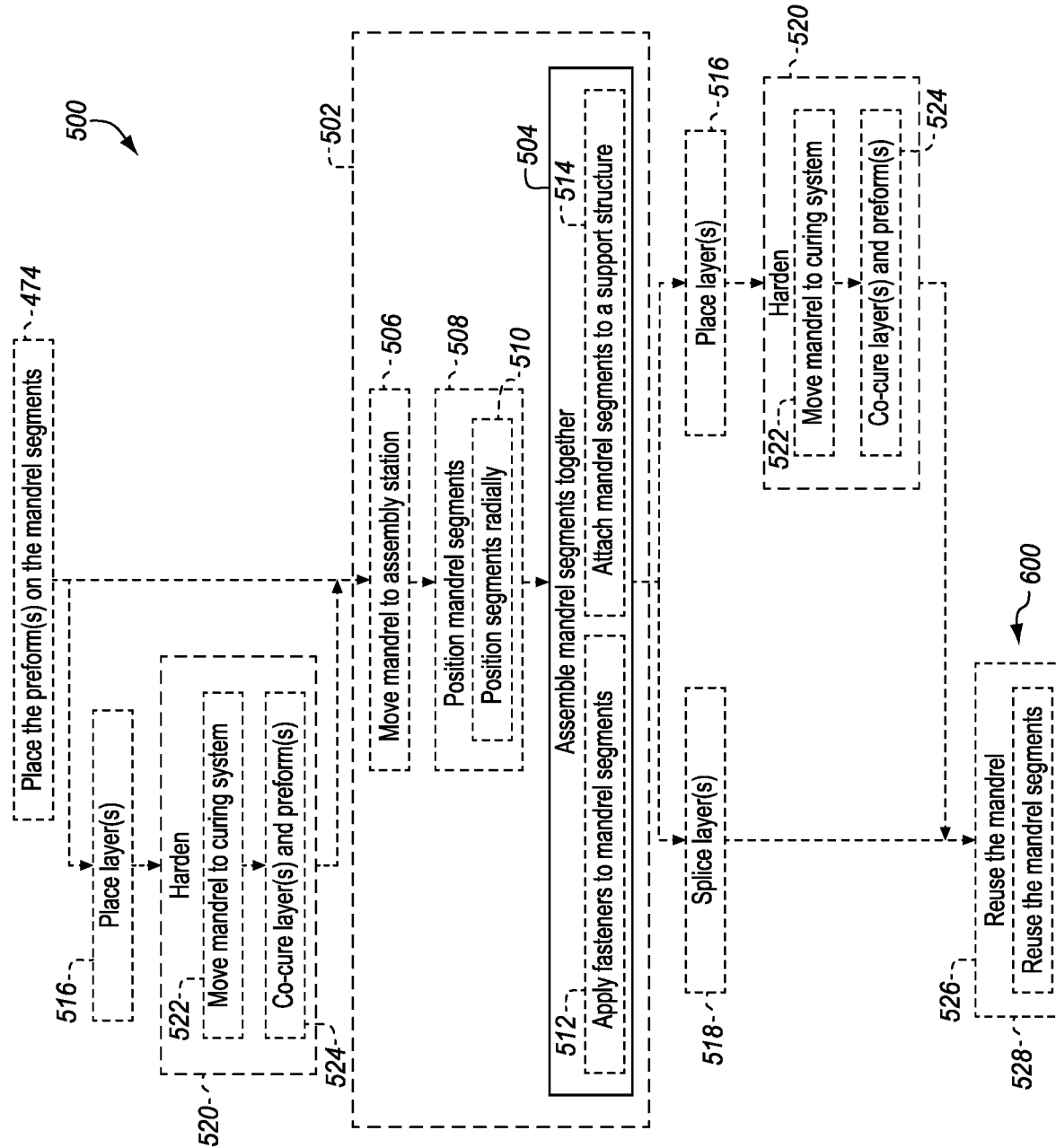
FIG. 25 is a flowchart illustrating a method for operating the placement system and/or manufacturing line shown in FIG. 1 that can be used to perform a post-placement method before or during the placement method shown FIGS. 24A and 24B in an illustrative embodiment.

When the mandrel 140 is assembled from the mandrel segment(s) 235 (shown in FIG. 21), each mandrel segment(s) 236, 238, and 240 is a different radial portions 208, 210, or 212 of the mandrel 140. Further, when the mandrel 140 is assembled from the mandrel segment(s) 235, each mandrel segment(s) 236, 238, and 240 is positioned in a different radial zone Z1, Z2, or Z3. Further details of the assembling 504 and positioning 508 are shown in FIG. 25.

Figure 16:
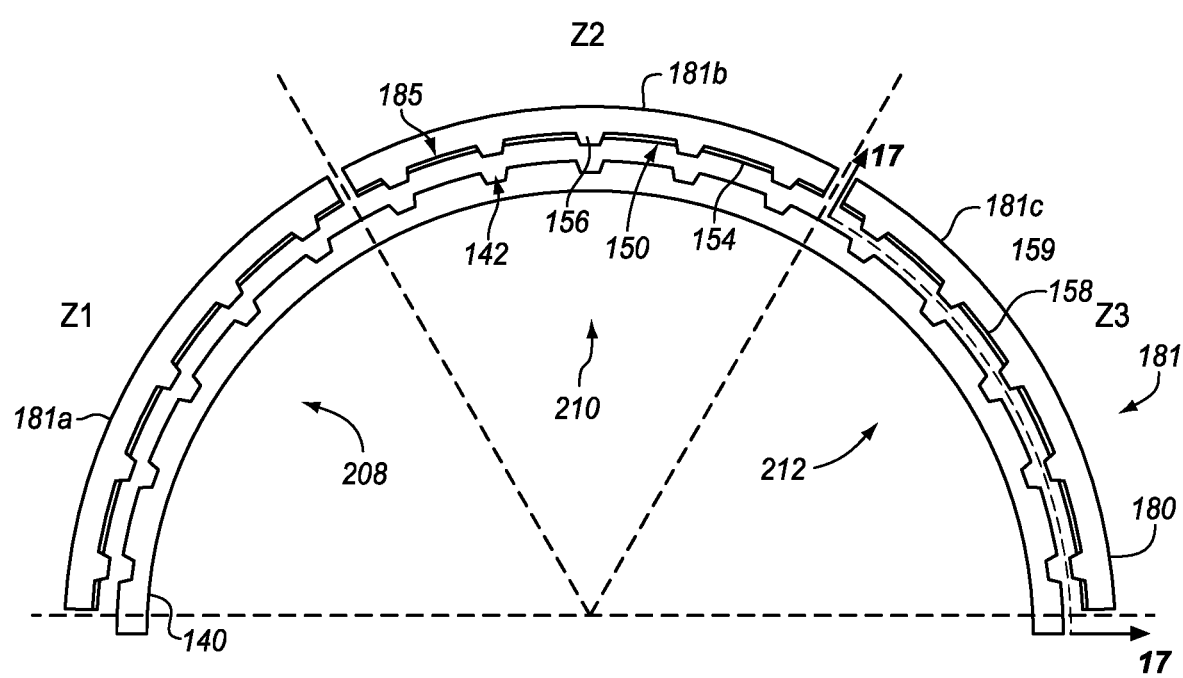
FIG. 16 is an end view of the mandrel of FIG. 15 accompanied by a strong back assembly that can be used as the strong back shown in FIGS. 8 to 10 and 12 to 14 in an illustrative embodiment.

FIG. 16 is an end view of the mandrel 140 accompanied by the strong back, in an illustrative embodiment. In this example, the strong back 180 includes strong back segments 181 and can be used as the strong back in FIGS. 8 to 10 and 12 to 14. For example, the strong back 180 includes a first strong back segment 181a, a second strong back segment 181b, and a third strong back segment 181c; however, the strong back 180 can include any suitable number of strong back segments 181. For example, the strong back 180 includes a single strong back segment that is repositioned with respect to the mandrel 140 as the preform(s) 150 are placed on the mandrel. The strong back segment 181 is moved through the radial zones Z1, Z2, and Z3 to be positioned (e.g., via transporting 408 (shown in FIGS. 24A and 24B)) in each of the different radial portions 208, 210, and 212 of the mandrel 140. Alternatively, the strong back 180 is continuous along the mandrel 140 and does not include strong back segments 181.

The cross-sectional shape of the strong back 180 corresponds to (e.g., is complementary to) the cross-sectional shape of the mandrel 140. Further, the mandrel 140 and the strong back 180 are shaped to correspond to the structure 12 being assembled by the placement system 50. More specifically, as illustrated in FIG. 16, the mandrel 140 is arcuate and the strong back 180 is arcuate. When the strong back 180 includes strong back segments 181, each strong back segment 181 is arcuate. The mandrel 140, which can be arcuate shaped, and strong back 180, which can be correspondingly arcuate shaped, can be used to assemble and/or fabricate the portion 768 of the fuselage 766 (shown in FIG. 29).

As shown in FIG. 16, the strong back 180 and/or each strong back segment 181 includes multiple preform(s) 150. For example, the strong back 180 includes large preform(s) 156 for placement within a corresponding cut-out. Furthermore, during the placement operation, the strong back 180 and/or each strong back segment 181 includes discrete preform(s) 154 at the inner surface of the strong back 180. In an exemplary embodiment, each discrete preform(s) 154 is a set of buffer plies (e.g., layers 216 of unhardened fiber-reinforced material 152 as shown in FIG. 18) forming preform pad-ups (i.e., multi-layered ply build-ups) known as "postage stamps" or "frame fillers" 784 that facilitate placement of frames 780 (shown in FIG. 29). In such an embodiment, the large preform(s) 156 are stringer preform(s) 159 and the discrete preform(s) 154 are the frame filler preform(s) 158.

FIG. 17 is a bottom view of the strong back 180 having the preform(s) 150 placed thereon in an illustrative embodiment, taken at line 17-17 in FIG. 16. FIG. 17 is an inner diameter view of the strong back 180 and/or a strong back segment 181 having discrete preform(s) 154 and large preform(s) 156. In this example, the strong back 180 includes multiple recesses 184. More specifically, the strong back 180 includes a recess 184 corresponding to each preform(s) 150 of multiple preform(s) 150 to be picked and placed using the strong back 180. Accordingly, each preform(s) 150 fits within a particular recess of the multiple recesses 184 of the strong back 180.

Frame filler preforms are arranged at discrete locations (e.g., at the recesses 184) on the inner surface along the length L of the strong back 180, while stringer preform(s) 159 are arranged parallel to the length L. In these embodiments, associated trays 190 for holding the stringer preform(s) 159 and the frame filler preform(s) 158 may include recesses 198 for both the stringer preform(s) 159 and the frame filler preform(s) 158, such as the tray 190c and frame filler preform(s) 158 and/or stringer preform(s) 159 as shown in FIG. 5.

When the vacuum pressure 160 is applied, each of the discrete preform(s) 154 is held in contact with large preform(s) 156. For example, the discrete preform(s) 154 and the large preform(s) 156 are held in contact with each other at the strong back 180 in an arrangement similar to the arrangement shown in FIG. 18.

While the recess 198 of the tray 190 (shown in FIG. 4), the cut-out 142 of the mandrel 140 (shown in FIG. 11), and the strong back 180 are all shown as having the same length L, the lengths of the recess 198, the cut-out 142, and the strong back 180 can be different from each other.

FIG. 18 is an end cross-sectional view of the mandrel 140 and preform(s) 150 shown in FIG. 17 with the strong back 180 moved away from the mandrel 140. The example illustrated in FIG. 18 includes a first stringer preform 159a and a second stringer preform 159b adjacent to the first stringer preform 159a. Each stringer preform(s) 159 is positioned in a respective cut-out in the mandrel 140. Frame filler preform(s) 158 is positioned between the first stringer preform 159a and second stringer preform 159b. In the exemplary embodiment, the stringer preform(s) 159 and the frame filler preform(s) 158 overlap at bevels 214; however, the stringer preform(s) 159 and the frame filler preform(s) 158 may abut at flat ends or be spaced apart such that a gap is defined between at least two of the preform(s) 150.

Each frame filler preform(s) 158 includes multiple layers 216 of the unhardened fiber-reinforced material 152. The multiple layers 216 create a pad-up area in the location 781 where the frame 780 is expected to be coupled to the skin 782 (shown in FIG. 29). The pad-up provided by the frame filler preform(s) 158 can enable a more straightforward frame layup configuration because padding-up regions to meet a frame 780 may be easier than adding flange joggles to a frame to meet the skin 782 or adding flange joggles to the stringers 778.

Each discrete preform(s) 154 is held in contact with large preform(s) 156, such as each frame filler preform(s) 158 being held in contact with at least one stringer preform(s). The discrete preform(s) 154 and large preform(s) 156 are held in contact via gravity. When the optional vacuum system is included in the placement system 50, the discrete preform(s) 154 and large preform(s) 156 are additionally or alternatively held in contact via the vacuum pressure 147 (shown in FIG. 2). Tactifier tape and media can be used in addition to compaction, gravity, and/or vacuum pressure 147 to maintain the positions of the preform(s) 150 with respect to each other throughout the placement operation and subsequent operations.

The structure 12 can optionally include one or more layers 206 over multiple preform(s) 150, such as discrete preform(s) 154 and/or large preform(s) 156, disposed on the mandrel 140. Consequently, the one or more layers 206 is laid up atop the mandrel 140. The layer 206 is formed of the unhardened fiber-reinforced material 152 and as such, the preform(s) 150 can be considered as including the layer 206 as a type of preform. When the structure 12 is the portion 768 of the fuselage 766, the one or more layers 206 form the skin 782 of the fuselage 766 (see FIG. 29). Accordingly, the layer 206 can also be referred to as a "skin layer". When the structure 12 includes the layer 206, the cell controller 120 is operable to place the layer 206 over the preform(s) 150 disposed on the mandrel 140.

Figure 20:
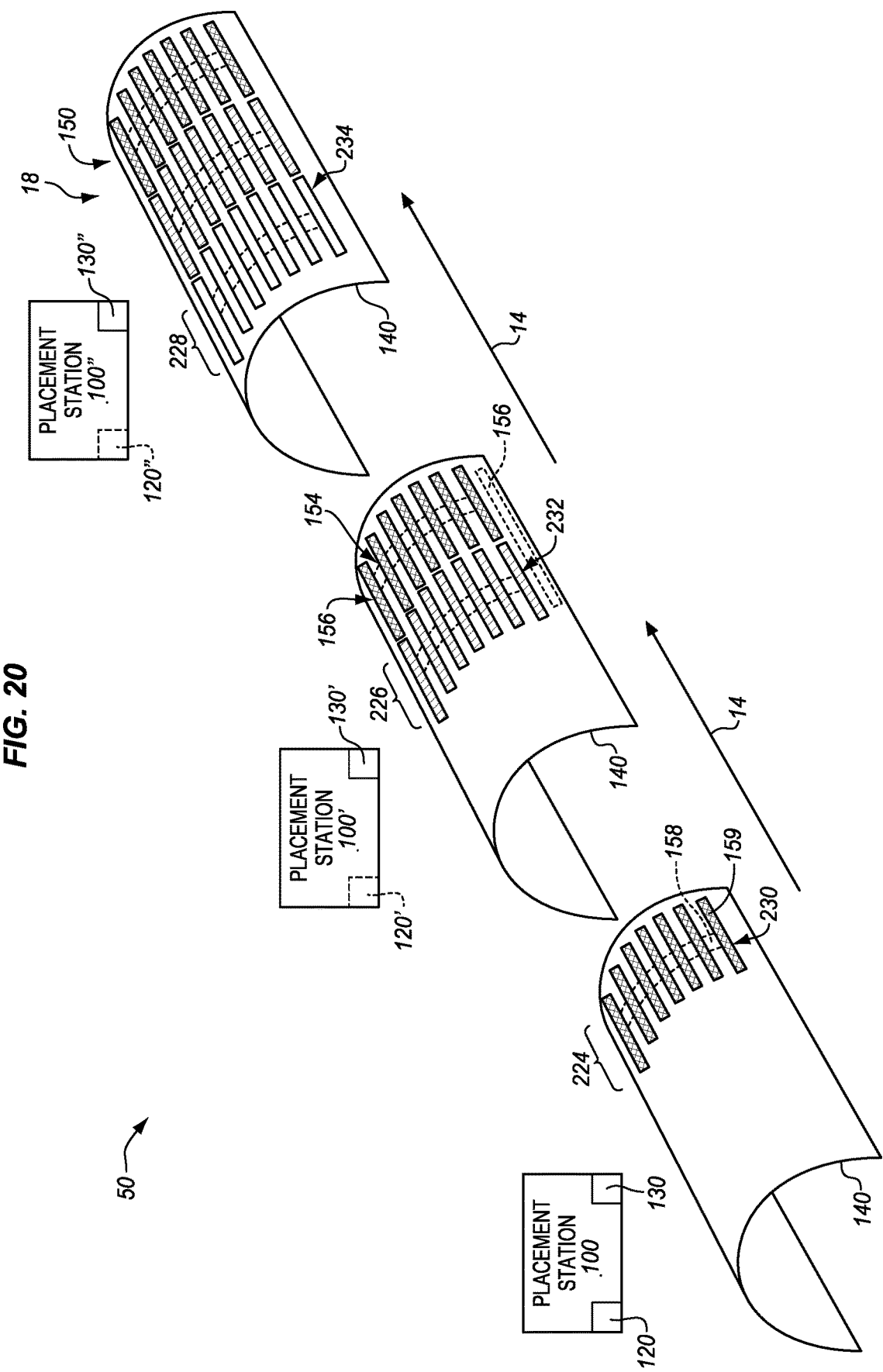
FIG. 20 is a perspective view of a second example of multiple placement stations(s) that can be used with the placement system shown in FIG. 1.
Figure 21:
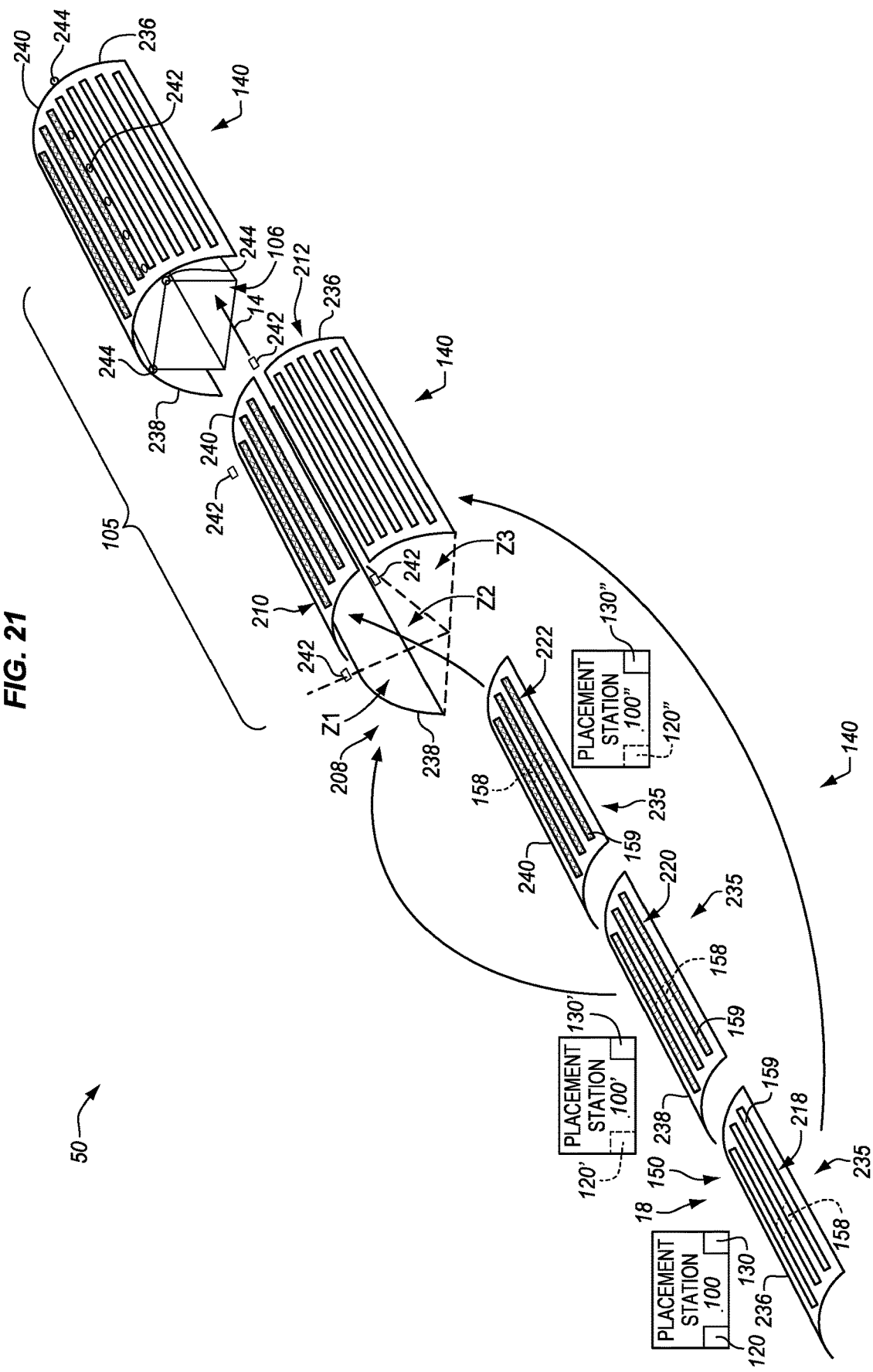
FIG. 21 is a perspective view that illustrates arrangement of placements stations(s), an assembly station(s), and mandrel segments that can be used in the placement system of FIG. 1 in an illustrative embodiment.

FIGS. 19 to 21 illustrate arrangements of placements stations(s), such as a placement station(s) 100, a placement station(s) 100', and a placement station(s) 100", that place the preform(s) 150 on different portions of the mandrel 140, in illustrative embodiments. In the following descriptions, the pick-and-place machine(s) 130 can be distributed across multiple placement stations(s) 100, 100', 100", and the cell controller 120, 120', and/or 120" iteratively operates the pick-and-place machine(s) 130, 130', 130" at each of the placement stations(s) 100, 100', 100" in the synchronous phase and asynchronous phase. In one example, each of the placement stations(s) 100, 100', 100" operates pick-and-place machine(s) 130, 130', 130" to place objects onto a different radial portions 208, 210, 212, or 213 of the contoured cross-section 143 of the mandrel 140. In another example, each of the placement stations(s) 100, 100', 100" may operate pick-and-place machine(s) 130, 130', 130" to place objects onto different longitudinal portions 224, 226, and/or 228 (shown in FIG. 20) of the mandrel 140.

FIG. 19 is a perspective view of a first example of multiple placement stations(s) 100, 100', and 100" that can be used with the placement system 50 shown in FIG. 1. Specifically, FIG. 19 illustrates the placement system 50 wherein placement stations(s) 100, 100', and 100" operate the pick-and-place machine(s) 130, 130', and/or 130" to place the preform(s) 150 into different radial portions 208, 210, and 213 of the mandrel 140. This results in the mandrel 140 having a first group 218 of stringer preform(s) 159 placed by the placement station(s) 100, a second group 220 of stringer preform(s) 159 placed by the placement station(s) 100', and a third group 222 of stringer preform(s) 159 placed by the placement station(s) 100". Frame filler preform(s) 158 can optionally be placed with each of the first group 218, the second group 220, and the third group 222 of stringer preform(s) 159.

This embodiment facilitates pulsed-line fabrication or continuously moving fabrication by enabling different placement stations(s) in the process direction 14 to place different instances of preform(s) 150, such as stringer preform(s) 159, in different radial portions 210, 212, and 213 of the mandrel 140 as the mandrel 140 moves in the process direction 14 with respect to the placement stations(s) 100, 100', and 100".

FIG. 20 is a perspective view of a second example of multiple placement stations(s) 100, 100', 100" that can be used with the placement system 50 shown in FIG. 1. In this example, the mandrel 140 is divided into a first longitudinal portion, a second longitudinal portion, and a third longitudinal portion; however, the mandrel 140 can be divided into any suitable number of longitudinal portions, depending on the size of the mandrel 140, the size of the objects, and/or the number and positions of the objects. Objects, such as preform(s) 150, can be placed in the different longitudinal portions 224, 226, and/or 228 when the object(s) 18 (e.g., preform(s) 150 or large preform(s) 156) are shorter than the length of the mandrel 140 or can be divided longitudinal segments that are shorter than the length of the mandrel 140 such that the objects can fit the length of the different longitudinal portions 224, 226, and/or 228.

More specifically, FIG. 20 illustrates the placement system 50 wherein placement stations(s) 100, 100', 100" operate the pick-and-place machine(s) 130, 130', and/or 130" to place objects, such as preform(s) 150, onto different longitudinal portions 224, 226, and/or 228 of the mandrel 140. For example, the placement station(s) 100 places a first group 230 of preform(s) 150 in the first longitudinal portion, the placement station(s) 100' places a second group 232 of preform(s) 150 in the second longitudinal portion, and the placement station(s) 100" places a third group 234 of preform(s) 150 in the third longitudinal portion. The first group 230, the second group 232, and/or the third group 234 of preform(s) 150 includes large preform(s) 156 (e.g., stringer preform(s) 159). Alternatively or additionally, each of the first group 230, the second group 232, and/or the third group 234 of preform(s) 150 includes one or more large preform(s) 156 (e.g., stringer preform(s) 159) and one or more discrete preform(s) 154 (e.g., frame filler preform(s) 158). Accordingly, each placement station(s) 100, 100', and 100" can place stringer preform(s) 159 and frame filler preform(s) 158 in different longitudinal portions 224, 226, and/or 228 depending on the structure 12 (shown in FIG. 1) being assembled.

Further, any of the large preform(s) 156 can span more than one of the different longitudinal portions 224, 226, and/or 228. When the large preform(s) 156 extend to or through different longitudinal portions 224, 226, and/or 228, any suitable placement station(s) can place the large preform(s) 156. For example, when the large preform(s) 156 spans the first longitudinal portion and the second longitudinal portion, the placement station(s) 100 or the placement station(s) 100' can place the large preform(s) 156.

Figure 29:
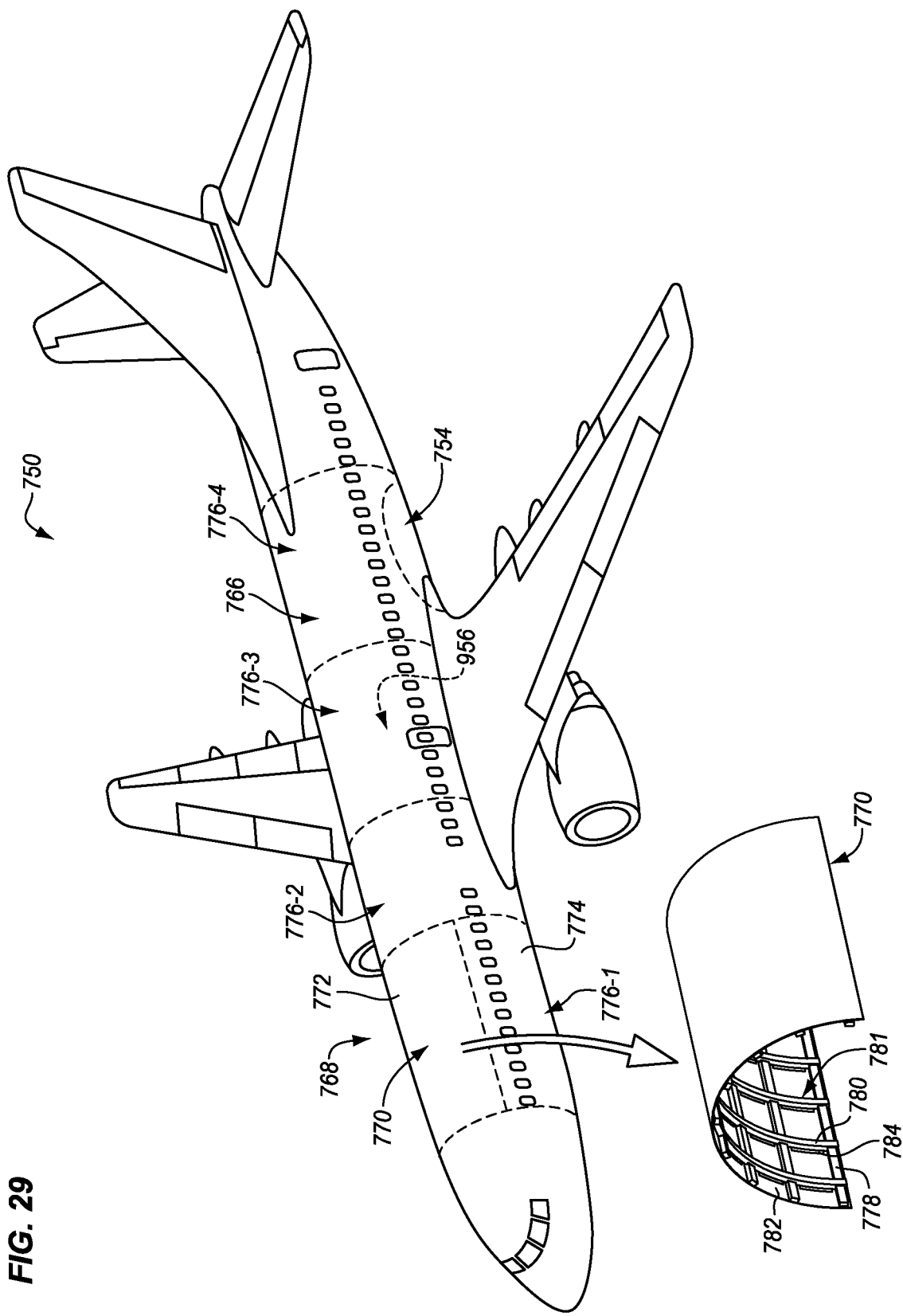
FIG. 29 is a perspective view of the aircraft shown in FIG. 28.

This example can result in the mandrel 140 having the first group 230 of stringer preform(s) 159 placed by the placement station(s) 100, the second group 232 of stringer preform(s) 159 placed by the placement station(s) 100', and the third group 234 of stringer preform(s) 159 placed by the placement station(s) 100" to assemble stringers 778 (shown in FIG. 29). The preform(s) 150 that cross different longitudinal portions 224, 226, and/or 228 may be integrated together via any suitable splicing techniques, such as scarf joints, lap splices, or step lap splices. This segmented approach lends itself to pulsed or continuously moving fabrication environments, as each of the first group 230, the second group 232, and the third group 234 of stringer preform(s) 159 can be added at a series of placement stations(s) 100, 100', 100" of the manufacturing line 10 (shown in FIG. 1).

FIG. 21 is a perspective view that illustrates arrangement of placement stations(s) 100, 100', and 100" and the assembly station(s) 105 that can be used in the placement system 50 of FIG. 1 in an illustrative embodiment. FIG. 21 also is a perspective view of mandrel segment(s) 235 that can be used with the mandrel 140 of any preceding figure. The mandrel 140 includes multiple mandrel segment(s). The mandrel segment(s) 235 include a mandrel segment(s) 236, a mandrel segment(s) 238, and a mandrel segment(s) 240. Although three mandrel segments are described herein, the mandrel 140 can include any suitable number of mandrel segment(s) 235. Each mandrel segment(s) 235 includes the above-described components and features of the mandrel 140, such as the cut-outs 142, the contoured cross-section 143, the optional vacuum system, the outer surface 145, the vacuum channels, and/or the mandrel indexing elements 148 (e.g., the indexing cups 149) shown in FIGS. 2, 3, and 11-16.

More specifically, FIG. 21 illustrates the placement system 50 wherein the placement stations(s) 100, 100', and 100" operate to place objects, such as preform(s) 150, onto mandrel segment(s) 236, 238, and 240 of the mandrel 140. At the placement stations(s) 100, 100', and 100", objects, such as preform(s) 150, are placed in a respective mandrel segment(s) by the pick-and-place machine(s) 130; 130', and 130". More specifically, the placement station(s) 100 places the first group 218 of preform(s) 150 on to the mandrel segment(s) 236, the placement station(s) 100' places the second group 220 of preform(s) 150 on to the mandrel segment(s) 238, and the placement station(s) 100" places the third group 222 of preform(s) 150 on to the mandrel segment(s) 240. As discussed above, each of the first group 218, the second group 220, and the third group 222 can include one or more stringer preform(s) 159 and/or one or more frame filler preform(s) 158.

Each mandrel segment(s) 236, 238, and 240 corresponds to a respective radial portion of the mandrel 140. For example, the mandrel segment(s) 236 corresponds to the third radial portion, the mandrel segment(s) 238 corresponds to the first radial portion, and the mandrel segment(s) 240 corresponds to the second radial portion. However, the correspondence of each mandrel segment(s) 236, 238, or 240 to different radial portions 208, 210, or 212 can be any suitable assignment depending on the structure 12 (shown in FIG. 1) being assembled and the processes being performed by the placement system 50. Accordingly, placing objects onto different corresponding mandrel segments, such as the mandrel segment(s) 236, the mandrel segment(s) 238, and/or the mandrel segment(s) 240, can be considered placing the objects onto different radial portions 208, 210, and 212 of the mandrel 140.

One or more cell controllers 120, 120', and/or 120" include all or part of the program 122 having the instructions 124 (shown in FIG. 2). The program 122 includes instructions 124 corresponding to each mandrel segment(s) 236, 238, and 240. The pick-and-place machine(s) 130, 130', and 130" receive the instructions 124 from the program 122 corresponding to a particular mandrel segment at the placement station(s) 100, 100', or 100" where the pick-and-place machine(s) 130, 130', or 130" are operating.

The mandrel segment(s) 235 (also known as "segments" or "segmented mandrels") are assembled into the mandrel 140 having different radial portions 208, 210, and 212 that each correspond with a different one of the mandrel segment(s) 238, 240, and 236. That is, the mandrel segment(s) 236, 238, and 240 may be fastened together to form the mandrel 140 using fasteners 242.

Further, seals can be installed between adjacent mandrel segment(s). For example, the seals between the mandrel segment(s) 235 are installed last. In one example, the mandrel segment(s) 236 and 238 are in place prior to assembling the mandrel segment(s) 240 so the seals care pressed normal rather than at an angle.

For example, after the pick-and-place machine(s) 130, 130', 130" have completed instructions 124 in the program 122, the mandrel segment(s) 235 move from the placement stations(s) 100, 100', 100" to the assembly station(s) 105. As the mandrel segment(s) 236, 238, and 240 move from the placement stations(s) 100, 100', and 100", each mandrel segment(s) 236, 238, and 240 is moved to a respective radial zone Z3, Z1, or Z2. More specifically, due to the correspondence between the mandrel segment(s) 236, 238, and 240 and the different radial portions 212, 208, and 210, each mandrel segment(s) 236, 238, and 240 is positioned in a respective radial zone Z3, Z1, or Z2 when the mandrel 140 is assembled from the mandrel segment(s) 236, 238, and 240. The mandrel segment(s) 236, 238, and 240 can be moved to any suitable radial zone Z1, Z2, or Z3 in any order to assemble the mandrel 140.

In one embodiment, the mandrel segment(s) 235 are used as a tray-like transport device. The mandrel segment(s) 235 are then coupled together, such as by fastening, bolting, affixing, etc. For example, the mandrel segment(s) 236, 238, and 240 are assembled together by applying fasteners 242 to the mandrel segment(s) 236, 238, and 240. More specifically, the mandrel segment(s) 238 is coupled to one side of the mandrel segment(s) 240 using fasteners 242, and the mandrel segment(s) 236 is coupled to the other side of the mandrel segment(s) 240 using fasteners 242. In this manner, assembling the mandrel segment(s) 236, 238, and 240 places each mandrel segment(s) 235 in different radial portions 212, 208, or 210 of the mandrel 140. The fasteners 242 can be applied after all of the mandrel segment(s) 235 are positioned with respect to each other or can be applied as each mandrel segment(s) 235 is positioned. Seals can be installed between adjacent mandrel segment(s) before or after the fasteners 242 are applied to the mandrel segment(s) 235.

When the assembly station(s) 105 includes the mandrel support structure 106, the mandrel segment(s) 235 are attached to the mandrel support structure 106. For example, the mandrel segment(s) 235, individually or coupled together as the mandrel 140, are coupled to the mandrel support structure 106 using fasteners 244. In one example, the mandrel segment(s) 235 are coupled together, and then the mandrel 140 formed of the mandrel segment(s) 235 is attached to the mandrel support structure 106. In another example, the mandrel segment(s) 235 are coupled to the mandrel support structure 106 and then coupled to an adjacent mandrel segment(s). While the fasteners 242 and 244 are assigned different reference numbers, the fasteners 242 and 244 can be the same type of fastener or different types of fasteners.

Some embodiments include assembling multiple mandrel segment(s) together into a half-barrel section 770 (or a full-barrel section 776 or less than a half-barrel section, such as a one-quarter panel) (shown in FIG. 29), after the pick-and-place machine(s) 130 have completed the instructions 124 in the program 122 (such as the numerical control program 123) for the mandrel segment(s) 235 to place the preform(s) 150 in desired locations. This segmented approach lends itself to a pulsed fabrication environment, as each of the first group 218, the second group 220, and the third group 222 of stringer preform(s) 159 can be placed upon a mandrel segment(s) 235 that proceeds in a pulsed or continuously moving fashion, and then the mandrel 140, shaped as a half-barrel section 770 or a full-barrel section 776, can be assembled from the mandrel segment(s) 235. This design concept may be implemented to form full-barrel sections, as desired.

Illustrative details of the operation of placement system 50 will be discussed with regard to FIGS. 22 to 26. Assume, that a variety of objects for placement onto the mandrel 140, such as one or more stringer preform(s) 159, are prepared at the tray 190 and await placement. Further, unless the mandrel segment(s) 235 are specified, the methods described below can be used with the mandrel 140 or the one or more mandrel segment(s) 235 when the mandrel 140 is referred to.

The methods described with respect to FIGS. 22 to 26 can be performed by the cell controller 120. For example, and referring to FIGS. 1 and 2, the steps of the methods are included in the program 122 embodied in the cell controller 120 and are sent in the instructions 124 from the cell controller 120 to the pick-and-place machine(s) 130 and/or in instructions sent to the mandrel 140 to perform the method(s). Accordingly, the cell controller 120 is operable to perform the methods 300, 400, 500, and 600 and steps described herein. When the method steps are performed by a system in the manufacturing line 10 other than the placement system 50, the cell controller 120 communicates with controller(s) in the other systems, such as the hardening system 60, the separation system 70, and/or the cleaning system 80, to move the mandrel 140 and perform the remainder of the method step(s).

The steps of the methods are described below with reference to the placement system 50 of FIG. 1, but those skilled in the art will appreciate that the herein-described methods may be performed in other systems. The steps of the flowcharts described herein are not all inclusive and may include other steps not shown and include optional steps that can be performed in some examples. The steps described herein may also be performed in an alternative order, and/or may be skipped. Furthermore, the picking and/or placing operations discussed herein may be performed synchronously or asynchronously.

FIG. 22 is a flowchart illustrating a method 300 for assembling a structure 12 using the placement system 50 of FIGS. 1 to 3. The method 300 operates the placement system 50 to coordinate the action of the pick-and-place machine(s) 130. As mentioned above, picking and/or placing steps can be performed synchronously or asynchronously, depending on the structure 12 being assembled. The picking and/or placing operations can occur while the mandrel 140 is paused at the placement station(s) 100 between pulses, and the cell controller 120 may be operable to pause the mandrel 140 while at least a portion of the mandrel 140 is disposed at the placement station(s) 100.

Figure 24A:
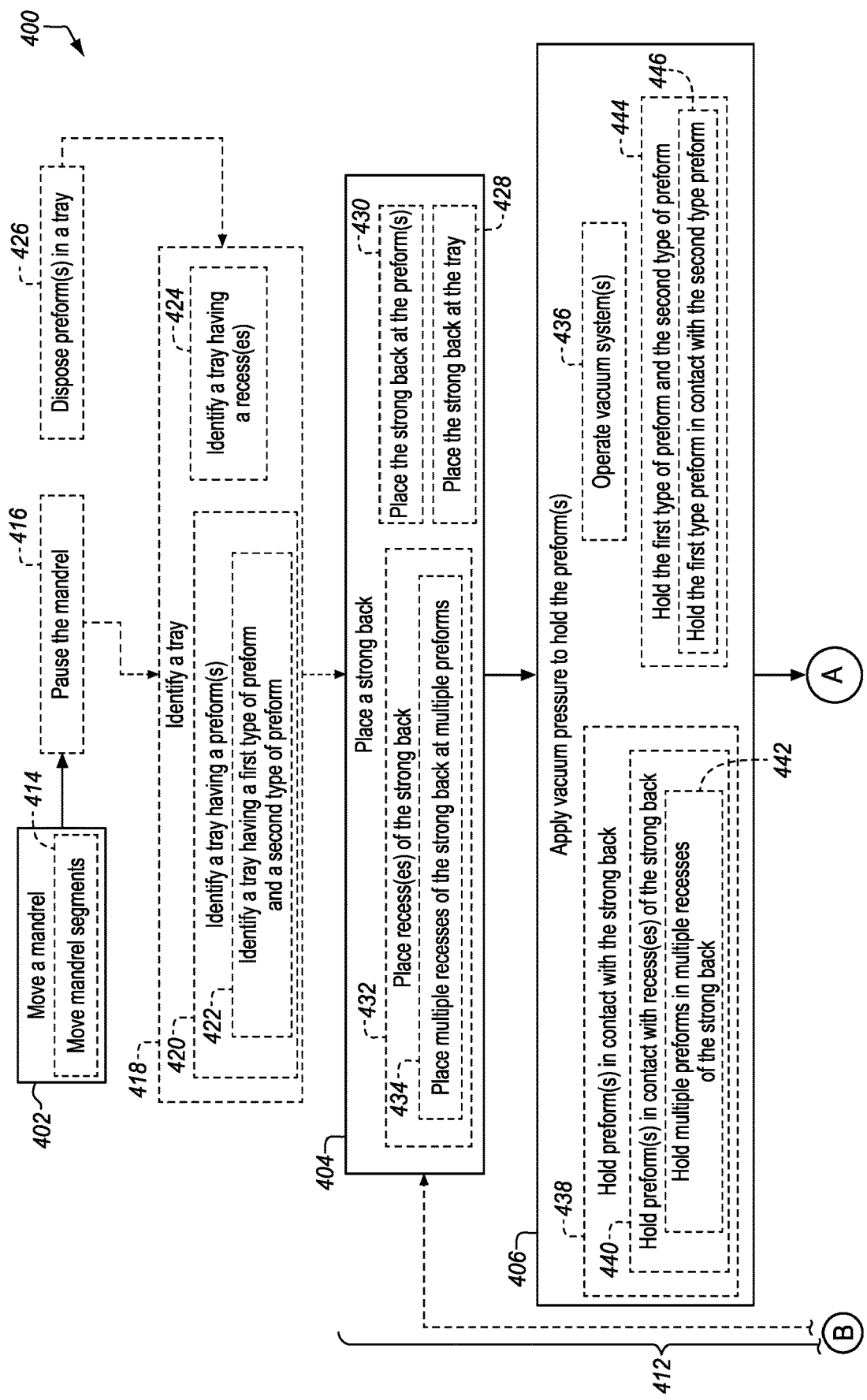
FIGS. 24A and 24B are a flowchart illustrating a placement method for operating the placement system shown in FIGS. 1 to 21 in illustrative embodiments.
Figure 24B:
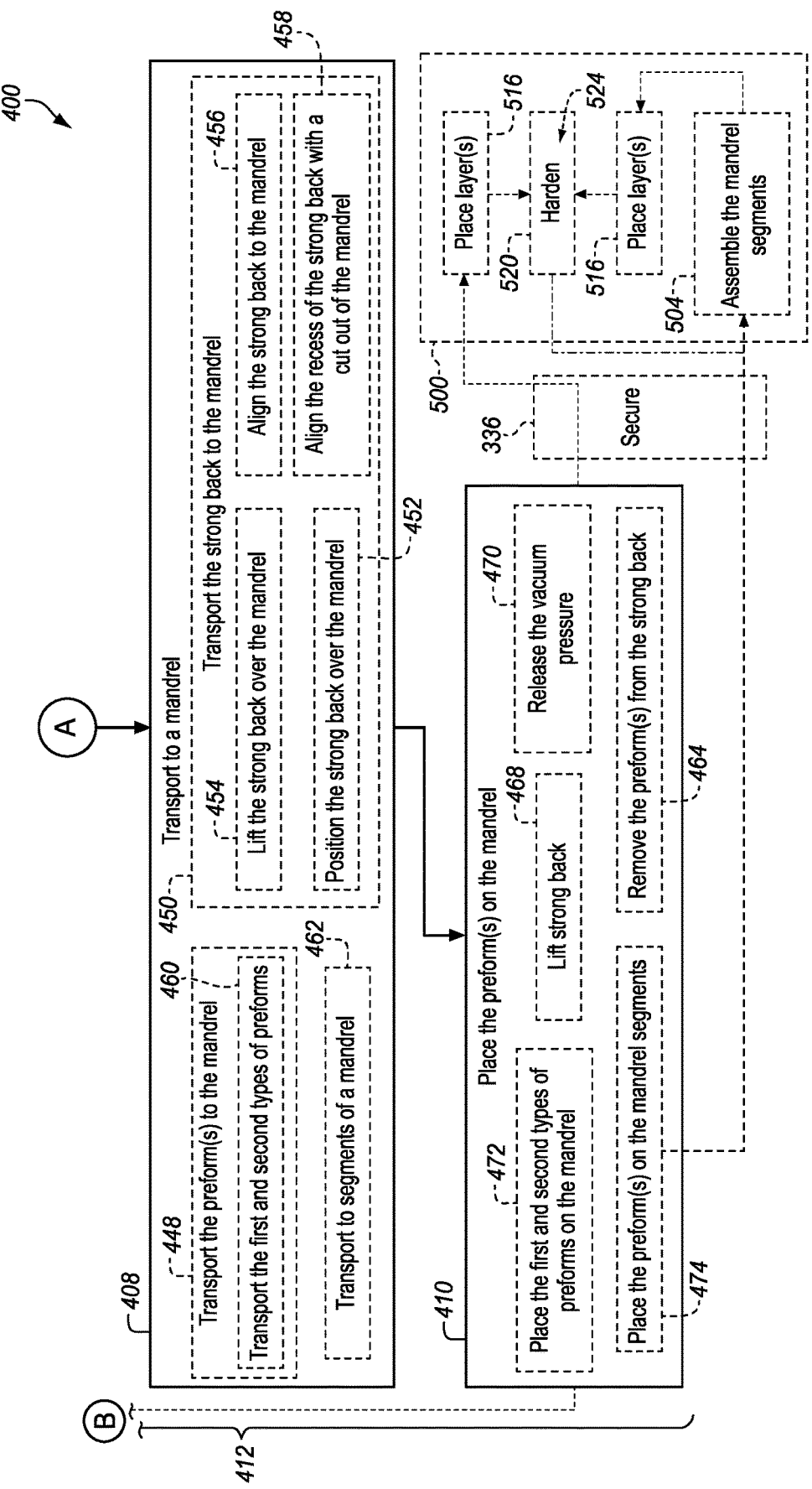

Referring to FIGS. 1, 2, and 22, the method 300 includes operating 302 in an asynchronous phase and operating 304 in a synchronous phase. When operating 302 in the asynchronous phase, the placement system 50 operates in the asynchronous mode. Similarly, while operating 304 in the synchronous phase, the placement system 50 operates in the synchronous mode. An example of the mode 412 is shown in FIGS. 24A and 24B. Placement of objects, such as the discrete object(s) 20 and the large object(s) 22, are described below; however, when the objects are preform(s) 150, the discrete object(s) 20 include discrete preform(s) 154, such as frame filler preform(s) 158, and the large objects include large preform(s) 156, such as stringer preform(s) 159. Accordingly, the method 300 as described below applies equally to place the preform(s) 150, discrete preform(s) 154, frame filler preform(s) 158, large preform(s) 156, and stringer preform(s) 159.

In the step of operating 302, the cell controller 120 initiates an asynchronous phase in which the pick-and-place machine(s) 130 at a placement station(s) 100 are each operated independently to place the objects, such as discrete object(s) 20, onto the mandrel 140. To initiate the asynchronous phase, the cell controller 120 sends instructions 124 to the pick-and-place machine(s) 130 to operate in the asynchronous mode. The asynchronous phase is a phase of operation in which each pick-and-place machine(s) 130 places the objects at its own fastest rate, without the cell controller 120 enforcing coordination between the pick-and-place machine(s) 130.

Instructions 124 for operating 302 in the asynchronous phase cause each of the pick-and-place machine(s) 130 to place 404 the strong back 180 over at least one discrete object, apply 406 the vacuum pressure 160 that holds the at least one discrete object at the strong back 180, lift 454 the strong back 180 into place over the mandrel 140, and release 470 the vacuum pressure 160 to remove the at least one discrete object from the strong back 180 while the at least one discrete object contacts the mandrel 140. The placing 404, applying 406, lifting 454, and releasing 470 steps are shown in FIGS. 24A and 24B during the mode 412.

During operation 302 in the asynchronous phase, the cell controller 120 provides 306 instructions 124 that are new for each of the pick-and-place machine(s) 130. The instructions 124 that are new are defined by the program 122 and are provided 306 by the cell controller 120 to a pick-and-place machine(s) 130 in response to detecting that prior instructions 124 from the program 122 have been completed by the pick-and-place machine(s) 130, regardless of the progress of the other pick-and-place machine(s) in the placement station(s) 100. Thus, each pick-and-place machine(s) 130 receives instructions 124 independently of other pick-and-place machine(s) in the placement station(s) 100. This enables each pick-and-place machine(s) 130 to operate efficiently and without reference to the other pick-and-place machine(s).

As used herein, especially regarding the steps of operating 302 and operating 304, an instruction 124 from the program 122 is preferably from numerical control program 123 and may comprise a command to move the end effector 134 to a specific location, to control operation of the vacuum system 138 and/or the gripping system 139 at the end effector 134, and/or to control an actuator, etc. in order to physically grab or apply vacuum pressure 160 to the strong back 180 (and any of the preform(s) 150 that are corresponding) for placement of an object(s) 18 carried by the strong back 180. In response to each instruction 124, the pick-and-place machine(s) 130 performs the requested action, and the pick-and-place controller 132 generates a confirmation for receipt by the cell controller 120. As each confirmation is received from the pick-and-place machine(s) 130, the cell controller 120 provides 306 a new instruction to the pick-and-place machine(s) 130 from the program 122.

The pick-and-place controllers 132 may use the data 137 to confirm that an instruction 124 has been carried out in a desired manner. If the data 137 indicates a condition in which the pick-and-place machine(s) 130 cannot complete the instruction 124 (e.g., due to a delay beyond a threshold amount, an error code, etc.), then the pick-and-place controller 132 reports the condition to the cell controller 120 for interpretation and remediation.

Referring to FIGS. 19 and 22, operating 302 in the asynchronous phase can include placing 308 the discrete object(s) 20 onto a different radial portions 208, 210, 212, or 213 of the mandrel 140. When the mandrel 140 includes mandrel segment(s) 235, the discrete object(s) 20 are placed 310 onto one or more mandrel segments, which become the different radial portions 208, 210, 212, and/or 213 of the mandrel 140 when assembled together. Referring to FIGS. 20 and 22, additionally or alternatively operating 302 in the asynchronous phase can include placing 312 the discrete object(s) 20 onto a different longitudinal portions 224, 226, and/or 228 of the mandrel 140.

When the pick-and-place machine(s) 130 are divided in to the first subset 126 and the second subset 128, operating 302 in the asynchronous phase includes operating 314 the first subset 126 of pick-and-place machine(s) 130a at the placement station(s) 100 independently in an asynchronous phase to place the discrete object(s) 20 onto the mandrel 140. The instructions 124a for operating 302 in the asynchronous phase cause each of the pick-and-place machine(s) 130a the first subset 126 to place 404 the strong back 180 over a discrete object(s) 20, apply 406 the vacuum pressure 160 that holds the discrete object(s) 20 at the strong back 180, lift 454 the strong back 180 into place over the mandrel 140, and release 470 the vacuum pressure 160 to remove the discrete object(s) 20 from the strong back 180 while the discrete object(s) 20 contacts the mandrel 140.

While operating 314 the first subset 126 in the asynchronous phase, new instruction are provided 306 for each of the pick-and-place machine(s) 130 in the first subset 126. More specifically, instructions 124 that are new are provided 306 to each of the pick-and-place machine(s) 130 in the first subset 126 from the program 122 in response to detecting that prior instructions 124 from the program 122 have been completed by the pick-and-place machine(s) 130, regardless of the progress of the other pick-and-place machine(s) in the first subset 126. Preferably, the program 122 is numerical control program 123 and the instructions 124 are NC instructions 125.

When the placement system 50 includes multiple placement stations(s) 100, 100', the pick-and-place machine(s) 130, 130' are distributed across the multiple placement stations(s) 100, 100'. In such an embodiment, operating 302 includes operating 316 the pick-and-place machine(s) 130 at the placement station(s) 100 in the asynchronous phase or operating 316 the pick-and-place machine(s) 130' at the placement station(s) 100' in the asynchronous phase.

Any of the steps of placing 308, placing 310, placing 312, operating 314, and/or operating 316 can be combined to operate 302 in the asynchronous phase, depending on the structure 12 being assembled and/or the configuration of the placement system 50.

In the step of operating 304, the cell controller 120 initiates a synchronous phase in which the pick-and-place machine(s) 130 are operated in tandem to place a large object(s) 22 that spans multiple pick-and-place machine(s) 130 onto the mandrel 140. The pick-and-place machine(s) 130 therefore operate in tandem during the synchronous phase to collaboratively transport one or more large objects to desired positions at mandrel 140. To initiate the synchronous phase, the cell controller 120 sends instructions 124 to the pick-and-place machine(s) 130 to operate in the synchronous mode.

Instructions 124 during operation 304 in the synchronous phase cause each of the pick-and-place machine(s) 130 to synchronously place the strong back 180 over the large object(s) 22, apply 406 the vacuum pressure 160 that holds the large object(s) 22 at the strong back 180, lift 454 the strong back 180 into place over the mandrel 140, and release 470 the vacuum pressure 160 to remove the large object(s) 22 from the strong back 180 while the large object(s) 22 contacts the mandrel 140. The placing 404, applying 406, lifting 454, and releasing 470 steps are shown in FIGS. 24A and 24B as steps during the mode 412.

During operation 304 in the synchronous phase, the cell controller 120 provides 318 instructions 124 that are new from the program 122 (e.g., numerical control program 123) to each of the pick-and-place machine(s) 130 in response to detecting that all of the pick-and-place machine(s) 130 at the placement station(s) 100 have completed a prior instruction 124 from the program 122. The operation 304 can result in a staged set of check pointed operations that are performed by all of the pick-and-place machine(s) 130, such as positioning over a strong back 180, activating the vacuum system 138 at the end effector 134 to capture a preform(s) 150 and hold the preform(s) 150 in contact with the strong back 180, coordinating movement of the strong back 180 over the mandrel 140, coordinating release of vacuum pressure 160 to remove the preform(s) 150 from the strong back 180, etc.

Referring to FIGS. 19 and 22, operating 304 in the synchronous phase can include placing 320 the one or more large objects onto a different radial portions 208, 210, 212, or 213 of the mandrel 140. When the mandrel 140 includes mandrel segment(s) 235, the one or more large objects are placed 322 onto one or more mandrel segment(s) 235, which become the different radial portions 208, 210, 212, and/or 213 of the mandrel 140 when assembled together. Referring to FIGS. 20 and 22, additionally or alternatively operating 302 in the synchronous phase can include placing 324 one or more large objects onto different longitudinal portions 224, 226, and/or 228 of the mandrel 140.

When the pick-and-place machine(s) 130 are divided in to the first subset 126 and the second subset 128, operating 304 in the synchronous phase includes operating 326 a second subset 128 of pick-and-place machine(s) 130 in tandem in the synchronous phase to place a large object(s) 22 onto the mandrel 140 simultaneously with the operating 314 of the first subset 126 of pick-and-place machine(s) 130. The operation 326 can occur at the same placement station(s) (e.g., the placement station(s) 100) as the operation 314 and/or at a different placement station(s) (e.g., the placement station(s) 100') than the operation 314. In one embodiment, the pick-and-place machine(s) 130a in the first subset 126 are distinct from the pick-and-place machine(s) 130b, 130c in the second subset 128.

The instructions 124b, 124c during operation 304 in the synchronous phase with multiple subsets cause each of the pick-and-place machine(s) 130 in the second subset 128 to synchronously place the strong back 180 over the large object(s) 22, apply 406 the vacuum pressure 160 that holds the large object(s) 22 at the strong back 180, lift 454 the strong back 180 into place over the mandrel 140, and release 470 the vacuum pressure 160 to remove the large object(s) 22 from the strong back 180 while the large object(s) 22 contacts the mandrel 140.

While operating 326 the second subset 128 in the synchronous phase, instructions 124 that are new are provided 318 to the pick-and-place machine(s) 130 in the second subset 128. More specifically, instructions 124b, 124c are provided 318 from the program 122 to each of the pick-and-place machine(s) 130b, 130c in the second subset 128 in response to detecting that all of the pick-and-place machine(s) 130b, 130c in the second subset 128 have completed a prior instruction 124 from the program 122.

In an example where different type of objects, such as discrete object(s) 20 and large objects, are used to assemble the structure 12, the cell controller 120 can operate subsets in different phases. For example, when the objects include discrete object(s) 20, the cell controller 120 is configured to operate 302 each pick-and-place machine(s) 130a in a first subset 126 of the pick-and-place machine(s) 130 independently from each other in an asynchronous phase to place the discrete object(s) 20 onto the mandrel 140. Additionally or alternatively, when the objects include a large object(s) 22 that spans multiple pick-and-place machine(s) 130, the cell controller 120 is configured to operate 304 pick-and-place machine(s) 130b, 130c in a second subset 128 of pick-and-place machine(s) 130 in tandem in a synchronous phase to place the large object(s) 22 onto the mandrel 140. Preferably, the cell controller 120 simultaneously operates the first subset 126 and the second subset 128.

When the placement system 50 includes multiple placement stations(s) 100, 100', the pick-and-place machine(s) 130, 130' are distributed across the multiple placement stations(s) 100, 100'. In such an embodiment, operating 304 includes operating 328 the pick-and-place machine(s) 130' at the placement station(s) 100' in the synchronous phase or operating 328 the pick-and-place machine(s) 130 at the placement station(s) 100 in the synchronous phase.

Any of the steps of placing 320, placing 322, placing 324, and/or operating 326 can be combined to operate 302 in the synchronous phase, depending on the structure 12 being assembled and/or the configuration of the placement system 50.

The cell controller 120 iteratively 330 operates 304, 302 the pick-and-place machine(s) 130 in the synchronous phase or mode and the asynchronous phase or mode. In a particular embodiment where the pick-and-place machine(s) 130 are divided into subsets, the cell controller 120 iteratively 332 operates 304, 302 the first subset 126 of pick-and-place machine(s) 130 and the second subset 128 of pick-and-place machine(s) 130 in the synchronous phase and the asynchronous phase. For example, referring to FIGS. 2 and 22, the method 300 includes iteratively 332 operating 302 the first subset 126 the asynchronous phase to place the object(s) 18 onto the mandrel 140 and then operating 304 the first subset 126 in the synchronous phase to place one or more large objects onto the mandrel 140. Similarly, the second subset 128 can iteratively 332 operate 302, 304 between the two phases to place the object(s) 18 and large objects onto the mandrel 140.

More specifically, while the first subset 126 is operated 302 in the asynchronous phase to place the discrete object(s) 20, the second subset 128 is operated 304 in the synchronous phase to place one or more large objects. When the first subset 126 changes to operating 304 in the synchronous phase to place one or more large objects, the second subset 128 changes to operate 302 in the synchronous phase to place the discrete object(s) 20. The change between operations 302 and 304 can be based on which objects remain in the tray 190 and/or when a depleted tray 190 having no objects remaining is replaced with a new tray stocked with objects. This iterative 332 operation of the subsets enables discrete object(s) 20 and large objects to continually be placed by the placement station(s) 100.

In an embodiment where the placement system 50 includes multiple placement stations(s) 100, 100', the method includes iteratively 334 operating 304, 302 pick-and-place machine(s) 130, 130' at each of the placement stations(s) 100, 100' in the synchronous phase and the asynchronous phase. For example, referring to FIGS. 1 and 22, the method 300 includes iteratively 334 operating 302 the placement station(s) 100 in the asynchronous phase to place the object(s) 18 onto the mandrel 140 and then operating 304 the placement station(s) 100 in the synchronous phase to place one or more large objects onto the mandrel 140. Similarly, the placement station(s) 100' iteratively can be operating 302 and operating 304 between the two phases to place objects onto the mandrel 140.

More specifically, while the placement station(s) 100 is operated 302 in the asynchronous phase to place the object(s) 18, the placement station(s) 100' is operated 304 in the synchronous phase to place one or more large objects. When the placement station(s) 100 changes to operating 304 in the synchronous phase to place one or more large objects, the placement station(s) 100' changes to operate 302 in the synchronous phase to place the object(s) 18. The change between operations 302 and 304 can be based on which objects remain in the tray 190, 190' and/or when a depleted tray 190, 190' having no objects remaining is replaced with a new tray stocked with objects. This iterative operation of the placement stations(s) 100, 100' enables discrete object(s) 20 and large objects to continually be placed by the placement stations(s) 100, 100' as the mandrel 140 is moved (e.g., pulsed or continually) through a series of placement stations(s) 100, 100'. The strong backs 180, 180' can be utilized to support these processes.

Further, when the placement system 50 includes multiple placement stations(s) 100, 100', 100", each of the placement stations(s) 100, 100', and/or 100" operates to place 308, 320 the objects onto a different radial portions 208, 210, 212, or 213 of the mandrel 140, as shown in FIG. 19. For example, method 300 includes iteratively 334 operating 302 the placement station(s) 100 in the asynchronous phase to place the object(s) 18 onto the first radial portion and then operating 304 the placement station(s) 100 in the synchronous phase to place one or more large objects onto the first radial portion. Similarly, placement station(s) 100' can iteratively operate between the two phases to place objects onto the second radial portion, either in the same mode or the opposite mode from the placement station(s) 100. Alternatively, the placement station(s) 100 operates 302 to place the object(s) 18 onto the first radial portion, and then the mandrel 140 moves to the placement station(s) 100' to place large objects onto the first radial portion while the placement station(s) 100 operates 302 in the asynchronous mode to place the discrete object(s) 20 onto the second radial portion. Accordingly, the mandrel 140 experiences iteration 334 between phases as the mandrel 140 moves along the placement stations(s) 100, 100'.

Additionally or alternatively, each of the placement stations(s) 100, 100', and/or 100" operates to place 312, 324 the objects onto different longitudinal portions 224, 226, and/or 228 of the mandrel 140, as shown in FIG. 20. For example, method 300 includes iteratively 334 operating 302 the placement station(s) 100 in the asynchronous phase to place the object(s) 18 onto the first longitudinal portion and then operating 304 the placement station(s) 100 in the synchronous phase to place one or more large objects onto the first longitudinal portion. Similarly, the placement station(s) 100' can iteratively 334 operate 302, 304 between the two phases to place objects onto the second longitudinal portion, either in the same mode or the opposite mode from the placement station(s) 100. Alternatively, the placement station(s) 100 operates 302 to place the discrete object(s) 20 onto the first longitudinal portion, and then the mandrel 140 moves to the placement station(s) 100' that operates 304 in the asynchronous phase to place the large objects onto the first longitudinal portion while the placement station(s) 100 operates 302 in the asynchronous mode to place the discrete object(s) 20 onto the second longitudinal portion. Accordingly, the mandrel 140 experiences iteration 334 between phases as the mandrel 140 moves along the placement stations(s) 100, 100'.

Additionally or alternatively, each of the placement stations(s) 100, 100', and/or 100" operates to place 310, 322 the objects onto a different mandrel segment, as shown in FIG. 21. For example, method 300 includes iteratively 334 operating 302 the placement station(s) 100 in the asynchronous phase to place the object(s) 18 onto the mandrel segment(s) 236 and then operating 304 the placement station(s) 100 in the synchronous phase to place one or more large objects onto the mandrel segment(s) 236. Similarly, the placement station(s) 100' can iteratively 334 operate 302, 304 between the two phases to place objects onto the mandrel segment(s) 238, either in the same mode or the opposite mode from the placement station(s) 100. Alternatively, the placement station(s) 100 operates 302 to place the discrete object(s) 20 onto the mandrel segment(s) 236, and then the mandrel segment(s) 236 moves to the placement station(s) 100' that operates 304 in the asynchronous phase to place the large objects onto the mandrel segment(s) 236 while the placement station(s) 100 operates 302 in the asynchronous mode to place the discrete object(s) 20 onto the mandrel segment(s) 238. Accordingly, the mandrel segment(s) 235 experience iteration 334 between phases as a series of mandrel segment(s) 235 moves through a series of placement stations(s) 100, 100'.

The method 300 can optionally include securing 336 the objects to the mandrel 140. For example, when the objects are preform(s) 150, the preform(s) 150 can be secured 336 to the mandrel 140. The securing 336 can occur after each phase of operating 302 and/or operating 304 and/or after all iterations 330 of the phases are completed. Securing 336 the objects can include tacking the objects to the mandrel 140, applying vacuum pressure 147 (shown in FIG. 13) to the objects, and/or pressing, compacting, and/or consolidating the object(s) 18 against the mandrel 140 using the strong back 180. One example of tacking is using tactifier tape and media, in addition to compaction, gravity, and/or vacuum pressure 147, to maintain the positions of the preform(s) 150 with respect to each other throughout the placement operation and subsequent operations along the manufacturing line 10.

When the mandrel 140 includes mandrel segment(s) 235, the method 300 includes assembling 504 multiple mandrel segment(s) together after the pick-and-place machine(s) 130 have completed the instructions 124 in the program 122 corresponding to the mandrel segment(s) 235. In one example, the multiple mandrel segment(s) are assembled 504 together into a half-barrel section 770 (shown in FIG. 29) after the pick-and-place machine(s) 130 have completed the instructions 124 in the program 122 corresponding to the mandrel segment(s) 235. Further details of the assembly 504 are described with respect to FIG. 25, including moving 506 the mandrel 140 to the assembly station(s) 105 to perform the assembly 504. If the objects are secured 336 to the mandrel segment(s) 235, at least two mandrel segment(s) can be assembled 504 together after the objects are secured 336.

The method 300 for assembling a structure 12 (shown in FIG. 1) can provide a substantial advantage over prior systems because the method 300 can enable a single program (e.g., a single NC program) to control the actions of multiple pick-and-place machine(s) 130. Because provisioning of instructions 124 from the program 122 is synchronized across pick-and-place machine(s) 130 in synchronous phases, the pick-and-place machine(s) 130 can work together to carry objects, such as large objects, that a single one of pick-and-place machine(s) 130 would be unable to carry. Furthermore, because the provisioning of instructions 124 is not synchronized in asynchronous phases, each pick-and-place machine(s) 130 may operate efficiently when transporting objects, such as discrete object(s) 20, that can be carried by just one pick-and-place machine.

FIG. 23 is a message diagram 350 that can be used during the method 300 shown in FIG. 22. The message diagram 350 depicts communications between the cell controller 120 and multiple pick-and-place controllers 132a, 132b, and 132c to selectively coordinate operation of pick-and-place machine(s) 130a, 130b, and 130c in an illustrative embodiment. The pick-and-place machine(s) 130 performs a cyclical placement operation 352 that includes one or more series of an asynchronous phase 354 and a synchronous phase 356. During the asynchronous phase 354, the placement station(s) 100 is operated 302 in the asynchronous mode. Similarly, during the synchronous phase 356, the placement station(s) 100 is operated 304 in the synchronous mode.

As shown in FIG. 23, the cell controller 120 initiates an asynchronous phase to operate 302 the pick-and-place machine(s) 130. In the asynchronous phase 354, the cell controller 120 sends out an instruction 124a, 124b, or 124c to a pick-and-place controller 132a, 132b, or 132c immediately upon determining that the pick-and-place controller 132a, 132b, or 132c has completed its latest instruction. This is performed regardless of the progress of other pick-and-place controllers 132a, 132b, and/or 132c at the placement station(s) 100.

In the synchronous phase 356, however, actions are synchronized among pick-and-place controllers 132a, 132b, and 132c. That is, the cell controller 120 awaits confirmation from all pick-and-place controllers 132 that are operating in tandem to pick up an object(s) 18, such as a large object(s) 22 (shown in FIG. 18), before sending out instructions 124 that are new. This form of checkpointing may ensure that all pick-and-place machine(s) 130 have reached a desired milestone before further progress is requested. In further embodiments, the cell controller 120 may implement hybrid phases, wherein a first subset 126 or a second subset 128 of pick-and-place machine(s) 130 at the placement station(s) 100 operate in a synchronous mode, while one or more other pick-and-place machine(s) at the placement station(s) 100 operate in an asynchronous mode.

FIGS. 24A and 24B are a flowchart illustrating a method 400 for operating the placement station(s) 100 shown in FIGS. 1 to 21, in illustrative embodiments. The method 400 operates the placement system 50 (shown in FIG. 1) to coordinate the action of the pick-and-place machine(s) 130. The various steps of the method 400 can be illustrated with regard to FIGS. 4 to 18. The method 400 is described with respect to placing of the preform(s) 150; however, the method 400 can be used to place any suitable objects.

Referring to FIGS. 22 and 23, the method 400 can be used during operation 302 in the asynchronous phase 354 and during operation 304 in the synchronous phase 356. For example, a mode 412 of the method 300 is performed during operation 302 in the asynchronous phase 354 and during operation 304 in the synchronous phase 356. The mode 412 is described in more detail below.

Referring to FIGS. 1, 2, and 24, the method 400 includes moving 402 the mandrel 140, placing 404 the strong back 180 at the tray 190 and/or at the preform(s) 150, applying 406 vacuum pressure 160 to hold the preform(s) 150, transporting 408 the strong back 180 and/or the preform(s) 150 to the mandrel 140, and placing 410 the preform(s) 150 on the mandrel 140. A mode 412 of operation includes at least placing 404 the strong back 180, applying 406 the vacuum pressure 160, transporting 408 to the mandrel 140, and placing 410 the preform(s) 150.

Moving 402 the mandrel 140 includes moving the mandrel 140 in the process direction 14 relative to the placement station(s) 100 having multiple pick-and-place machine(s) 130. The moving 402 may be performed as part of a pulsed or continuously moving process along the manufacturing line 10 wherein the mandrel 140 is moved by its entire length, or as part of a micro-pulse process where the mandrel 140 is moved by less than its entire length, in order to expose a new portion of the mandrel 140 for receiving work. The moving 402 of the mandrel 140 can be at the direction of the cell controller 120. The mandrel 140 can be moving 402 along a track, rail, path, etc. through the placement system 50 and/or along the manufacturing line 10.

The mandrel 140 being moving 402 into the manufacturing cell 110 can include an identification device, such as an RFID tag and/or bar code. In such an example, moving 402 the mandrel 140 with respect to the placement system 50 can include obtaining data from the identification device for use by the cell controller 120. For example, the data can include which mandrel 140 or mandrel segment(s) 235 is in the placement system 50, which part or model is to be assembled by the placement system 50, which components have been incorporated with the mandrel 140 before entering the placement system 50, etc. The cell controller 120 can use this data, possibly encoded in the data 137 if the pick-and-place machine(s) 130 is obtaining the data from the identification device, to send the instructions 124 to the pick-and-place machine(s) 130.

When the mandrel 140 includes multiple mandrel segment(s) 235 as in FIG. 21, moving 402 the mandrel 140 includes moving 414 a mandrel segment(s) 235. More specifically, one or more mandrel segment(s) 235 are moved 414 in the process direction 14 relative to the placement station(s) 100. The mandrel segment(s) 235 can be moved 414 along one or more tracks, rails, paths, etc.

When the placement system 50 includes multiple placement stations(s) 100, 100', 100", the mandrel segment(s) 235 are each moved 414 with respective to the particular placement station(s) that will place the preform(s) 150 on that mandrel segment(s) 235. The mandrel segment(s) 235 can be moved 414 at the same speed through one or more placement stations(s) 100, 100', and/or 100" or can be moved 414 at variable and/or different speeds depending on what type and how many preform(s) 150 are to be placed on a mandrel segment(s) 235.

The method 400 optionally includes pausing 416 the mandrel 140 while at least a portion of the mandrel 140 is disposed at the placement station(s) 100. The mandrel 140 can be paused 416 once for a duration long enough for all of the preform(s) 150 to be placed on the mandrel 140. Alternatively, the mandrel 140 is paused 416 for shorter durations so the mandrel 140 is pulsed through the placement station(s) 100. Pausing 416 in a pulsed fashion can be used when the first group 230, the second group 232, and the third group 234 of preform(s) 150 are placed at different longitudinal portions 224, 226, and/or 228 of the mandrel 140, as shown in FIG. 20. When the mandrel 140 is not paused 416, the mandrel 140 continually moving 402 through the placement station(s) 100 during the placement process.

Referring to FIGS. 4, 5, and 24, the method 400 can further include identification 418 of a tray 190. For example, the type of tray 190a, 190b, and 190c of tray 190, the location of the tray 190 with respect to the placement station(s) 100 and/or manufacturing cell 110, and/or the number and type of preform(s) 150 in the tray 190 is subject to identification 418. The identification 418 can include identifying 420 a tray 190 that stores a preform(s) 150 of an unhardened fiber-reinforced material 152. Identifying 420 the tray 190 also identifies the type and/or number of preform(s) 150 stored in the tray 190.

In an example when the tray 190c of FIG. 5 is used, identification 418 includes identifying 422 a tray 190c that stores large preform(s) 156 and/or discrete preform(s) 154. As mentioned with respect to FIG. 5, the discrete preform(s) 154 can be disposed at locations 195 in which a frame 780 (shown in FIG. 29) will be installed relative to the large preform(s) 156. As discussed above, the locations 781 of the fuselage 766 correspond to locations 195 in the tray 190. Accordingly, the discrete preform(s) 154 are arranged for placement at locations 781 in which the frame 780 is to be installed relative to the one or more large preform(s) 156. In such an example, the identification 418 includes identifying 422 a tray 190c with discrete preform(s) 154 and large preform(s) 156 that are kitted.

In another example when the set 191 shown in FIG. 4 is used, the identification 418 includes identifying 422 one or more trays 190a and 190b having different types of preform(s) 150, such as one or more large preform(s) 156 and the discrete preform(s) 154. The identifying 420 and identifying 422 includes an indication of the type of discrete preform(s) 154 and/or large preform(s) 156 stored in each identified 420, 422 tray 190a, 190c. For example, identification 418 includes identifying 420 that the first type of tray 190a include discrete preform(s) 154 and that the second type of tray 190b includes one or more large preform(s) 156.

The identification 418 can further include identifying 424 a tray 190 having one or more recesses 198. For example, the identifying 420 can include identifying 424 that the tray 190 includes recesses 198 for storing multiple preform(s) 150. When the set 191 of FIG. 4 or the tray 190c of FIG. 5 is used to store different types of preform(s) 150, the identification 418 includes identifying 424 the tray 190a, 190b, or 190c that includes recess 198 for the discrete preform(s) 154 and for the one or more large preform(s) 156.

Identification 418 can be performed via camera or other sensing component, or based on instructions 124 in the program 122. Referring to FIG. 2, when the identification 418 is performed by camera or other sensing component, the sensor(s) 136 of one or more pick-and-place machine(s) 130 acquire information about the tray 190 and sends the tray information to the cell controller 120 as part of the data 137. The acquired information can be image data of the tray 190 and/or preform(s) 150 in the tray 190, radio frequency (RF) data (e.g., from an RF identification tag associated with the tray 190 and/or preform(s) 150 detected and/or emitted at sensor(s) 136 for detecting RF signals), data from a bar code or other code on the tray 190 and/or preform(s) 150, detection and ranging data indicating a location and/or shape of the tray 190 and/or preform(s) 150 (e.g., from sensor(s) 136 configured for RADAR or LIDAR), and/or any other data that enables the cell controller 120 to send the instructions 124 to the pick-and-place machine(s) 130 based on the type of tray 190 and/or preform(s) 150.

Prior to identification 418 of the tray 190, the preform(s) 150 are disposed 426 in the tray 190. The disposing 426 of the preform(s) 150 can occur when the tray 190 is positioned within the placement station(s) 100 or can occur at a different system or station(s) within the manufacturing line 10 before the tray 190 is moved to the placement station(s) 100. When the tray 190c of FIG. 5 is used, the discrete object(s) 20 are disposed 426 in the tray 190 with a large object(s) 22 at locations 195 in which a frame 780 (shown in FIG. 29) is to be installed relative to the large object(s) 22. In such an example, disposing 426 the different types of objects, such as the discrete preform(s) 154 and the large preform(s) 156, is considered kitting the objects in the tray 190c.

Disposing 426 one or more of the object(s) 18 in the tray 190 can further include associating an identification tag (e.g., an RFID tag, bar code, or other optical code) with the tray 190 and/or preform(s) 150. For example, the data can include which tray 190 is in the placement system 50, which part or model is to be assembled by the placement system 50, which components have been incorporated with the tray 190 before entering the placement system 50, which objects have been disposed 426 in the tray 190, which locations the objects are located in the tray 190, etc. The cell controller 120 can use this data, possibly encoded in the data 137 if the pick-and-place machine(s) 130 is obtaining the data from the identification device, to send the instructions 124 to the pick-and-place machine(s) 130.

When the tray 190 includes vacuum channels 200 and vacuum system 202, as shown in FIG. 7, the vacuum pressure can be applied after the preform(s) 150 are disposed 426 in the tray 190. When the optional release film 26 is used, the optional release film 26 is applied to the tray 190 before the preform(s) 150 are disposed 426.

Referring to FIGS. 24, 1, and 2, placing 404 the strong back 180 is performed by at least one pick-and-place machine. When the optional release film 26 is used with the strong back 180, the optional release film 26 is applied to the strong back 180 before the strong back 180 is placed 404. During the placing 404, the strong back 180 is attached to at least one pick-and-place machine by, for example, attaching the end effector 134 to strong back 180. However, the strong back 180 can be attached to the pick-and-place machine(s) 130 near the end effector 134. The attachment between the end effector 134 and/or pick-and-place machine(s) 130 and the strong back 180 enables the gripping system 139 and/or vacuum system 138 to work with the strong back 180 to pick and place the objects, as will be described in more detail below. The pick-and-place machine(s) 130 are configured to move the strong back 180 at least to the tray 190 and to the mandrel 140, but may have further freedom of movement within the placement station(s) 100, depending on the operations to be performed and/or the structure 12 to be assembled. For example, the pick-and-place machine(s) 130 can further move the strong back 180 to a location in the placement station(s) 100 where the layer 206 (shown in FIG. 18) are stored.

In the exemplary embodiment, the cell controller 120 controls the pick-and-place machine(s) 130 to place 404 the strong back 180 at the tray 190 and/or preform(s) 150. In some examples, the identification 418 of the tray 190 is used to determine where to place 404 the strong back 180 in relation to the tray 190 and/or preform(s) 150. For example, when the cell controller 120 implements the identification 418 of multiple trays 190 or multiple preform(s) 150 in the placement station(s) 100, the cell controller 120 uses the identification 418 to place 404 the strong back 180 in relation to a particular tray and/or preform(s) 150. Even when one tray 190 or preform(s) 150 has been subject to identification 418, the cell controller 120 can use the position information in the identification 418 to place 404 the strong back 180 at a particular position in the placement station(s) 100.

Placing 404 the strong back 180 includes at least one of placing 428 the strong back 180 at the tray 190 via at least one of the pick-and-place machine(s) 130 and placing 430 the strong back 180 at the preform(s) 150 via at least one of the pick-and-place machine(s) 130. Placing 428 the strong back 180 at the tray 190 can include aligning the strong back 180 with the tray 190 using the strong back indexing elements 182 and the tray indexing elements 192. As the strong back indexing elements 182 engage the tray indexing elements 192, the strong back 180 is placed 428 in alignment with the tray 190.

Alternatively or additionally, the strong back 180 is placed at the preform(s) 150. For example, sensor(s) 136 can determine where the preform(s) 150 is within the placement station(s) 100 and/or tray 190, and the pick-and-place machine(s) 130 places 430 the strong back 180 at the preform(s) 150. For example, the strong back 180 is placed over an object(s) 18, such as the preform(s) 150. The determination of where the preform(s) 150 is located can be part of the identification 418 of the tray 190 or a separate step not reliant on whether the tray 190 is subject to identification 418. Because the preform(s) 150 is stored in the tray 190, placing 428 the strong back 180 and the tray 190 also places 430 the strong back 180 at the preform(s) 150. In another example where the strong back indexing elements 182 and tray indexing elements 192 are not included and/or where the tray 190 is not subject to identification 418, the cell controller 120 operates the pick-and-place machine(s) 130 to place 430 the strong back 180 at the preform(s) 150, which causes the strong back 180 to also be placed 428 at the tray 190.

When the preform(s) 150 is, for example, the layer 206 (shown in FIG. 18), the layer 206 (or other type of object(s) 18 or preform(s) 150) may not be stored in a tray 190. Accordingly, the cell controller 120 can operate the pick-and-place machine to place 430 the strong back 180 at the preform(s) 150, but not at the tray 190.

Referring to the configuration of the strong back 180 shown in FIG. 16, placing 404 the strong back 180 can include placing 404 the strong back 180 that is arcuate. Referring again to FIGS. 24 and 8 to 10, depending on the configuration of the strong back 180, the placing 404 of the strong back 180 can include placing 432 a recess 184 of the strong back 180 at the preform(s) 150 via at least one of the pick-and-place machine(s) 130. The placing 404 and/or 432 may include covering the preform(s) 150 with the strong back 180. This process can include indexing the strong back 180 to a recess 198 of the tray 190, for example via a cup-and-cone indexing system as is described with respect to FIGS. 8 and 9, in order to ensure a known and repeatable positioning of the strong back 180 relative to the recess 198.

When the strong back 180 is configured as in FIGS. 16 and 17 to have multiple recesses 184, one or more recesses 184 of the strong back 180 are placed 432, 434 at one or more respective instances of preform(s) 150. For example, multiple recesses 184 of the strong back 180 are placed 434 at multiple preform(s) 150. In one example, each recess 184 of the multiple recesses 184 is placed 434 at a particular respective instance of preform(s) 150 of the multiple preform(s) 150. In another example, one instance of recess 184 is placed 432, 434 at multiple preform(s) 150, such as multiple discrete preform(s) 154. As shown in FIG. 17, the multiple recesses 184 of the strong back 180 can each be configured to be placed 434 at a particular type of preform(s) 150 such that the multiple recesses 184 maintain a kitted arrangement of the discrete preform(s) 154 and large preform(s) 156.

In embodiments where the pick-and-place machine(s) 130 directly pick up the preform(s) 150 without the use of the strong back 180, the placing 404 is modified by placing the end effector 134 of the pick-and-place machine(s) 130 rather than placing the strong back 180, to the extent that the above description applies to the configuration of the end effector 134.

When the pick-and-place machine(s) 130 are be operated 302 (shown in FIG. 22) in the asynchronous phase 354 (shown in FIG. 23), the placing 404 of each pick-and-place machine(s) 130 can be different depending on the preform(s) 150 to be moved by each pick-and-place machine(s) 130. Further, during the asynchronous phase 354, one or more pick-and-place machine(s) 130 can also include move in the X direction(s) during placing 404. Additionally or alternatively, when the pick-and-place machine(s) 130 are divided into subsets, each pick-and-place machine(s) 130 in the first subset 126 (shown in FIG. 2) moves toward or apart in the X directions during any part of the placing 404 of each pick-and-place machine(s) 130 in the first subset 126.

When the pick-and-place machine(s) 130 are operated 304 (shown in FIG. 22) in the synchronous phase 356 (shown in FIG. 23), the pick-and-place machine(s) 130 are simultaneously placed 404 at the tray 190 and/or the large preform(s) 156. When a subset of pick-and-place machine(s) 130, such as the second subset 128 (shown in FIG. 2), is operating in the synchronous phase 356, the pick-and-place machine(s) 130 may be moved in the X direction(s) (shown in FIG. 3) with respect to each other to be at the appropriate spacing for the dimensions of the large preform(s) 156 during the placing 404.

After the pick-and-place machine(s) 130 and/or strong back 180 is placed 404 with respect to the preform(s) 150, the preform(s) 150 is pick up by the pick-and-place machine(s) 130 and/or the strong back 180. Referring to FIGS. 24 and 2, vacuum pressure 160 is applied 406 to hold the preform(s) 150 with respect to the pick-and-place machine(s) 130 and/or strong back 180. More specifically, the cell controller 120 operates 436 one or more vacuum system 138 to apply 406 the vacuum pressure 160 to hold the preform(s) 150. When the strong back 180 is not used, the vacuum system 138 is operated 436 to apply 406 the vacuum pressure 160 directly to the preform(s) 150 to hold the preform(s) 150 at the pick-and-place machine(s) 130. When the strong back 180 is used to hold the preform(s) 150, as shown in FIGS. 9 to 12, the vacuum pressure 160 is applied 406 through the strong back 180 to the preform(s) 150. For example, the vacuum system 138 is operated 436 to apply 406 the vacuum pressure 160 through the vacuum channels 188 that are coupled (e.g., in flow communication) with at least instance of one recess of the strong back 180.

Referring to FIGS. 24, 2, and 9 to 12, applying 406 the vacuum pressure 160 includes holding 438 the preform(s) 150 in contact with the strong back 180. For example, when the vacuum pressure 160 is applied 406, the preform(s) 150 is removed from the tray 190 and pulled against the strong back 180 by the vacuum pressure 160. Accordingly, the applying 406 of the vacuum pressure 160 picks up the preform(s) 150. Depending on the dimensions of the strong back 180 and the tray 190, the movement of the preform(s) 150 from the tray 190 to the strong back 180 caused by the applying 406 of the vacuum pressure 160 may be slight or large. If the optional vacuum pressure has been applied through the tray 190, the vacuum system 144 is deactivated to cease the vacuum pressure 147 so the applied 406 vacuum pressure 160 can begin holding the preform(s) 150.

When the strong back 180 includes one or more recesses 184, applying 406 the vacuum pressure 160 holds 440 the preform(s) 150 in contact with the recess 184. When the strong back 180 includes multiple recesses 184 as shown in FIGS. 16 and 17, applying 406 the vacuum pressure 160 includes holding 442 multiple preform(s) 150 in contact with the multiple recesses 184. As discussed above with respect to placed 434, each preform(s) 150 can be held in contact with a particular recess or multiple preform(s) 150 can be held in contact with a particular recess. Further, the applying 406 of the vacuum pressure 160 can be selective applied only at the recess(es) in which a preform(s) 150 has been received. Selective applying of the vacuum pressure 160 at the different recesses can prevent picking up objects that are not intended to be placed 410 on the mandrel 140.

When the preform(s) 150 includes multiple types of preforms, such as discrete preform(s) 154 and one or more large preform(s) 156, the vacuum pressure 160 is applied 406 to the discrete preform(s) 154 and the one or more large preform(s) 156. More specifically, applying 406 the vacuum pressure 160 holds 444 the one or more large preform(s) 156 and the discrete preform(s) 154 in contact with the strong back 180. An example of the holding 444 is shown in FIG. 17. When the discrete preform(s) 154 at least partially contact large preform(s) that is(are) adjacent, as shown in FIG. 18, applying 406 the vacuum pressure 160 includes holding 446 each of the discrete preform(s) 154 in contact with large preform(s) 156. The holding 444 and 446 occur simultaneously when the strong back 180 is configured as in FIG. 17; however, the holding 446 can occur without the holding 444 when the pick-and-place machine(s) 130, without the strong back 180, are used to place kitted preform(s).

Further, the holding 442 can be combined with either or both of the holding 444 and 446 when different types of preform(s) 150 are being used to assemble the structure 12. For example, at least one of the multiple recesses 184 holds 442, 444 one or more discrete preform(s) 154 and another of the multiple recesses 184 holds 442, 444 the one or more large preform(s) 156. Depending on the configuration of the multiple recesses 184, the discrete preform(s) 154 and the large preform(s) 156 can also be held in contact with each other while held in the multiple recesses 184.

Referring again to FIGS. 24, 2, and 10 to 13, the strong back 180 and/or preform(s) 150 is transported 408 to the mandrel 140. More specifically, while the vacuum pressure 160 is being applied 406 to hold the preform(s) 150, the strong back 180 and/or preform(s) 150 is transported 408. During the transporting 408, the pick-and-place machine(s) 130 follow a path from the tray 190 to the mandrel 140 according to the program 122 in the cell controller 120.

Referring additionally to FIG. 3, the path is in at least in the Y directions and Z directions and optionally in the X directions, and at least the distal end 135 of the pick-and-place machine(s) 130 moves along the path to perform the transportation 408. In one example, the pick-and-place machine(s) 130 moves in the +Y direction at the tray 190 and the pick-and-place machine(s) 130 or end effector 134 moves in the −Z direction toward the tray 190 and/or preform(s) 150 to be placed 404. After the vacuum pressure 160 is applied 406, the transportation 408 includes moving the pick-and-place machine(s) 130 or end effector 134 in the +Z direction to lift 454 the strong back 180 and/or preform(s) 150, moving the pick-and-place machine(s) 130 in the −Y direction toward the mandrel 140, and moving the pick-and-place machine(s) 130 and/or end effector 134 in the −Z direction toward the mandrel 140.

When the pick-and-place machine(s) 130 are be operated 302 (shown in FIG. 22) in the asynchronous phase 354, the path of each pick-and-place machine(s) 130 can be different depending on the preform(s) 150 to be moved by each pick-and-place machine(s) 130. Further, during the asynchronous phase 354, the path of one or more pick-and-place machine(s) 130 can also include movement in the X direction(s) during placing 404 and/or transportation 408. Additionally or alternatively, when the pick-and-place machine(s) 130 are divided into subsets, each pick-and-place machine(s) 130 in the first subset 126 (shown in FIG. 2) moves toward or apart in the X directions during any part of the path of each pick-and-place machine(s) 130 in the first subset 126 during the transportation 408.

When the pick-and-place machine(s) 130 are operated 304 (shown in FIG. 22) in the synchronous phase 356 (shown in FIG. 23), the path of all of the pick-and-place machine(s) 130 are parallel to each other to avoid distorting of the strong back 180 and/or preform(s) 150 as the pick-and-place machine(s) 130 perform the transportation 408. When a subset of pick-and-place machine(s) 130, such as the second subset 128 (shown in FIG. 2) is operated in the synchronous phase 356, all of the pick-and-place machine(s) 130 in the second subset 128 follow parallel paths during the transportation 408 and any optional movement in the X direction(s) is similar for all of the pick-and-place machine(s) 130 in the second subset 128.

In one example, transporting 408 to the mandrel 140 can include transporting 448 the preform(s) 150 to the mandrel 140 via the pick-and-place machine(s) 130. For example, the preform(s) 150 is transported 448 from where the preform(s) 150 is picked up to where the preform(s) 150 is be placed on the mandrel 140. When the strong back 180 is not used, the pick-and-place machine(s) 130 transports 448 the preform(s) 150 to the mandrel 140.

Additionally or alternatively, transporting 408 to the mandrel 140 includes transporting 450 the strong back 180 to the mandrel 140 via the pick-and-place machine(s) 130. Transporting 450 the strong back 180 includes operating the pick-and-place machine(s) 130 synchronously to carry the strong back 180 or operating a single pick-and-place machine independently to carry the strong back 180. When the strong back 180 is used, the pick-and-place machine(s) 130 transports 450, 448 the strong back 180 and the preform(s) 150 to the mandrel 140. More specifically, the pick-and-place machine(s) 130 transports 450 the strong back 180, which in turn is holding 438 the preform(s) 150 to transport 448 the preform(s) 150.

Transporting 450 the strong back 180 to the mandrel 140 can include positioning 452 the strong back 180 over the mandrel 140. More specifically, the strong back 180, having the preform(s) 150, is transported 450 from the tray 190 to be positioned 452 over the mandrel 140 to where the preform(s) 150 is to be placed 410 on the mandrel 140. For example, the strong back 180 is moved away from the tray 190 in the −Y direction (shown in FIG. 3) to be positioned 452 over the mandrel 140.

In some embodiments, the strong back 180 is lifted 454 (e.g., moved in the +Z direction shown in FIG. 3). For example, the strong back 180 is lifted 454 from the tray 190 to disengage the strong back indexing elements 182 and tray indexing elements 192, as shown in FIG. 10. The lifting 454 can also include lifting 454 the strong back 180 into position 452 over the mandrel 140. The positioning 452 and/or lifting 454 are part of the path along which the transporting 408 occurs.

Transporting 408 can further include aligning 456 the strong back 180 with the mandrel 140. More specifically, as or after the strong back 180 is positioned 452 over the mandrel 140 and/or lifted 454 over the mandrel 140, the strong back 180 is aligned 456 with the mandrel 140. The alignment 456 can include moving (e.g., lowering) the strong back 180 toward the mandrel 140. As the strong back 180 is moved toward the mandrel 140, the strong back indexing elements 182 engage the mandrel indexing elements 148 to bring the strong back 180 into alignment 456 with the mandrel 140 during the transporting 408.

The transporting 408 can end when the preform(s) 150 is in contact with the mandrel 140. More specifically, the preform(s) 150 can be resting against, or be within a tolerance of, a surface of the contoured cross-section 143 (shown in FIG. 3) of the mandrel 140 to be in contact with mandrel 140. Alternatively, the strong back 180 can compress the preform(s) 150 against the mandrel 140 to end the transportation 408. The compression of the preform(s) 150 can ensure the final shape of the preform(s) 150 and/or secure 336 (shown in FIG. 22) the preform(s) 150 to the mandrel 140. The optional release film 26 can prevent the preform(s) 150 from sticking to the strong back 180 when the strong back 180 compresses the preform(s) 150 against the mandrel 140 to facilitate placing 410.

For example, as shown in FIGS. 12 and 13, transporting 450 the strong back 180 to the mandrel 140 via the pick-and-place machine(s) 130 includes aligning 456 strong back indexing elements 182 (e.g., the indexing pins 183 shaped as cones) at the strong back 180 with mandrel indexing elements 148 (e.g., the indexing cups 149 shaped complementary cups) at the mandrel 140. For example, the strong back 180 is transported 450 in the −Y direction and/or −Z direction (shown in FIG. 3) to bring the strong back indexing elements 182 into the contact with the mandrel indexing elements 148. The shape of the mandrel indexing elements 148 and strong back indexing elements 182 guides the strong back 180 into alignment 456 with the mandrel 140 as the strong back 180 is transported 450 toward the mandrel 140. The alignment 456 can include indexing the strong back 180 to a cut-out 142 of the mandrel 140, for example via a cup-and-cone indexing system, in order to ensure a known and repeatable positioning of the strong back 180 relative to the cut-out 142.

Additionally or alternatively, referring additionally to FIG. 16, transporting 450 the strong back 180 to the mandrel 140 includes aligning 458 the recess 184 of the strong back 180 with a cut-out 142 in the mandrel 140. The alignment 458 of the recess 184 and cut-out 142 can occur during the alignment 456 of the strong back indexing elements 182 and mandrel indexing elements 148. Additionally or alternatively, the program 122 in the cell controller 120 includes coordinates to where the recess 184 is aligned 458 with the cut-out 142, and/or the cell controller 120 uses position and/or image information in the data 137 received from the sensor(s) to align 458 the recess 184 with the cut-out 142. This example can be used when the mandrel indexing elements 148 and/or strong back indexing elements 182 are omitted, but can also be used in addition to the mandrel indexing elements 148 and strong back indexing elements 182. The alignment 456 and/or 458 enables the preform(s) 150 to be deposited in the cut-out 142.

When multiple types of preform(s) 150 are assembled into structure 12, as shown in FIGS. 17 and 18, the first type of preform(s) 150, such a large preform(s) 156 is transported 408 to the mandrel 140. Further, a second type of preform(s) 150, such as a discrete preform(s) 154, is transported 408 and/or 460 to the mandrel 140. The different types of preform(s) 150 can transported 408, 460 to the mandrel 140 in series or simultaneously. In one example, a single pick-and-place machine transports the different types of preform(s) 150 in series. In another example, more than one pick-and-place machine transports the different types of preform(s) 150 in series and/or simultaneously depending on the preform(s) 150 being placed on the mandrel 140 and/or the structure 12 being assembled. Additionally or alternatively, transporting 408 includes transporting 460 one or more large preform(s) 156 and discrete preform(s) 154 to the mandrel 140 via the pick-and-place machine(s) 130 while maintaining an arrangement of the large preform(s) 156 and the discrete preform(s) 154.

When the mandrel 140 includes mandrel segment(s) 235 as shown in FIG. 21, transporting 408 the preform(s) 150 and/or strong back 180 includes transporting 462 to the mandrel segment(s) 235 via the pick-and-place machine(s) 130. For example, the preform(s) 150 and/or strong back 180 is transported 462 to particular instances of the mandrel segment(s) 235 positioned in the placement station(s) 100. When multiple placement stations(s) 100, 100', 100" perform the method 400 on a respective mandrel segment(s), the transportation 462 at each placement station(s) 100, 100', 100" can occur at different or same rates.

Referring to FIGS. 24, 13, and 14, the preform(s) 150 are placed 410 on the mandrel 140. The placing 410 occurs after the strong back 180 and/or preform(s) 150 is transported 408 to the mandrel 140. The method 400 includes placing 410 the preform(s) 150 onto the mandrel 140. Preferably, the preform(s) 150 is placed 410 into the mandrel 140 while the preform(s) 150 contact the mandrel 140. More specifically, the transportation 408 of the strong back 180 and/or preform(s) 150 results in the preform(s) 150 contacting the mandrel 140. In a particular embodiment, transportation 408 of the strong back 180 results in the strong back 180 compressing the preform(s) 150 against the mandrel 140. The preform(s) 150 is then placed 410 while contacting the mandrel 140 to prevent distortion of the preform(s) 150 that may be caused by dropping the preform(s) 150 from a distance away from the mandrel 140. However, a small gap may be present between preform(s) 150 and the mandrel 140 after the transportation 408 depending on the dimensional tolerance of the strong back 180, preform(s) 150, and mandrel 140.

The placing 410 include removing 464 the preform(s) 150 from the strong back 180 (or from the pick-and-place machine(s) 130 when the strong back 180 is not used). The preform(s) 150 is removed 464 from the strong back 180 after the strong back 180 is positioned 452 over the mandrel 140 and/or aligned 456, 458 with the mandrel 140. More specifically, the preform(s) 150 is removed 464 from the recess 184 or the surface 185 (shown in FIG. 17) of the strong back 180 and transferred to the cut-out 142 or the outer surface 145 (shown in FIG. 3) of the mandrel 140.

The placing 410 and/or removal 464 of the preform(s) 150 can include lifting 468 the strong back 180 and/or pick-and-place machine(s) 130 away from the mandrel 140 and the preform(s) 150, especially when the strong back 180 has compressed the preform(s) 150 against the mandrel 140 and/or the release film 26 has been applied between the surface 185 (shown in FIG. 17) and the preform(s) 150.

Placing 410 can additionally or alternatively include releasing 470 the vacuum pressure 160 to place 410 the preform(s) 150 onto the mandrel 140. More specifically, the cell controller 120 deactivates the vacuum system 138 to release 470 the vacuum pressure 160 holding the preform(s) 150 at the strong back 180. For example, after or during placement, the vacuum pressure 160 applied 406 to the strong back 180 may be released 470 in order to facilitate removal 464 of the preform(s) 150 from the strong back 180 and/or placement of the preform(s) 150 in a desired location (e.g., a desired location on the mandrel 140). When placing 410 includes lifting 468 the strong back 180, the release 470 of the vacuum pressure 160 can occur before or while the strong back 180 is lifted 468.

When more than one type of preform(s) 150 is being placed 410, the placing 410 includes placing 472 the one or more large preform(s) 156 and the discrete preform(s) 154 onto the mandrel 140. The large preform(s) 156 can be placed 472 separately from the discrete preform(s) 154. Alternatively, the large preform(s) 156 can be placed 472 with the discrete preform(s) 154 while the arrangement of the large preform(s) 156 and discrete preform(s) 154 is maintained. For example, when the arrangement is maintained during transport 460, the large preform(s) 156 and discrete preform(s) 154 are transferred from the strong back 180 to the mandrel 140 without changing the relative positions of the discrete preform(s) 154 and the large preform(s) 156 to each other to place 472 the discrete preform(s) 154 and the large preform(s) 156.

When the pick-and-place machine(s) 130 are operated 302 (shown in FIG. 22) in the asynchronous phase 354 (shown in FIG. 23), placing 410 includes releasing 470 the vacuum pressure 160 to remove 464 at least one discrete object from the strong back 180 which the discrete object(s) 20 contacts the mandrel 140. When the pick-and-place machine(s) 130 are operated 304 (shown in FIG. 22) in the synchronous phase 356 (shown in FIG. 23), placing 410 includes releasing 470 the vacuum pressure 160 to remove 464 the large object(s) 22 from the strong back 180 while the large object(s) 22 contacts the mandrel 140.

When the mandrel 140 includes multiple mandrel segments, the placing 410 includes placing 474 the preform(s) 150 onto a mandrel segment(s) 235. The placing 474 onto the mandrel segment(s) 235 can occur at one or more placement stations(s) 100, 100', and/or 100". When mandrel segment(s) 235 are to receive different types of preform(s) 150, the placing 474 of the different types of preform(s) 150 includes placing 472 the one or more large preform(s) 156 and the discrete preform(s) 154 onto the mandrel segment(s) 235.

During and/or after placing 410, the strong back 180 is lifted 468 away from the mandrel 140 (e.g., by moving in the +Z direction shown in FIG. 3). The mode 412 repeats by moving the strong back 180 away from the mandrel 140 to again be placed 404 at the tray 190 and/or preform(s) 150. The steps of placing 404, applying 406, transporting 408, and placing 410 of the mode 412 repeat until an asynchronous phase 354 and/or a synchronous phase 356 (shown in FIGS. 22 and 23) is completed and/or until all of the preform(s) 150 have been placed 410 on the mandrel 140 or mandrel segment(s) 235.

After each or all of the preform(s) 150 are placed 410, the preform(s) 150 can optionally be secured 336 to the mandrel 140 as described with respect to FIG. 22. For example, the method 400 further includes securing 336 at least the large preform(s) 156 to the mandrel 140. In an embodiment that includes the optional mandrel vacuum system (as shown in FIG. 13), securing 336 includes securing the preform(s) 150 at the mandrel 140 and/or mandrel segment(s) 235 via the vacuum system 144. When the mandrel 140 includes mandrel segment(s) 235, the securing 336 can occur at each mandrel segment(s) 235.

Further, after the last placing, post-placement steps can be performed as part of the method 400 and/or as part of a post-placement method (shown in FIG. 25). The post-placement steps are described in more detail with respect to FIG. 25; however, some examples of the steps are provided below with respect to FIGS. 24A and 24B. Further, the data of the identification device of the mandrel 140 can be updated to include which one or more object(s) 18 have been placed on the mandrel 140 for use by subsequent stations(s) and/or systems in the manufacturing line 10.

For example, when the mandrel 140 includes mandrel segment(s) 235, the method 400 can include assembling 504 multiple mandrel segment(s) together. More specifically, the multiple mandrel segment(s) are assembled 504 together after the pick-and-place machine(s) 130 have completed instructions 124 in the program 122 corresponding to the mandrel segment(s) 235. For example, the multiple mandrel segment(s) are assembled 504 together into a half-barrel section 770 (shown in FIG. 29). Accordingly, the method 400 includes assembling 504 the mandrel segment(s) 235 together. In further embodiments, the vacuum pressure 147 is applied at the mandrel segment(s) 235 to hold the preform(s) 150 in place.

When the layer 206 is included in the structure 12, the method 400 includes placing 516 the layer 206 over multiple preform(s) 150 disposed on the mandrel 140. For example, the pick-and-place machine(s) 130 can be used to place 516 the layer 206 similarly to how the preform(s) 150 are placed during the mode 412. Alternatively, the layer 206 can be placed manually and/or by different machines within the manufacturing line 10. When the mandrel 140 includes mandrel segment(s) 235, the layer 206 is placed 516 after the mandrel segment(s) 235 have been assembled 504. The layer 206 and preform(s) 150 are hardened 520, such as co-cured 524. In a further embodiment, the method 300 further includes placing 516 the layer 206 of unhardened fiber-reinforced material 152 over multiple preform(s) 150 disposed on the mandrel 140 and hardening 520, such as co-curing 524, the layer 206 and the preform(s) 150.

The method 400 of FIGS. 24A and 24B can be tailored to the components of the placement system 50 and/or the particular structure being assembled by combining the variations of steps of moving 402, identification 418, placing 404, applying 406, transporting 408, and/or placing 410. The following examples are provided, but additional combinations are also possible.

When the preform(s) 150 are kitted, the method 400 can include identifying 422 the tray(s), placing 428 the strong back 180 at the tray(s), transporting 460 the large preform(s) 156 and discrete preform(s) 154 to the mandrel 140 while maintaining the arrangement of the large preform(s) 156 and the discrete preform(s) 154, and placing 472 the large preform(s) 156 and the discrete preform(s) 154 onto the mandrel 140. In this example, the method 400 can further include holding 442 the multiple preform(s) 150 in multiple recesses 184 of the strong back 180 and/or holding 444 and/or 446 the first and second types of preform(s) 150.

In another example when multiple types of preform(s) 150 are to be placed, the tray 190 stores an array of multiple instances of the discrete preform(s) 154 and/or the large preform(s) 156, for example as shown in FIG. 5, and the strong back 180 includes multiple recesses 184 for each of the discrete preform(s) 154 and/or large preform(s) 156 in the array stored in the tray 190. In this embodiment, placing 432 the recess 184 of the strong back 180 at the preform(s) 150 includes placing 434 the multiple recesses 184 of the strong back 180 at the multiple discrete preform(s) 154 and/or large preform(s) 156 and applying 406 the vacuum pressure 160 includes applying the vacuum pressure 160 through multiple vacuum channels 188 to hold 442 the multiple discrete preform(s) 154 and/or large preform(s) 156 in contact with the multiple recesses 184.

When the mandrel 140 includes multiple mandrel segment(s) that are radial (shown in FIG. 21), the method 400 includes at least moving 414 one or more mandrel segment(s) 235, transporting 462 to one or more mandrel segment(s) 235, and placing 474 preform(s) 150 on one or more mandrel segment(s) 235.

When the strong back 180 includes multiple strong back segments 181 as shown in FIG. 16, the method 400 includes placing 404 one or more strong back segments 181 at the tray 190 and/or preform(s) 150, applying 406 the vacuum pressure 160 at the one or more strong back segments 181, transporting 450 the one or more strong back segments 181 to the mandrel 140, and placing 410 the preform(s) 150 on the mandrel 140 using each strong back segment 181. The strong back segments 181 can each be used by a different pick-and-place machine, which can enable each strong back segment 181 to be used independently of one or more other strong back segments. Alternatively, more than one pick-and-place machine is assigned to a strong back segment 181, which can enable larger strong back segments 181 and/or preform(s) 150 to be moved to the mandrel 140, in series or simultaneously with one or more other strong back segments. The strong back segments 181 can each move at the same rate in the same direction, or movements of the strong back segments 181 can be independent of the movement of any other strong back segment (as long as the strong back segments 181 do not inadvertently contact using the independent movements).

When using a placement system 50 that does not include the strong back 180, the method 400 includes placing 404 where the placing 404 is modified to place the pick-and-place machine(s) 130 (rather than the strong back 180) at the tray 190 and/or preform(s) 150, applying 406 where the vacuum pressure 160 is applied 406 at the pick-and-place machine(s) 130 and/or end effector 134, transporting 448 the preform(s) 150, and placing 410 the preform(s) 150 from the pick-and-place machine(s) 130 and/or end effector 134 onto the mandrel 140. Similarly, for such a placement system 50, the mode 412 includes steps of placing 404, applying 406, transporting 448, and placing 410 with the modifications previously described.

FIG. 25 is a flowchart illustrating a post-placement method for operating the placement system 50 shown in FIGS. 1 to 21. More specifically, FIG. 25 illustrates the post-placement method for operating the placement system 50 and/or manufacturing line 10 (shown in FIG. 1) at least partially during and/or after the method 400 shown in FIGS. 24A and 24B.

Referring to FIGS. 25 and 21, the method 500 includes an assembly method 502. The assembly method 502 is preferably preformed when the mandrel 140 includes multiple mandrel segment(s). The assembly method 502 includes assembling 504 multiple mandrel segment(s) together. Assembling 504 the mandrel segment(s) 235 together forms the mandrel 140. When the structure 12 being assembled is a portion 768 of a fuselage 766 (shown in FIG. 29), multiple mandrel segment(s) are assembled 504 together into a half-barrel section 770.

The assembly method 502 can optionally including moving 506 the mandrel 140 and/or mandrel segment(s) 235 and/or positioning 508 the mandrel segment(s) 235. More specifically, before the mandrel segment(s) 235 are assembled 504 together, the mandrel segment(s) 235 can be moved 506 to the assembly station(s) 105. During or after the moving 506 of the mandrel segment(s) 235, the mandrel segment(s) 235 are positioned 508 with respect to each other to be assembled 504 together.

When the mandrel segment(s) 235 are each a radial segment of the mandrel 140, each mandrel segment(s) 235 is positioned 510 in a different radial zone Z1, Z2, or Z3 of the mandrel 140. For example, as the mandrel segment(s) 236, 238, and 240 move 506 from the placement stations(s) 100, 100', and 100" to the assembly station(s) 105, each mandrel segment(s) 236, 238, and 240 is moved 506 to be positioned 510 in a respective radial zone Z3, Z1, or Z2. More specifically, due to the correspondence between the mandrel segment(s) 236, 238, and 240 and the different radial portions 212, 208, and 210, each mandrel segment(s) 236, 238, and 240 is positioned 510 in a respective radial zone Z3, Z1, or Z2 before the mandrel 140 is assembled 504 from the mandrel segment(s) 236, 238, and 240.

Assembling 504 the mandrel segment(s) 235 can include applying 512 fasteners 242 to the mandrel segment(s) 235. For example, the mandrel segment(s) 238 is assembled 504 to one side of the mandrel segment(s) 240 by applying 512 fasteners 242 to the mandrel segment(s) 238 and the mandrel segment(s) 240. Similarly, the mandrel segment(s) 236 is assembled 504 to the other side of the mandrel segment(s) 240 by applying 512 fasteners 242 to the mandrel segment(s) 236 and the mandrel segment(s) 240. The fasteners 242 can be applied 512 after all of the mandrel segment(s) 235 are positioned with respect to each other or can be applied 512 as each mandrel segment(s) 235 is positioned.

In a further example, assembling 504 the mandrel segment(s) 235 includes installing seals between adjacent mandrel segment(s) before or after the fasteners 242 are applied 512 to the mandrel segment(s) 235. In a particular example, the seals are installed such that forces act in a normal direction against the seals.

The mandrel 140 and/or mandrel segment(s) 235 can be attached 514 to the mandrel support structure 106. More specifically, the mandrel segment(s) 235, individually or assembled 504 together as the mandrel 140, are attached 514 to the mandrel support structure 106. In one example, the mandrel segment(s) 235 are assembled 504 together, and then the mandrel 140 formed of the mandrel segment(s) 235 is attached 514 to the mandrel support structure 106 using the fasteners 244. In another example, the mandrel segment(s) 235 are attached 514 to the mandrel support structure 106, for example using the fasteners 244, and are then assembled 504 to an adjacent mandrel segment(s), for example using fasteners 242. Accordingly, assembling 504 the mandrel segment(s) 235 together can include attaching 514 the mandrel segment(s) 235 to the mandrel support structure 106.

The method 500 is a post-placement method that can further include placing 516 (e.g., by laying up) the layer 206 on the preform(s) 150 and/or mandrel 140. The placement of the layer 206 can be by manual lay-up, automated lay-up, or a combination of both. The layer 206 can be placed 516 before or after the assembly method 502. When preformed before the assembly method 502, the layer 206 is placed 516 over the preform(s) 150 that have already been placed 410 on the mandrel 140 and/or placed 474 on the mandrel segment(s) 235. For example, a layer 206 is placed 516 on each mandrel segment(s) 235 before the mandrel segment(s) 235 are moved 506 to the assembly station(s) 105. For example, the layer 206 is placed 516 at the placement station(s) 100. The layers 206 are spliced 518 together after the assembly method 502 to create, for example, the skin 782 (shown in FIG. 29). When the layer 206 is placed 516 after the assembly method 502, the layer 206 is placed 516 over the assembled mandrel segments and/or over the mandrel 140 attached to the mandrel support structure 106. The layer 206 can be placed 516 at the assembly station(s) 105 or at layer placement station(s) (not shown) after the assembly station(s) 105.

The method 500 can further include a hardening 520. The hardening 520 includes hardening at least the preform(s) 150. To perform the hardening 520, the mandrel 140 and/or mandrel segment(s) 235 are moved 522 to the hardening system 60 (shown in FIG. 1). The hardening 520 can be performed before or after the assembly method 502, so the hardening system 60 be positioned before or after the assembly station(s) 105 along the manufacturing line 10. When the layer 206 is included in the structure 12, the hardening 520 includes co-curing 524 the layer 206 and the preform(s) 150.

When the mandrel segment(s) 235 are used and the hardening 520 is performed before the assembly method 502, the preform(s) 150 and the layers 206 (if included) are co-cured 524 on each mandrel segment(s) 235 and the mandrel segment(s) 235 and then moved 506 to the assembly station(s) 105 for assembly 504. The cured layers 206 are then spliced 518 together. In one example, the method 500 includes laying up the layer 206 atop each mandrel segment(s) 235 before the mandrel segment(s) 235 have been assembled 504 together, co-curing 524 the layer 206 atop each mandrel segment(s) 235 with the preform(s) 150 on corresponding mandrel segment(s) to create the skin 782, and splicing 518 the skin 782 together after assembling 504 the mandrel segment(s) 235 together.

When the mandrel segment(s) 235 are used and the hardening 520 is performed after the assembly method 502, the mandrel segment(s) 235 are assembled 504 together and moved 522 as the mandrel 140 to the hardening system 60 for the preform(s) 150 and layer 206 (if included) to be co-cured 524. The splicing 518 of the layer 206 is not needed when the mandrel segment(s) 235 are assembled 504 together before the hardening 520. In one example, the method 500 includes laying up the layer 206 atop the mandrel segment(s) 235 after the mandrel segment(s) 235 have be assembled 504 together and co-curing 524 the layer 206 with the preform(s) 150 on the mandrel segment(s) 235.

When the mandrel 140 is not formed of multiple mandrel segment(s), the post-placement method can still be performed. For example, the method 500 can include moving 506 the mandrel 140 to the assembly station(s) 105 if the mandrel 140 is to be supported by the mandrel support structure 106 and, then, attaching 514 the mandrel 140 to the mandrel support structure 106. When the layer 206 is to be included in the structure 12, the method 500 includes placing 516 the layer 206 before or after the mandrel 140 is attached 514 to the mandrel support structure 106. The mandrel 140 (and the mandrel support structure 106) are moved 522 to the hardening system 60, and the preform(s) 150 and layer 206 are co-cured 524.

After the skin 782 is spliced 518 together or after the layer 206 is co-cured 524 with the preform(s) 150, the mandrel 140 can be reused 526. The mandrel 140 can be reused 526 as a whole or the mandrel segment(s) 235 can each be reused 528. Details of the reuse 526, 528 are described with respect to the method 600 shown in FIG. 26.

Figure 26:
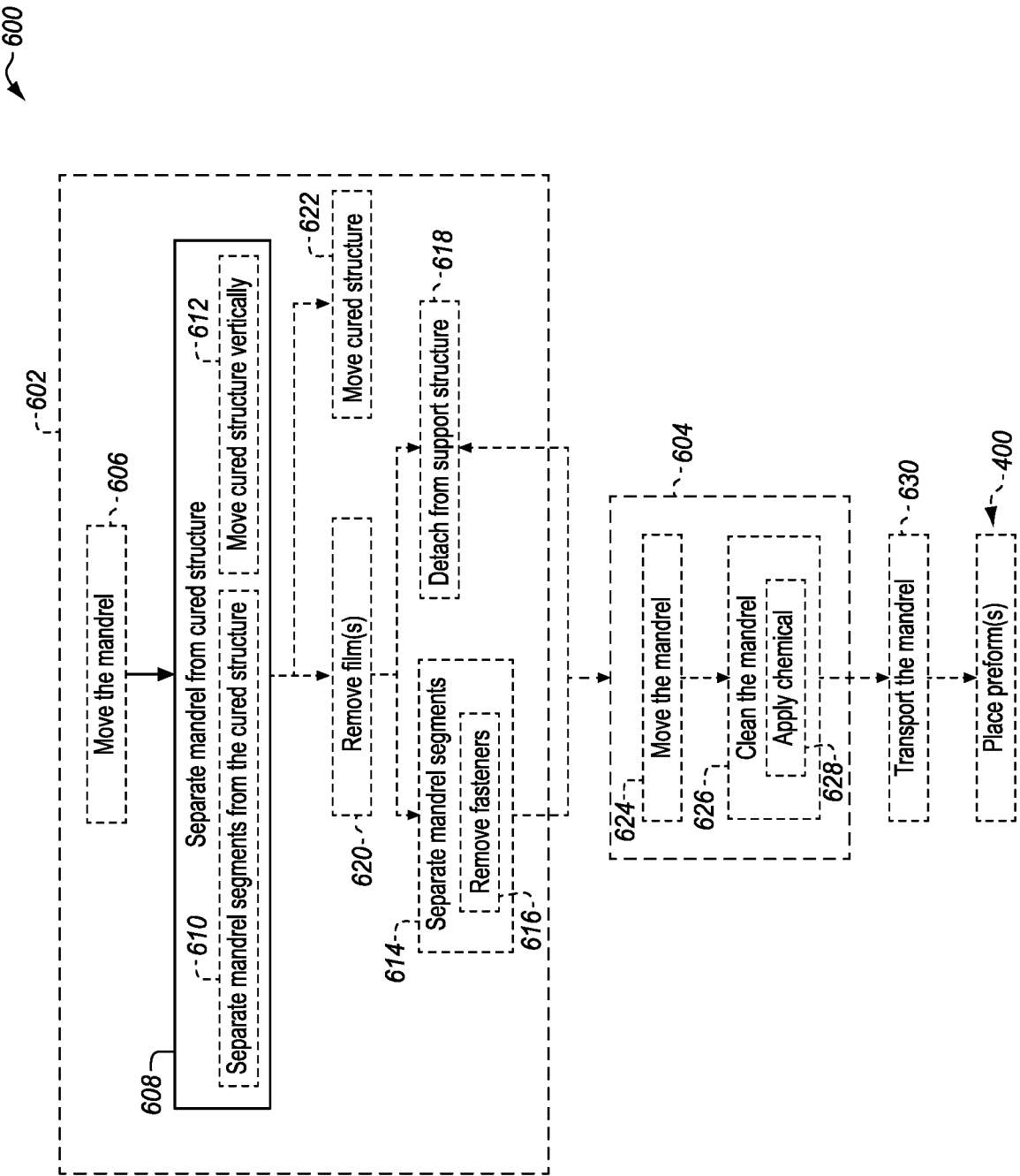
FIG. 26 is a flowchart illustrating a method of preparing the mandrel shown in FIGS. 2 to 21 that can be used to perform the reuse shown in the method of FIG. 25.

FIG. 26 is a flowchart illustrating a method 600 of preparing the mandrel 140 shown in FIGS. 2 to 20). The method 600 in whole or some of the steps of the method 600 can be used to perform the reuse 526 and/or 528 shown in the method 500 of FIG. 25. The method 600 can include a separation method 602 and/or a cleaning method 604. Referring to FIGS. 26 and 1, the method 600 may occur after layup has been completed and the preform(s) 150 have been hardened 520.

To perform the separation method 602, the mandrel 140 can be moved 606 to the separation system 70. When the mandrel 140 includes mandrel segment(s) 235, the mandrel 140 is moved 606 to the separation system 70 where the mandrel segment(s) 235 can be separated from each other. In a particular example, the mandrel 140 moves 606 along the manufacturing line 10 in the process direction 14 from the hardening system 60 to the separation system 70. When objects are not made from the unhardened fiber-reinforced material 152 and are not hardened but are placed and assembled into the structure 12, the mandrel 140 moves 606 along the manufacturing line 10 from the placement system 50 to the separation system 70 to remove the structure 12 from the mandrel 140.

According to the method 600, the separation method 602 includes separating 608 the mandrel 140 from the hardened structure 64. When the mandrel 140 includes mandrel segment(s) 235, the separation 608 includes separating 610 the mandrel segment(s) 235 from the hardened structure 64. In a particular example, separating 610 the mandrel segment(s) 235 from the hardened structure 64 includes separating 610 the mandrel segment(s) 235 from a cured portion 768 of the fuselage 766 (shown in FIGS. 28 and 29). For example, separation 608 form the hardened structure 64 can include moving 612 the mandrel segment(s) 235 vertically to separate the hardened structure 64 from the mandrel segment(s)

235. In one embodiment, the mandrel segment(s) 235 are moved vertically downward, away from the hardened structure 64.

The separation method 602 can further include separating 614 the mandrel segment(s) 235 from each other. The separation 614 of the mandrel segment(s) 235 may include removing 616 the fasteners 242 that hold the mandrel segment(s) 235 together. For example, the separation 614 of the mandrel segment(s) 235 from each other includes removing 616 the fasteners 242 from the mandrel segment(s) 235. Accordingly, when the mandrel 140 includes the mandrel segment(s) 235, the separation method 602, and thus the preparing method 600, includes separating 610 the mandrel segment(s) 235 from the hardened structure 64 and separating 614 the mandrel segment(s) 235 from each other.

Additionally or alternatively, the separation 614 of the mandrel segment(s) 235 can include detaching 618 the mandrel segment(s) 235 from the mandrel support structure 106. For example, the fasteners 244 can be removed to detach 618 the mandrel segment(s) 235 from the mandrel support structure 106. When the mandrel 140 does not include the mandrel segment(s) 235 but is supported by the mandrel support structure 106, the mandrel 140 can be detached 618 from the mandrel support structure 106. The detachment 618 can occur during the separation method 602 or after the cleaning method 604.

When the release film(s) 62 are used, the separation method 602 includes removing 620 the release film(s) 62 from the mandrel 140 and/or mandrel segment(s) 235. For example, after the hardened structure 64 is separated 608 from the mandrel 140, the release film(s) 62 are removed 620 from the mandrel 140 and/or the hardened structure 64. When the mandrel segment(s) 235 are used, the release film(s) 62 are removed 620 from the mandrel segment(s) 235 after separating 610 the mandrel segment(s) 235 from the hardened structure 64 and prior to separating 614 the mandrel segment(s) 235 from each other.

As part of the separation method 602 or after the separation method 602, the hardened structure 64 can be moved 622 to a new location in the manufacturing line 10 for receiving further manufacturing processes. For example, the composite part 16 and/or hardened structure 64 moves 622 to the new location, such as to a different system, in the manufacturing line 10 to receive further manufacturing processes. The different system can be a fabrication or assembly system, and the further manufacturing processes can assemble the composite part 16 into a final product, such as the aircraft 750 (shown in FIGS. 28 and 29).

The method 600 can further include the cleaning method 604. The cleaning method 604 can include moving 624 the mandrel 140 and/or mandrel segments to the cleaning system 80. The cleaning method 604 include cleaning 626 the mandrel 140. When the mandrel segment(s) 235 are used, the mandrel segment(s) 235 are cleaned 626. The cleaning 626 can be done via scrubbing, rubbing, or other cleaning processes using, for example, moving brushes, scrubbers, etc.

The cleaning 626 includes applying 628 at least one cleaning chemical 82 to the mandrel 140 and/or mandrel segment(s). The cleaning chemical(s) can be a solvent, water, and/or soap. When more than one cleaning chemical is applied 628, the different cleaning chemicals are applied 628 sequentially and/or simultaneously. The applying 628 of the cleaning chemicals can occur before, during, or after other cleaning processes (e.g., scrubbing, rubbing, etc.). In alternative embodiment, the mandrel segment(s) 235 are separated 614 from each other after the mandrel 140 is cleaned 626 as a whole; however, the mandrel segment(s) 235 may be more thoroughly cleaned and/or cleaned in parallel if separated 614 from each other prior to cleaning 626.

When separation method 602 and, optionally the cleaning method 604, has been performed, the method 600 can include transporting 630 the mandrel 140 or the mandrel segment(s) 235 to the start position 52 for placement stations(s) 100, 100', and/or 100" that pick and place the preform(s) 150 onto the mandrel 140 or the mandrel segment(s) 235. The transporting 630 of the mandrel 140 can be the moving 402 that occurs during the method 400 (shown in FIGS. 24A and 24B). The method 600 then includes placing the preform(s) 150 on the mandrel 140 or mandrel segment(s) 235 via the pick-and-place machine(s) 130 after the mandrel segment(s) 235 have been, for example, separated 614 and/or cleaned 626.

Referring to FIGS. 1 and 24 to 26, an overall example of a flow of a mandrel 140, such as a segmented mandrel having mandrel segment(s) 235, through an assembly environment of the manufacturing line 10 is shown. FIG. 21 shows the mandrel segment(s) 235, 236, 238, and 240 and the placement stations(s) 100, 100', and 100" and the assembly station(s) 105.

Referring to FIGS. 1, 21, and 24 to 26, the mandrel segment(s) 236, 238, and 240 individually receive preform(s) 150 at the placement system 50, where pick-and-place machine(s) 130 place 410 preform(s) 150 onto the mandrel segment(s) 236, 238, and/or 240 at predetermined locations. The mandrel segment(s) 235 are moved 506 to the assembly station(s) 105. The mandrel segment(s) 235 are attached to each other (e.g., during the assembly 504) at unique radial positions after the mandrel segment(s) 235 have been radially positioned 510. Alternatively or additionally, the mandrel segment(s) 235 are attached 514 to a mandrel support structure 106. For example, the mandrel segment(s) 235 are attached 514 to the mandrel support structure 106 via fasteners 244.

Layer 206 may be placed over the preform(s) 150 at the mandrel segment(s) 236, 238, 240 and co-cured 524 with the preform(s) 150 to form a skin 782 integral with stringers 778 (shown in FIG. 29). This may be performed prior to or after the assembly 504 of the mandrel segment(s) 236, 238, and 240. If performed after the assembly 504 of the mandrel segment(s) 236, 238, and 240, then the layer 206 and preform(s) 150 may be hardened 520 into one integral whole in a single step. However, if performed prior to assembly 504, additional instances of splicing 518 may be performed to facilitate the assembly method 502 after the layer 206 has been laid-up and/or hardened 520. The mandrel support structure 106 proceeds to move 522 to a hardening system 60, where the preform(s) 150 are hardened. The hardening system 60 itself, or a location upstream or downstream of the hardening system 60, may form a boundary of a clean room environment.

The mandrel support structure 106 proceeds to a separation system 70, which removes or separates 608 a cured portion 768 of the fuselage 766 from the mandrel segment(s) 235, by moving 612 the cured portion 768 of fuselage 766 vertically to separate it from the mandrel segment(s) 235. The cured portion 768 of the fuselage 766 then proceeds to move 622 to a new location for receiving work (e.g., attachment to another section of the fuselage 766, installation of windows or frames, etc.).

Release film(s) 62 (e.g., vacuum bagging materials, peel plies, separation films, etc.) are also removed 620 from the mandrel segment(s) 235, either at the separation system 70, or at another separation station(s) not shown. Then, the mandrel segment(s) 235 are separated 614 from each other, by removing 616 the fasteners 242 from the mandrel segment(s) 235. For example, the mandrel segment(s) 235 are separated 614 from each other via the separation system 70, or at another separation station(s) not shown. The individual mandrel segment(s) can be cleaned 626 at the cleaning system 80. The cleaning system 80 applies 628 a cleaning chemical, such as water, solvents, soap, etc., and may do so in combination with a scrubbing, rubbing, or other cleaning 626 (e.g., moving brushes, scrubbers, etc.). The mandrel segment(s) 235 return, via transporting 630, to the placement system 50 for receiving additional instances of preform(s) 150. This involves placing 410 the preform(s) 150 onto the mandrel segment(s) 235 via pick-and-place machine(s) 130 after the mandrel segment(s) 235 have been cleaned 626.

EXAMPLES

In the following examples, additional processes, systems, and methods are described in the context of system that coordinates the action of pick-and-place machine(s), such as the pick-and-place machine(s) 130 described above.

Figure 27:
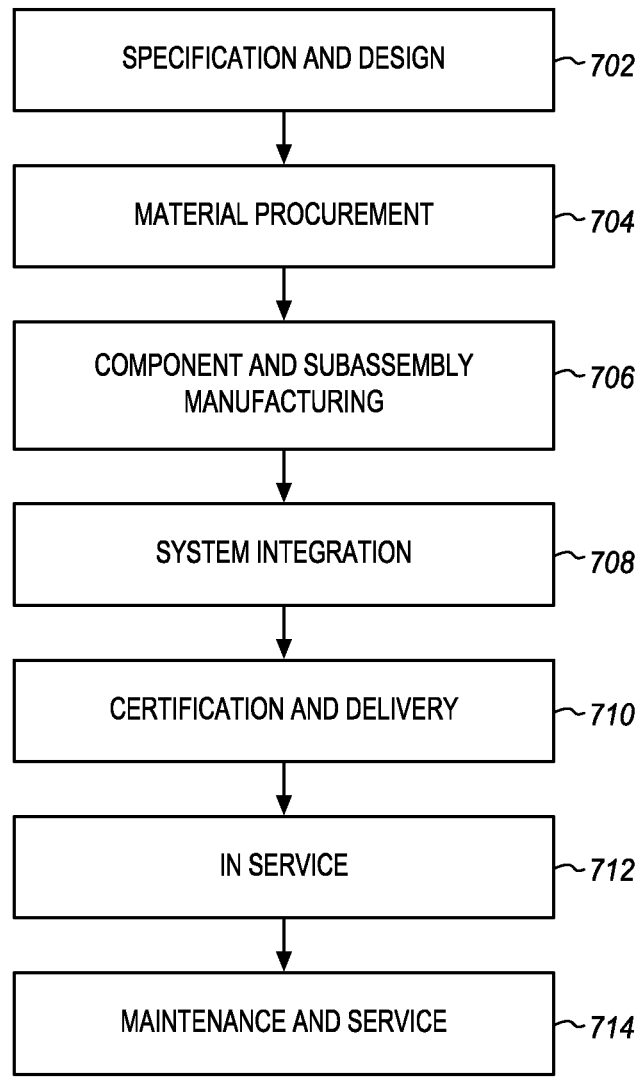
FIG. 27 is a flow diagram of aircraft production and service methodology in which the system and/or manufacturing line shown in FIGS. 1 to 21 and/or the method shown in FIGS. 22 to 26 can be used in an illustrative embodiment.
Figure 28:
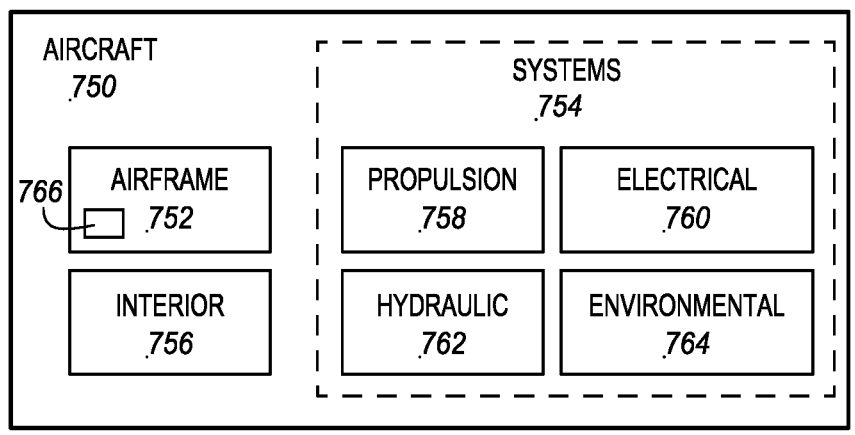
FIG. 28 is a schematic block diagram of an aircraft that can be made using the system and/or manufacturing line shown in FIGS. 1 to 21 and/or the method shown in FIGS. 22 to 26 in an illustrative embodiment.

Referring more particularly to the drawings, embodiments of the disclosure may be described in the context of aircraft manufacturing and service in method 700 as shown in FIG. 27 and an aircraft 750 as shown in FIGS. 28 and 29. During pre-production, the method 700 may include specification and design 702 of the aircraft 750 and material procurement 704. During production, component and subassembly manufacturing 706 and system integration 708 of the aircraft 750 takes place. Thereafter, the aircraft 750 may go through certification and delivery 710 in order to be placed in service 712. While in service by a customer, the aircraft 750 is scheduled for routine work in maintenance and service 714 (which may also include modification, reconfiguration, refurbishment, and so on).

Systems and methods embodied herein may be employed during any one or more suitable stages of the production and service described in method 700 (e.g., component and subassembly manufacturing 706, system integration 708, maintenance and service 714) and/or in any suitable component of aircraft 750 (e.g., airframe 752, systems 754, interior 756, propulsion system 758, electrical system 760, hydraulic system 762, environmental system 764). Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 28, the aircraft 750 produced by the method 700 may include an airframe 752 with a plurality of systems 754 and an interior 756. The airframe 752 includes a fuselage 766 that defines at least a portion of the interior 756. Examples of systems 754 include one or more of a propulsion system 758, an electrical system 760, a hydraulic system 762, and an environmental system 764. Any number of other systems may be included. Although an aerospace example is shown, the principles of the systems and methods described herein may be applied to other industries, such as the automotive industry.

FIG. 29 is a perspective view of the aircraft 750 shown in FIG. 28. The aircraft 750 includes the fuselage 766. The fuselage 766 can make up part of the airframe 752 (shown in FIG. 28) and define the interior 756 of the aircraft 750. The fuselage 766 also houses at least a portions of the systems 754. The fuselage 766 can be made up of portions 768 that are manufactured individually or as a subassembly using the manufacturing line 10, placement system 50, and methods 300, 400, 500, and/or 600 described with respect to FIGS. 1 to 26. For example, the portion 768 of the fuselage 766 can be the structure 12 assembled by the placement system 50.

As described above, a half-barrel section 770 is an example of the portion 768 of the fuselage 766 assembled using the placement system 50 and methods 300, 400, 500, and/or 600. Because the fuselage 766 makes up at least part of the airframe 752, the portion 768 and half-barrel section 770 can be considered parts of the airframe 752. In the example of FIG. 29, the fuselage 766 is fabricated from half-barrel sections 770 by joining an upper half-barrel section 772 to a lower half-barrel section 774 to form a respective instance of full-barrel sections 776-1, 776-2, 776-3, and 776-4. The full-barrel sections 776-1, 776-2, 776-3, and 776-4 are joined serially to form the fuselage 766.

Each portion 768 or half-barrel section 770 of the fuselage 766 includes stringers 778, frames 780, and skin 782. The skin 782 is attached to the stringers 778 and frames 780. In some embodiments, a frame filler 784 can be positioned between the skin 782 and the frames 780. After hardening 520 (shown in FIG. 25), the stringer preform(s) 159 (shown in FIGS. 5 and 18) become the stringers 778 and the frame filler preform(s) 158 (shown in FIGS. 5 and 18) become the frame fillers 784. When the layer 206 (shown in FIG. 18) is included in the structure 12 (shown in FIG. 1), the layer 206 that is laid up on the frame filler preform(s) 158 and/or stringer preform(s) 159 becomes the skin 782 after hardening 520, as described with respect to FIG. 25.

In one embodiment, a part comprises a portion of airframe 752, and is manufactured during component and subassembly manufacturing 706. The part may then be assembled into an aircraft 750 during system integration 708, and then be utilized in service 712 until wear renders the part unusable. Then, during maintenance and service 714, the part may be discarded and replaced with a newly manufactured part. Inventive components and methods may be utilized throughout component and subassembly manufacturing 706 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically-readable digital data storage media.

Although specific embodiments are described herein, the scope of the disclosure is not limited to those specific embodiments. The scope of the disclosure is defined by the following claims and any equivalents thereof.

What is claimed is:

1. A method for placing a preform onto a mandrel, the preform comprising an unhardened fiber-reinforced material, the method comprising:
    moving the mandrel in a process direction relative to a placement station(s) that comprises multiple pick-and-place machine(s);
    identifying a tray that stores the preform;
    placing a strong back at the preform via at least one of the multiple pick-and-place machine(s), wherein placing the strong back comprises placing a recess of the strong back at the preform;
    applying vacuum pressure to hold the preform in contact with the strong back;
    transporting the preform to the mandrel via the at least one of the multiple pick-and-place machines, wherein transporting the preform to the mandrel comprises aligning a recess of the strong back with a cut-out in the mandrel; and
    placing the preform onto the mandrel.

2. The method of claim 1, further comprising:
    pausing the mandrel while a portion of the mandrel is disposed at the placement station(s).

3. The method of claim 1, wherein:
    placing the preform comprises releasing the vacuum pressure.

4. The method of claim 1, wherein:
    placing the recess of the strong back at the preform comprises placing multiple recesses of the strong back at multiple preforms; and
    applying the vacuum pressure comprises holding the multiple preforms in contact with the multiple recesses.

5. The method of claim 1, wherein:
    transporting the preform to the mandrel via the pick-and-place machine(s) comprises aligning indexing elements at the strong back with indexing elements at the mandrel.

6. A method for placing a preform onto a mandrel, the preform comprising an unhardened fiber-reinforced material, the method comprising:
    moving the mandrel in a process direction relative to a placement station(s) that comprises multiple pick-and-place machine(s);
    identifying a tray that stores the preform;
    placing a strong back at the preform via at least one of the multiple pick-and-place machine(s);
    applying vacuum pressure to hold the preform in contact with the strong back;
    transporting the preform to the mandrel via the at least one of the multiple pick-and-place machines, wherein transporting the preform to the mandrel comprises aligning a recess of the strong back with a cut-out in the mandrel;
    placing the preform onto the mandrel;
    placing a layer of the unhardened fiber-reinforced material over multiple preforms disposed on the mandrel; and
    co-curing the layer and the preforms.

7. A method for placing a preform onto a mandrel, the preform comprising an unhardened fiber-reinforced material, the method comprising:
    moving the mandrel in a process direction relative to a placement station(s) that comprises multiple pick-and-place machine(s);
    identifying a tray that stores the preform;
    placing a strong back at the preform via at least one of the multiple pick-and-place machine(s);
    applying vacuum pressure to hold the preform in contact with the strong back;
    transporting the preform to the mandrel via the at least one of the multiple pick-and-place machines, wherein transporting the preform to the mandrel comprises aligning a recess of the strong back with a cut-out in the mandrel; and
    placing the preform onto the mandrel,
    wherein: applying the vacuum pressure comprises operating a vacuum system to apply the vacuum pressure through vacuum channels that are coupled with a recess of the strong back.

8. A portion of an aircraft assembled according to the method of claim 1.

9. A non-transitory computer-readable medium embodying programmed instructions which, when executed by a processor, are operable for performing the method of claim 1 for assembling a structure.

10. A placement system for fabricating a structure, the placement system comprising:
    pick-and-place machine(s) within a manufacturing cell; and
    a cell controller that is operable to:
        move a mandrel in a process direction relative to the pick-and-place machine(s),
        identify a tray that stores a preform comprising an unhardened fiber-reinforced material,
        place a strong back at the preform via at least one of the pick-and-place machine(s),
        apply vacuum pressure to hold the preform in contact with the strong back,
        transport the preform to the mandrel via at least one pick-and-place machine, and
        place the preform onto the mandrel,
    wherein the cell controller is operable to transport the preform by aligning a recess of the strong back with a cut-out in the mandrel, and
    wherein: the cell controller is operable to place the strong back by placing the recess of the strong back at the preform.

11. The placement system of claim 10, wherein:
    the cell controller is operable to pause the mandrel while a portion of the mandrel is disposed at a placement station(s) having the pick-and-place machine(s).

12. The placement system of claim 10, wherein:
    the cell controller is operable to place the preform by releasing the vacuum pressure.

13. The placement system of claim 10, wherein:
    the tray stores multiple preforms and the strong back includes multiple recesses.

14. The placement system of claim 10, wherein:
the cell controller is operable to transport the preform to the mandrel via the pick-and-place machine(s) by aligning indexing elements at the strong back with indexing elements at the mandrel.

15. A placement system for fabricating a structure, the placement system comprising:
pick-and-place machine(s) within a manufacturing cell; and
a cell controller that is operable to:
move a mandrel in a process direction relative to the pick-and-place machine(s),
identify a tray that stores a preform comprising an unhardened fiber-reinforced material,
place a strong back at the preform via at least one of the pick-and-place machine(s),
apply vacuum pressure to hold the preform in contact with the strong back,
transport the preform to the mandrel via at least one pick-and-place machine, and
place the preform onto the mandrel,
wherein the cell controller is operable to transport the preform by aligning a recess of the strong back with a cut-out in the mandrel, and
wherein: the cell controller is operable to place a layer of the unhardened fiber-reinforced material over multiple preforms disposed on the mandrel, and co-cure the layer and the preforms.

16. An apparatus, comprising:
a plurality of pick-and-place machine(s) located within a manufacturing cell;
a cell controller coupled to the plurality of pick-and-place machine(s);
a mandrel comprising a cut-out, the mandrel movable in a process direction relative to the plurality of pick-and-place machine(s);
a tray;
a preform stored on the tray, the preform comprising an unhardened fiber-reinforced material; and
a strong back held in contact with the preform by a vacuum, the strong back comprising a recess,
wherein the tray is identified by the cell controller,
wherein the preform and the strong back are transported to, and placed upon, the mandrel via at least one of the plurality of pick-and-place machine(s), and
wherein the recess of the strong back is aligned with the cut-out of the mandrel.

17. The apparatus of claim 16, wherein the tray stores multiple preforms and the strong back includes multiple recesses.

18. The apparatus of claim 17, wherein a layer of the unhardened fiber-reinforced material is placed over the multiple preforms and co-cured with the multiple preforms.

19. The method of claim 1, further comprising
placing a layer of the unhardened fiber-reinforced material over multiple preforms disposed on the mandrel; and
co-curing the layer and the preforms.

20. The method of claim 1, wherein: applying the vacuum pressure comprises operating a vacuum system to apply the vacuum pressure through vacuum channels that are coupled with a recess of the strong back.

21. The placement system of claim 10, wherein: the cell controller is operable to place a layer of the unhardened fiber-reinforced material over multiple preforms disposed on the mandrel, and co-cure the layer and the preforms.

\* \* \* \* \*